(12) United States Patent
Hironaka et al.

(10) Patent No.: US 8,791,192 B2
(45) Date of Patent: Jul. 29, 2014

(54) RESIN COMPOSITION, MOLDED ARTICLE, AND PRODUCTION METHODS THEREOF

(71) Applicants: Teijin Chemicals Ltd., Tokyo (JP); Teijin Limited, Osaka (JP)

(72) Inventors: Katsuhiko Hironaka, Tokyo (JP); Fumitaka Kondo, Tokyo (JP); Keiichiro Ino, Tokyo (JP); Yuichi Matsuno, Tokyo (JP); Kiyotsuna Toyohara, Iwakuni (JP); Hirotaka Suzuki, Iwakuni (JP); Ryuji Nonokawa, Iwakuni (JP); Takaaki Matsuda, Iwakuni (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 13/865,633

(22) Filed: Apr. 18, 2013

(65) Prior Publication Data

US 2013/0231435 A1   Sep. 5, 2013

Related U.S. Application Data

(62) Division of application No. 12/161,295, filed as application No. PCT/JP2007/051023 on Jan. 17, 2007, now abandoned.

(30) Foreign Application Priority Data

Jan. 18, 2006 (JP) ................. 2006-009758
Jan. 19, 2006 (JP) ................. 2006-011005
Jan. 20, 2006 (JP) ................. 2006-012310

(51) Int. Cl.
  *C08K 3/34* (2006.01)
  *C08L 31/00* (2006.01)

(52) U.S. Cl.
  USPC ............................ 524/451; 524/556

(58) Field of Classification Search
  USPC ........................................... 524/451
  See application file for complete search history.

(56) References Cited

U.S. PATENT DOCUMENTS

| | | | |
|---|---|---|---|
| 4,719,246 A | 1/1988 | Murdoch et al. | |
| 4,766,182 A | 8/1988 | Murdoch et al. | |
| 5,973,024 A * | 10/1999 | Imashiro et al. | 523/124 |
| 2005/0001358 A1 * | 1/2005 | Nakazawa et al. | 264/331.18 |
| 2006/0148934 A1 * | 7/2006 | Miyama et al. | 524/13 |
| 2008/0033097 A1 | 2/2008 | Hayata et al. | |
| 2008/0097074 A1 | 4/2008 | Ouchi et al. | |
| 2009/0018237 A1 | 1/2009 | Fujii et al. | |
| 2009/0239983 A1 | 9/2009 | Nodera et al. | |

FOREIGN PATENT DOCUMENTS

| | | | | |
|---|---|---|---|---|
| EP | 1 445 282 A1 | 8/2004 | | |
| JP | 63-241024 A | 10/1988 | | |
| JP | 07-109413 A | 4/1995 | | |
| JP | 07-506863 A | 7/1995 | | |
| JP | 11-140292 A | 5/1999 | | |
| JP | 2000-17163 A | 1/2000 | | |
| JP | 2000-17164 A | 1/2000 | | |
| JP | 2000017164 A | * 1/2000 | ............. | C08L 67/04 |
| JP | 2002-30208 A | 1/2002 | | |
| JP | 2002-212832 A | 7/2002 | | |
| JP | 2003-096285 A | 4/2003 | | |
| JP | 2003-119626 A | 4/2003 | | |
| JP | 2003-128899 A | 5/2003 | | |
| JP | 2003-192884 A | 7/2003 | | |
| JP | 2003-238672 A | 8/2003 | | |
| JP | 2003-293220 A | 10/2003 | | |
| JP | 2004-99703 A | 4/2004 | | |
| JP | 2004-189863 A | 7/2004 | | |
| JP | 2004-190026 A | 7/2004 | | |
| JP | 2004-216378 A | 8/2004 | | |
| JP | 2004-250549 A | 9/2004 | | |
| JP | 2004-332166 A | 11/2004 | | |
| JP | 2005-42084 A | 2/2005 | | |
| JP | 2005-48066 A | 2/2005 | | |
| JP | 2005-048066 A | 2/2005 | | |
| JP | 2005-048067 A | 2/2005 | | |
| JP | 2005-144702 A | 6/2005 | | |
| JP | 2005-146261 A | 6/2005 | | |
| JP | 2005-187626 A | 7/2005 | | |
| JP | 2005-187630 A | 7/2005 | | |
| JP | 2005-200517 A | 7/2005 | | |
| JP | 2005-255806 A | 9/2005 | | |
| JP | 2005-325286 A | 11/2005 | | |
| JP | 2005-330318 A | 12/2005 | | |
| JP | 2006-182923 A | 7/2006 | | |
| JP | 2006-182926 A | 7/2006 | | |
| JP | 2006-265486 A | 10/2006 | | |

(Continued)

OTHER PUBLICATIONS

Translation of JP2000-017164, Jan. 18, 2000.*
JP Notification of Reasons for Refusal, dated Jun. 2, 2009, issued in corresponding JP Application No. 2006-009763, 6 pages in English and Japanese.
Tsuji et al.; Stereocomplex Formation between Enantiomeric Poly(lactic acid)s. 6. Binary Blends from Copolymers; Macromolecules 1992, 25, 5719-5723.
Lim et al.; Processing technologies for poly(lactic acid); Progress in Polymer Science; 33; 2008; 820-852.

(Continued)

*Primary Examiner* — Hui Chin
(74) *Attorney, Agent, or Firm* — Sughrue Mion, PLLC

(57) ABSTRACT

There are provided a resin composition including a polylactic acid which (i) includes a poly-L-lactic acid (component B-1) and a poly-D-lactic acid (component B-4), (ii) has a weight ratio of the component B-1 to the component B-4 (component B-1/component B-4) of 10/90 to 90/10, and (iii) shows a proportion of melt peaks at 195° C. or higher to all melt peaks in a temperature rising process in measurement by a differential scanning calorimeter (DSC) of at least 20%; a molded article of the resin composition; and methods for producing the resin composition and the molded article.

5 Claims, 5 Drawing Sheets

(56) References Cited

FOREIGN PATENT DOCUMENTS

| | | |
|---|---|---|
| JP | 2007-92026 A | 4/2007 |
| JP | 2007-131795 A | 5/2007 |
| JP | 2007-191550 A | 8/2007 |
| JP | 2006-36808 A | 2/2008 |
| JP | 2010-83906 A | 4/2010 |
| KZ | 2003-128900 A | 5/2003 |
| WO | 93/23456 A1 | 11/1993 |
| WO | 03/014224 A1 | 2/2003 |
| WO | 2006/009285 A1 | 1/2006 |

OTHER PUBLICATIONS

Japanese Office Action for corresponding Application No. 2007-555010 dated Jun. 26, 2012.

Tsuji, Hideto, et al., "Stereocomplex Formation between Enantiomeric Poly(lactic acid)s. 3. Calorimetric Studies on Blend Films Cast from Dilute Solution," Macromolecules, Sep. 30, 1991, pp. 5651-5656, vol. 24, No. 20.

Donald Garlotta, Journal of Polymers and the Environment, vol. 9, No. 2, Apr. 2001.

Translation of JP 2003-119626, Apr. 23, 2003.

Translation of JP 2005-048066, Feb. 24, 2005.

Translation of JP 2000-017164, Obara et al., Jan. 18, 2000.

Japanese Office Action for corresponding Application No. 2006-009765 dispatched Feb. 26, 2013.

Japanese Office Action for corresponding Application No. 2006-009766 dispatched Feb. 26, 2013.

Japanese Patent Office Decision of Appeal for Application No. 2006-9761 dated Mar. 12, 2013.

\* cited by examiner

<Optical Disk 1>

<Optical Disk 2>

RESIN COMPOSITION, MOLDED ARTICLE, AND PRODUCTION METHODS THEREOF

CROSS REFERENCE TO RELATED APPLICATIONS

This is a divisional of application Ser. No. 12/161,295 filed Jul. 17, 2008, which is the National Stage of PCT/JP2007/051023 filed Jan. 17, 2007 (which claims the benefit of Japanese Application No. 2006-009758, filed Jan. 18, 2006, Japanese Application No. 2006-011005, filed Jan. 19, 2006, and Japanese Application No. 2006-012310, filed Jan. 20, 2006), the disclosure of which is incorporated herein by reference.

FIELD OF THE INVENTION

The present invention relates to a resin composition and a molded article that contain a polymer obtained from biomass resources. More specifically, it relates to a resin composition that contains a specific polylactic acid and has excellent heat resistance and hydrolysis resistance, and a molded article of the resin composition.

BACKGROUND OF THE ART

Thermoplastic resins have excellent heat resistance, mechanical properties, impact resistance and dimensional stability and are widely used in fields such as an office automation equipment field, automobile field and electric/electronic part field. On the other hand, however, the thermoplastic resins also have an aspect that most of raw materials thereof rely on oil resources.

In recent years, in view of fear of exhaustion of the oil resources and a problem of increase of carbon dioxide in air that causes global warming, carbon-neutral biomass resources that do not rely on oils for raw materials and do not increase carbon dioxide by combustion thereof have been gathering great attention. Even in the field of polymers, biomass plastics produced from biomass resources have been ardently developed.

Representative examples of the biomass plastics include polylactic acids, and use thereof has been increasingly expanded to dishes, packaging materials, miscellaneous goods and the like, because they have relatively high heat resistance and mechanical properties among the biomass plastics. In addition, the polylactic acids have also been studied for a possibility as industrial materials.

However, the properties of the polylactic acids such as mechanical properties and heat resistance are unsatisfactory in order for the polylactic acids to be used as industrial materials in fields in which thermoplastic resins are used. Further, the polylactic acids have a problem that they show significantly low hydrolysis resistance when used under wet and hot conditions because they have biodegradability.

Further, the polylactic acids have optical isomers, and it is known that when a poly-L-lactic acid that is a polymer of L-lactic acid and a poly-D-lactic acid that is a polymer of D-lactic acid are mixed together, they form stereocomplex crystals which are a material showing a higher melting point than crystals of the poly-L-lactic acid alone or the poly-D-lactic acid alone (see, Patent Document 1, Nonpatent Document 1). An attempt to apply this stereocomplex polylactic acid to industrial applications such as automobile parts and household appliance parts by taking advantage of its heat resistance has been made (see, Patent document 2).

However, when this stereocomplex polylactic acid is produced by an industrially advantageous melt-extrusion process, it is very difficult to achieve stereo-complexification to a sufficient level. When stereo-complexification is insufficient, the stereocomplex polylactic acid cannot exhibit good heat resistance that is a characteristic thereof. Further, although the stereocomplex polylactic acid has a tendency of showing a higher crystallization rate than the poly-L-lactic acid or poly-D-lactic acid, it is still insufficient to produce the stereocomplex polylactic acid efficiently by injection molding. As described above, even the stereocomplexpolylactic acid still has a number of problems in order to be used in wide applications.

Under the circumstances, an attempt to replace some of plastics which rely on oils for raw materials by biomass plastics has recently been becoming popular as a measure for reducing environmental burdens of the plastics, and as to thermoplastic resins, it has been proposed to incorporate natural polymers such as corn starch into the resins (see, Patent document 3). Further, compositions comprising thermoplastic resins and polylactic acids have been proposed (see, Patent documents 4 to 6).

As for polylactic acids, attempts to use them as industrial materials by introducing resins such as aromatic polycarbonates and a flame retardant into the polylactic acids have been made (see, Patent document 7)

However, it is the current situation that a problem of decrease of hydrolysis resistance that is derived from a characteristic of the polylactic acids has not yet been solved and hinders the above materials from being used as industrial materials in various fields.

(Patent document 1) Japanese Patent Laid-Open Publication No. 63-241024
(Patent document 2) Japanese Patent No. 3583097
(Patent document 3) Japanese Patent Laid-Open Re-Publication No. 7-506863
(Patent document 4) Japanese Patent No. 3279768
(Patent document 5) Japanese Patent Laid-Open Publication No. 2005-48066
(Patent document 6) Japanese Patent Laid-Open Publication No. 2005-48067
(Patent document 7) Japanese Patent Laid-Open Publication No. 2004-190026
(Nonpatent document 1) Macromolecules, 24, 5651 (1991)

DISCLOSURE OF THE INVENTION

First Aspect

An object of the present invention is to provide a resin composition and a molded article that use a biomass-derived polylactic acid and cause small burdens on the environment. Another object of the present invention is to provide a resin composition which comprises a thermoplastic resin (component A) and a polylactic acid (component B) and has excellent hydrolysis resistance. Still another object of the present invention is to provide a resin composition having excellent heat resistance and chemical resistance. Still another object of the present invention is to provide a molded article having excellent heat resistance, mechanical properties, hydrolysis resistance and chemical resistance.

The present inventors have found that a molded article having excellent heat resistance, mechanical properties, hydrolysis resistance and chemical resistance is obtained by molding a resin composition that comprises a thermoplastic resin (component A) and a polylactic acid having a high stereocomplex crystal content, the polylactic acid being obtained by melt-kneading a polylactic acid containing at least 90% of L-lactic acid unit and a polylactic acid containing at least 90% of D-lactic acid unit at high temperatures, and have completed the present invention based on this finding.

That is, the present invention relates to a resin composition comprising 100 parts by weight of thermoplastic resin (component A) and 1 to 200 parts by weight of polylactic acid (component B), wherein (i) the component B comprises a polylactic acid (component B-1) that comprises 90 to 100 mol % of L-lactic acid unit and 0 to 10 mol % of D-lactic acid unit and/or units other than lactic acid and a polylactic acid (component B-4) that comprises 90 to 100 mol % of D-lactic acid unit and 0 to 10 mol % of L-lactic acid unit and/or units other than lactic acid, (ii) the weight ratio (component B-1/component B-4) of the component B-1 to component B-4 in the component B is within a range of 10/90 to 90/10, and (iii) the component B in the resin composition shows a proportion of melt peaks at 195° C. or higher to all melt peaks in a temperature rising process in measurement by a differential scanning calorimeter (DSC) of at least 20%.

Further, the present invention relates to a method for producing a resin composition by melt-kneading 100 parts by weight of thermoplastic resin (component A) and 1 to 200 parts by weight of polylactic acid (component B), wherein (i) the component B comprises a polylactic acid (component B-1) that comprises 90 to 100 mol % of L-lactic acid unit and 0 to 10 mol % of D-lactic acid unit and/or units other than lactic acid and a polylactic acid (component B-4) that comprises 90 to 100 mol % of D-lactic acid unit and 0 to 10 mol % of L-lactic acid unit and/or units other than lactic acid,
(ii) the weight ratio (component B-1/component B-4) of the component B-1 to component B-4 in the component B is within a range of 10/90 to 90/10, and
(iii) the component B shows a proportion of melt peaks at 195° C. or higher to all melt peaks in a temperature rising process in measurement by a differential scanning calorimeter (DSC) of at least 20%.

Second Aspect

An object of the present invention is to provide a resin composition and a molded article that use a biomass-derived polylactic acid and cause small burdens on the environment. Another object of the present invention is to provide a resin composition comprising a polylactic acid (component B) and having excellent hydrolysis resistance. Still another object of the present invention is to provide a resin composition having excellent heat resistance and chemical resistance. Still another object of the present invention is to provide a molded article having excellent heat resistance, mechanical properties, hydrolysis resistance and chemical resistance.

The present inventors have found that a molded article having excellent heat resistance, mechanical properties, hydrolysis resistance and chemical resistance is obtained by molding a resin composition that comprises a polylactic acid (component B) having a high stereocomplex crystal content, the polylactic acid being obtained by melt-kneading a polylactic acid containing at least 90% of L-lactic acid unit and a polylactic acid containing at least 90% of D-lactic acid unit at high temperatures, and have completed the present invention based on this finding.

That is, the present invention relates to a molded article comprising a polylactic acid (component B) that shows a proportion of melt peaks at 195° C. or higher to all melt peaks in a temperature rising process in measurement by a differential scanning calorimeter (DSC) of at least 20%.

Further, the present invention relates to a method for producing a molded article by molding pellets comprising a polylactic acid (component B) that shows a proportion of melt peaks at 195° C. or higher to all melt peaks in a temperature rising process in measurement by a differential scanning calorimeter (DSC) of at least 70%.

BEST MODE FOR CARRYING OUT THE INVENTION

First Embodiment

Resin Composition

Figure 1:
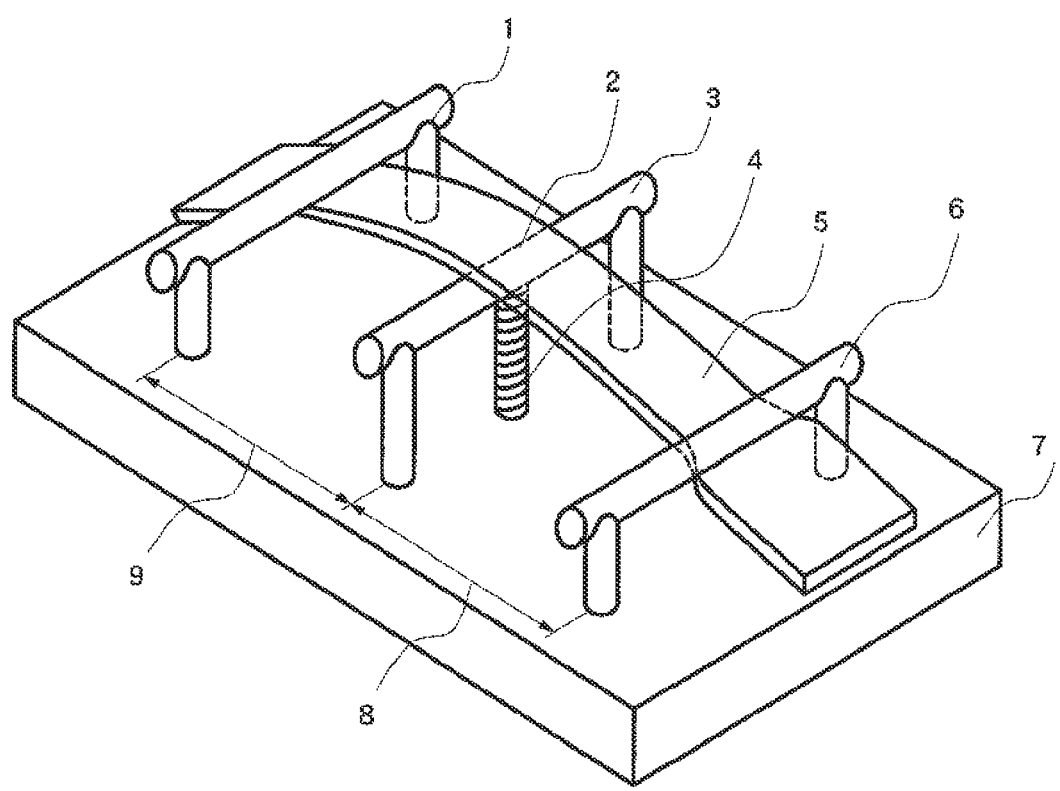
FIG. 1 is a perspective view of a jig for carrying out three-point bending that is used in a chemical resistance test 2 (automobile part).
(Explanations of Letters or Notations in FIG. 1)
1: First fixed bar (3.9 mmφ, (made of) stainless steel)
2: Center portion of the test piece
   (set on a top of the test piece which forms an arc)
3: Movable bar for distorted load
   (3.9 mmφ, (made of) stainless steel)
4: Screw for distored load
   (reaching a rear side of pedestal 7, turn a screw from the position where contacted with non-load test piece, and load pre-determined distortion to the test piece based on screw-pitch)
5: Test piece
6: Second fixed bar (3.9 mmφ, stainless steel)
7: Pedestal
8: Horizontal distance (50.0 mm) between a second fixed bar and a movable bar for distored load
9: Horizontal distance (50.0 mm) between a first fixed bar and a movable bar for distored load

A resin composition of the present invention is a resin composition comprising 100 parts by weight of thermoplastic resin (component A) and 1 to 200 parts by weight of polylactic acid (component B).
<Thermoplastic Resin: Component A>
The thermoplastic resin (component A) is preferably a polycarbonate resin, polyester resin, polyolefin resin or styrene resin. These may be used alone or in combination of two or more.
(Aromatic Polycarbonate Resin)
An aromatic polycarbonate resin (hereinafter may be simply referred to as "polycarbonate") is obtained by reacting a dihydric phenol with a carbonate precursor. Illustrative examples of the reaction method include interfacial polycondensation, melt transesterification, solid-phase transesterification of carbonate prepolymer, and ring-opening polymerization of cyclic carbonate compound. The component A is preferably the aromatic polycarbonate resin, particularly preferably a bisphenol-A-based aromatic polycarbonate resin.

Specific examples of the dihydric phenol include hydroquinone, resorcinol, 4,4'-biphenol, 1,1-bis(4-hydroxyphenyl)ethane, 2,2-bis(4-hydroxyphenyl)propane (commonly known as "bisphenol A"), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene, and 9,9-bis(4-hydroxy-3-methylphenyl)fluorene. Of these, bis(4-hydroxyphenyl)alkane, particularly bisphenol A (hereinafter may be abbreviated as "BPA"), is widely used.

In the present invention, in addition to the bisphenol-A-based polycarbonate which is a widely used polycarbonate, a special polycarbonate produced by using other dihydric phenol can also be used as the component A.

For example, a polycarbonate (homopolymer or copolymer) using, as apart or all of the dihydric phenol component, 4,4'-(m-phenylenediisopropylidene)diphenol (hereinafter may be abbreviated as "BPM"), 1,1-bis(4-hydroxyphenyl)cyclohexane, 1,1-bis(4-hydroxyphenyl)-3,3,5-trimethylcyclohexane (hereinafter may be abbreviated as "Bis-TMC"), 9,9-bis(4-hydroxyphenyl)fluorene and 9,9-bis(4-hydroxy-3-methylphenyl)fluorene (hereinafter may be abbreviated as "BCF"), is suited for applications in which requirements for a dimensional change caused by water absorption and morphological stability are particularly stringent. These dihydric phenols other than BPA are preferably used in an amount of 5 mol % or larger, particularly preferably 10 mol % or larger, of the whole dihydric phenol component constituting the polycarbonate.

In particular, when high rigidity and better hydrolysis resistance are required, it is particularly suitable that the component A which constitutes the resin composition is any of the following copolymerized polycarbonates (1) to (3).
(1) copolymerized polycarbonate in which BPM accounts for 20 to 80 mol % (more suitably 40 to 75 mol %, much more suitably 45 to 65 mol %) and BCF accounts for 20 to 80 mol % (more suitably 25 to 60 mol %, much more suitably 35 to 55 mol %) out of 100 mol % of the dihydric phenol component constituting the polycarbonate.
(2) copolymerized polycarbonate in which BPA accounts for 10 to 95 mol % (more suitably 50 to 90 mol %, much more suitably 60 to 85 mol %) and BCF accounts for 5 to 90 mol % (more suitably 10 to 50 mol %, much more suitably to 40 mol %) out of 100 mol % of the dihydric phenol component constituting the polycarbonate.
(3) copolymerized polycarbonate in which BPM accounts for 20 to 80 mol % (more suitably 40 to 75 mol %, much more suitably 45 to 65 mol %) and Bis-TMC accounts for to 80 mol % (more suitably 25 to 60 mol %, much more suitably 35 to 55 mol %) out of 100 mol % of the dihydric phenol component constituting the polycarbonate.

These special polycarbonates may be used alone or in admixture of two or more as appropriate. Further, these may be used as a mixture with the widely used bisphenol A based polycarbonate.

Production methods and characteristics of these special polycarbonates are described in detail in, for example, Japanese Patent Laid-Open Publication Nos. 6-172508, 8-27370, 2001-55435 and 2002-117580.

Of the above various polycarbonates, polycarbonates having a water absorption percentage and Tg (glass transition temperature) within the following ranges as a result of adjustment of copolymerization composition and the like are particularly suitable in fields in which morphological stability is required, because the polymers have good hydrolysis resistance and undergo exceptionally small warpage after molding.
(i) polycarbonate having a water absorption percentage of 0.05 to 0.15 wt %, preferably 0.06 to 0.13 wt %, and a Tg of 120 to 180° C., or
(ii) polycarbonate having a Tg of 160 to 250° C., preferably 170 to 230° C., and a water absorption percentage of 0.10 to 0.30 wt %, preferably 0.13 to 0.30 wt %, more preferably 0.14 to 0.27 wt %.

The water absorption percentage of the polycarbonate is a value obtained by measuring the moisture percentage of a disk-shaped test piece having a diameter of 45 mm and a thickness of 3.0 mm after immersing the test piece in water at 23° C. for 24 hours in accordance with ISO62-1980. Further, Tg (glass transition temperature) is a value obtained by differential scanning calorimeter (DSC) measurement according to JIS K7121.

Meanwhile, as the carbonate precursor, carbonyl halide, carbonate ester or haloformate is used. Specific examples thereof include phosgene, diphenyl carbonate, and dihaloformate of dihydric phenol.

When the polycarbonate is produced from the above dihydric phenol and carbonate precursor by interfacial polymerization, a catalyst, a terminal blocking agent, an antioxidant for preventing oxidation of the dihydric phenol, and the like may be used as required. Further, the polycarbonate may be a branched polycarbonate copolymerized with a polyfunctional aromatic compound having three or more functional groups. Illustrative examples of the polyfunctional aromatic compound having three or more functional groups include 1,1,1-tris(4-hydroxyphenyl)ethane and 1,1,1-tris(3,5-dimethyl-4-hydroxyphenyl)ethane.

When the polyfunctional compound that produces the branched polycarbonate is contained, the amount thereof is 0.001 to 1 mol %, preferably 0.005 to 0.9 mol %, particularly preferably 0.01 to 0.8 mol %, based on the total amount of the polycarbonate. Further, in the case of melt transesterification in particular, a branched structure may be produced as a side reaction, and the amount of the branched structure is 0.001 to 1 mol %, preferably 0.005 to 0.9 mol %, particularly preferably 0.01 to 0.8 mol %, based on the total amount of the polycarbonate. The amount of the branched structure can be calculated by $^1$H-NMR measurement.

Further, the aromatic polycarbonate resin as the component A in the resin composition of the present invention may be a polyester carbonate copolymerized with an aromatic or aliphatic (including alicyclic) difunctional carboxylic acid, a copolymerized polycarbonate copolymerized with a difunctional alcohol (including alicyclic), or a polyester carbonate copolymerized with the di functional carboxylic acid and the difunctional alcohol. Further, the aromatic polycarbonate resin may be a mixture of two or more of polycarbonates obtained.

The above aliphatic difunctional carboxylic acid is preferably α,ω-dicarboxylic acid. Preferred examples of the aliphatic difunctional carboxylic acid include linear saturated aliphatic dicarboxylic acids such as sebacic acid (decanedioic acid), dodecanedioic acid, tetradecanedioic acid, octadecanedioic acid and icosanedioic acid, and alicyclic dicarboxylic acids such as cyclohexane dicarboxylic acid. As the difunctional alcohol, an alicyclic diol is more suitable. Illustrative examples thereof include cyclohexane dimethanol, cyclohexane diol, and tricyclodecane dimethanol.

Further, in the present invention, as the component A, a polycarbonate-polyorganosiloxane copolymer copolymerized with a polyorganosiloxane unit can also be used.

The aromatic polycarbonate resin as the component A may be a mixture of two or more of various polycarbonates such as the above polycarbonates comprising different dihydric phenols, polycarbonates containing branch components, polyester carbonates and polycarbonate-polyorganosiloxane copolymer. Further, a mixture of two or more of polycarbonates produced by different methods, polycarbonates using different terminal blocking agents and the like can also be used.

Reaction methods such as interfacial polymerization, melt transesterification, solid-phase transesterification of carbonate prepolymer and ring-opening polymerization of cyclic carbonate compound which are production methods of the polycarbonate are methods which are well known by various literatures and patent publications.

The viscosity average molecular weight of the aromatic polycarbonate resin as the component A is not limited. However, when the viscosity average molecular weight is lower than 10,000, strength and the like deteriorate, while when it is higher than 50,000, moldability deteriorates. Thus, the viscosity average molecular weight is preferably 10,000 to 50,000, more preferably 12,000 to 30,000, much more preferably 14,000 to 28,000. In this case, it is also possible to mix a polycarbonate whose viscosity average molecular weight is out of the above range as long as moldability and the like are retained. For example, a high-molecular-weight polycarbonate component whose viscosity average molecular weight is higher than 50,000 may be mixed in.

The viscosity average molecular weight in the present invention is determined in the following manner. First, specific viscosity ($\eta_{sp}$) calculated by the following formula:

Specific Viscosity($\eta_{sp}$)=$(t-t_0)/t_0$

[$t_0$ is the number of seconds for dropping methylene chloride, t is the number of seconds for dropping sample solution],
is determined from a solution prepared by dissolving 0.7 g of aromatic polycarbonate in 100 ml of methylene chloride at 20° C. by using an Ostwald viscometer.

Viscosity average molecular weight (M) is calculated from the determined specific viscosity ($\eta_{sp}$) by the following formula:

$\eta_{sp}/c=[\eta]+0.45\times[\eta]^2 c$ ([η] is limiting viscosity.)

$[\eta]=1.23\times10^{-4}M^{0.83}$ $c=0.7$

The viscosity average molecular weight in the resin composition of the present invention is measured in the following manner. That is, the resin composition is dissolved in methylene chloride whose weight is 20 to 30 times the weight of the resin composition, and a soluble part is collected by sellite filtration. Then, the solution is removed from the soluble part which is then fully dried to obtain a solid of the methylene chloride soluble part. Specific viscosity ($\eta_{sp}$) at 20° C. is determined from a solution prepared by dissolving 0.7 g of the solid in 100 ml of methylene chloride by using an Ostwald viscometer, and its viscosity average molecular weight M is calculated by the above formula.

As the aromatic polycarbonate resin which is the component A, recycled aromatic polycarbonate resins can also be used. In that case, the proportion of low environmental burden components including the component B which is a substitute material for oil resource material increases, and the resin composition becomes a more preferred material in terms of environmental burden reducing effect. The recycled aromatic polycarbonate resin is a resin recovered at least from a resin molded article formed by a processing step for producing a target product without going through a decomposition step of the polymer. Illustrative examples thereof include resin molded articles separated and recovered from used products, resin molded articles separated and recovered from defective products, and resin molded articles comprising unwanted parts such as spurs and runners produced at the time of molding. The decomposition step refers to a step intended to decompose bonds that form the main chain of the aromatic polycarbonate and collect monomers and oligomers that result from the decomposition and does not refer to thermal decomposition in steps intended for kneading, crushing and processing.

A recycled aromatic polycarbonate that comprises preferably at least 90 wt %, more preferably at least 95 wt %, much more preferably at least 98 wt % of aromatic polycarbonate component out of 100 wt % of resin material is used.

Preferred examples of the used products include various glazing materials typified by soundproof walls, glass windows, translucent roof materials and automobile sliding roofs, transparent members such as windshields and automobile headlamp lenses, containers such as water bottles, and optical recording media. These do not contain large amounts of additives or other resins, and a target quality is obtained easily and stably. In particular, a molded article comprising a hard coating laminated on the surface of a transparent polycarbonate molded article is exemplified as a preferred aspect. The reason is that the molded article is often colored by the influence of hard coating agent while having good transparency. Specific examples of the molded article include various glazing materials and transparent members such as windshields and automobile headlamps.

Further, as the recycled aromatic polycarbonate resin, crushed pieces of unwanted resin molded article and pellets produced by melt-extruding the crushed pieces again can be used. Further, when the resin molded article has a printed coating film, sticker, label, decorative coating film or conductive coating film or has been subjected to conductive plating, metal deposition or the like, crushed pieces having the covered portion removed (the resin molded article may be crushed after removal of the covered portion or the covered portion may be removed after crushing of the resin molded article) and pellets produced by melt-extruding the crushed pieces can be used. When the printed coating film or the like is included, the effect of the present invention is not exerted sufficiently with ease because the crushed pieces or pellets are liable to be colored by the influence of the printed coating film or the like. Accordingly, it is preferable to remove the printed coating film or the like. Illustrative examples of a method of removing the printed coating film, plating or the like include a method of extending the resin molded article under pressure between two rolls, a method of bringing the resin molded article into contact with heated/pressurized water, various solvents, an acid/alkaline aqueous solution or the like, a method of mechanically scraping the portion to be removed, a method of irradiating the resin molded article with ultrasound, and a method of subjecting the resin molded article to a blast treatment. It is also possible to use these methods in combination.

Meanwhile, in the case of a molded article comprising a hard coating laminated on the surface of a transparent polycarbonate molded article, it is more efficient and leads to a reduction in environmental burdens to add crushed pieces as they are because good color can be attained. The crushed pieces can be produced by crushing the molded article by use of a known crusher.

The content of the recycled aromatic polycarbonate resin is preferably at least 5 wt %, more preferably at least 10 wt %, much more preferably at least 15 wt %, out of 100 wt % of the aromatic polycarbonate resin which is the component A. Although the upper limit may be set at 100 wt %, it is preferably 50 wt % or lower from a practical standpoint because a resin composition having stable properties is obtained.

(Polyester Resin)

A polyester resin used in the present invention is a polymer or copolymer obtained by polycondensation of a dicarboxylic acid or ester forming derivative thereof with a diol or polycondensation of a hydroxycarboxylic acid or ester forming derivative thereof and is thermoplastic polyester resins other than polylactic acids.

Illustrative examples of the dicarboxylic acid or ester forming derivative thereof include aromatic dicarboxylic acids such as terephthalic acid, isophthalic acid, orthophthalic acid, 5-sodium sulfoisophthalic acid, 2,6-naphthalene dicarboxylic acid, 2,7-naphthalene dicarboxylic acid, 4,4'-biphenyl dicarboxylic acid, bis(p-carboxyphenyl)methane, 4,4'-stilbene carboxylic acid, 4,4'-diphenyl ether dicarboxylic acid, anthracene dicarboxylic acid and ethylene-bis-p-benzoic acid; aliphatic dicarboxylic acids such as oxalic acid, succinic acid, adipic acid, sebacic acid, azelaic acid, dodecanedioic acid, malonic acid and glutaric acid; and alicyclic dicarboxylic acids such as 1,4-cyclohexane dicarboxylic acid and dimethyl esters thereof. These dicarboxylic acids can be used alone or in admixture of two or more. Of these, terephthalic acid and 2,6-naphthalene dicarboxylic acid and dimethyl esters thereof can be preferably used.

Illustrative examples of the diol include aliphatic diols such as ethylene glycol, propylene glycol, 1,3-propanediol, 1,4-butanediol, 1,5-pentanediol, neopentyl glycol, 1,6-hexanediol and decamethylene glycol; alicyclic diols such as 1,4-cyclohexane dimethanol and 1,3-cyclohexane dimethanol; and dihydric phenols such as p-xylenediol and bisphenol A. Further, one or more long-chain diols having a molecular weight of 400 to 6,000 such as polyethylene glycol, poly-1,3-propylene glycol and polytetramethylene glycol may be copolymerized. These diol components can be used alone or in admixture of two or more. Of these, ethylene glycol, 1,3-propanediol and 1,4-butanediol can be preferably used.

Further, illustrative examples of the hydroxycarboxylic acid include aliphatic hydroxycarboxylic acids such as glycolic acid, hydroxypropionic acid, hydroxybutyric acid, hydroxyvaleric acid and hydroxycaproic acid, and ester forming derivatives thereof; and aromatic hydroxycarboxylic acids such as p-hydroxybenzoic acid and 6-hydroxy-2-naphthoic acid, and ester forming derivatives thereof. Further, condensed cyclic esters of aliphatic hydroxycarboxylic acids such as glycolade and caprolactone can also be used. These hydroxycarboxylic acid components can be used alone or in admixture of two or more.

Specific examples of polymers or copolymers comprising combinations of these monomers include aromatic polyesters such as polyethylene terephthalate, polyethylene (terephthalate/isophthalate), polypropylene terephthalate, polypropylene (terephthalate/isophthalate), polybutylene terephthalate, polybutylene (terephthalate/isophthalate), polyethylene naphthalate, polypropylene naphthalate, polybutylene naphthalate, polyethylene (terephthalate/succinate), polyethylene (terephthalate/adipate), polyethylene (terephthalate/sebacate), polypropylene (terephthalate/succinate), polypropylene (terephthalate/adipate), polypropylene (terephthalate/sebacate), polybutylene (terephthalate/succinate), polybutylene (terephthalate/adipate), polybutylene (terephthalate/sebacate), and cyclohexane dimethanol copolymerized polyethylene terephthalate; aliphatic polyesters such as polyethylene oxalate, polypropylene oxalate, polybutylene oxalate, polyneopentyl glycol oxalate, polyethylene succinate, polypropylene succinate, polybutylene succinate, polybutylene adipate, polypropylene adipate, polyethylene adipate, polybutylene (succinate/adipate), polypropylene (succinate/adipate), polyethylene (succinate/adipate), polyhydroxyalkanoate, polycaprolactone, and polyglycolic acid; aliphatic polyester carbonates such as polybutylene succinate.carbonate; and liquid crystalline polyesters such as p-oxybenzoic acid/polyethylene terephthalate and p-oxybenzoic acid/6-oxy-2-naphthoic acid.

Of these, particularly preferred polyester resins are polyethylene terephthalate, polypropylene terephthalate, polybutylene terephthalate, cyclohexane dimethanol copolymerized polyethylene terephthalate, polyethylene naphthalate, polybutylene naphthalate, and the like.

The aromatic polyester is produced by polymerizing a dicarboxylic acid or ester forming derivative thereof with a diol or ester forming derivative thereof under heating in the presence of a polycondensation catalyst containing titanium, germanium, antimony or the like in accordance with a conventional procedure and discharging by-produced water or lower alcohol out of the system.

Illustrative examples of a germanium-containing polymerization catalyst include an oxide, hydroxide, halide, alcoholate and phenolate of germanium. Specific examples thereof include germanium oxide, germanium hydroxide, germanium tetrachloride, and tetramethoxygermanium. Preferred specific examples of an organotitanium compound that is a titanium-containing polymerization catalyst include titanium tetrabutoxide, titanium isopropoxide, titanium oxalate, titanium acetate, titanium benzoate, titanium trimellitate, and a reaction product of tetrabutyl titanate and trimellitic anhydride. The organotitanium compound is preferably used in such an amount that its titanium atom is 3 to 12 mg atomic percentage based on the acid component constituting the aromatic polyester.

Further, it is possible to use a compound of manganese, zinc, calcium, magnesium or the like that is used in a transesterification reaction which is a preliminary step for conventionally known polycondensation in combination with the above catalyst, and it is also possible to carry out polycondensation after deactivating the catalyst by a compound of phosphoric acid or phosphorous acid after completion of the transesterification reaction. The aromatic polyester can be produced by either of a batch method and a continuous polymerization method. Further, an aromatic polyester obtained may contain various stabilizers and modifiers.

(Styrene Resin)

Illustrative examples of a styrene resin used in the present invention include styrene hard resins composed essentially of aromatic vinyl compounds, and styrene rubbery resins comprising rubbery polymers.

The styrene hard resin in the present invention refers to a polymer or copolymer of aromatic vinyl compounds and a polymer obtained by copolymerizing the aromatic vinyl compounds with other vinyl monomers that can be copolymerized with the aromatic vinyl compounds. The styrene hard resin has a glass transition temperature of at least 40° C. in the case of an amorphous resin and has a melting point of at least 40° C. in the case of a crystalline resin. These glass transition temperature and melting point can be determined by differential scanning calorimeter (DSC) measurement according to JIS K7121.

Illustrative examples of the above aromatic vinyl compound include styrene, α-methylstyrene, o-methylstyrene, p-methylstyrene, vinylxylene, ethylstyrene, dimethylstyrene, p-t-butylstyrene, vinylnaphthalene, methoxystyrene, monobromstyrene, dibromstyrene, fluorostyrene, and tribromstyrene. Styrene is particularly preferred.

Preferred examples of the other vinyl monomers that can be copolymerized with the above aromatic vinyl compounds include vinyl cyanide compounds and (meth)acrylic ester compounds. Illustrative examples of the vinyl cyanide compounds include acrylonitrile and methacrylonitrile, and acrylonitrile is particularly preferred. Illustrative examples of the (meth)acrylic ester compounds include methyl (meth)acrylate, ethyl (meth)acrylate, propyl (meth)acrylate, isopropyl (meth)acrylate, butyl (meth)acrylate, amyl (meth)acrylate, hexyl (meth)acrylate, octyl (meth)acrylate, 2-ethylhexyl (meth)acrylate, cyclohexyl (meth)acrylate, dodecyl (meth) acrylate, octadecyl (meth)acrylate, phenyl (meth)acrylate, and benzyl (meth)acrylate. The expression "(meth)acrylate" includes both methacrylate and acrylate, and the expression "(meth)acrylic ester" includes both methacrylic ester and acrylic ester. A particularly suitable (meth)acrylic ester compound is methyl methacrylate.

Further, illustrative examples of the other vinyl monomers that can be copolymerized with the aromatic vinyl compounds other than the vinyl cyanide compounds and the (meth)acrylic ester compounds include epoxy-group-containing methacrylic esters such as glycidyl methacrylate; maleimide monomers such as maleimide, N-methyl maleimide and N-phenyl maleimide; and α,β-unsaturated carboxylic acids and anhydrides thereof such as acrylic acid, methacrylic acid, maleic acid, maleic anhydride, phthalic acid, and itaconic acid.

Illustrative examples of suitable styrene hard resins include a polystyrene, MS copolymer, AS copolymer, MAS copolymer and SMA copolymer. The MS copolymer is a copolymer composed essentially of methyl methacrylate and styrene. The AS copolymer is a copolymer composed essentially of acrylonitrile and styrene. The MAS copolymer is a copolymer composed essentially of methyl methacrylate, acrylonitrile and styrene. The SMA copolymer is a copolymer composed essentially of styrene and maleic anhydride (MA). Of these, the AS copolymer is particularly preferred.

The AS copolymer may be produced by any of bulk polymerization, solution polymerization, suspension polymerization and emulsion polymerization methods, but it is preferably produced by the bulk polymerization or suspension polymerization method. The AS copolymer is most preferably produced by the bulk polymerization method, and the polymerization method is the most common in the industry. Further, the copolymerization method may be single-step copolymerization or multistep copolymerization. The weight average molecular weight of the AS copolymer is 40,000 to 200,000 in terms of standard polystyrene by GPC measurement. While its lower limit is more preferably 50,000, much more preferably 70,000, its upper limit is more preferably 160,000, much more preferably 150,000.

The styrene rubbery resin refers to a polymer comprising a rubber component having a glass transition temperature of 10° C. or lower, preferably −10° C. or lower, more preferably −30° C. or lower, and a copolymer comprising the polymer comprising the rubber component and other polymer chain bonded to the polymer. It also refers to a polymer containing the rubber component in an amount of at least 35 wt %, more preferably 45 wt %, based on 100 wt % of the rubbery polymer. An appropriate upper limit of the content of the rubber component is around 90 wt % from a practical standpoint.

The styrene rubbery resin in the present invention is more suitably a copolymer having other polymer chain bonded thereto. It is widely known that in production of a rubbery polymer comprising a rubber component to which other polymer chain is grafted, a polymer or copolymer which is not grafted to the rubber component exists in no small amount. The styrene rubbery resin in the present invention may contain such a free polymer or copolymer.

Illustrative examples of the styrene rubbery resin in the present invention include an SB (styrene-butadiene) copolymer, ABS (acrylonitrile-butadiene-styrene) copolymer, MBS (methyl methacrylate-butadiene-styrene) copolymer, MABS (methyl methacrylate-acrylonitrile-butadiene-styrene) copolymer, MB (methyl methacrylate-butadiene) copolymer, ASA (acrylonitrile-styrene-acrylic rubber) copolymer, AES (acrylonitrile-ethylene propylene rubber-styrene) copolymer, MA (methyl methacrylate-acrylic rubber) copolymer, MAS (methyl methacrylate-acrylic rubber-styrene) copolymer, methyl methacrylate-acryl.butadiene rubber copolymer, methyl methacrylate-acryl.butadiene rubber-styrene copolymer, and methyl methacrylate-(acryl.silicone IPN rubber) copolymer. These copolymers are preferably core-shell-type graft copolymers in which polymer chains comprising the above monomers are bonded to a polymer comprising a rubber component as a core.

Of these, the acrylonitrile-butadiene-styrene copolymer (ABS copolymer) is particularly preferred. The ABS copolymer in the present invention preferably has a rubber particle diameter of 0.1 to 5.0 μm, more preferably 0.2 to 3.0 μm, particularly preferably 0.2 to 1.5 μm. The ABS copolymer may have simple rubber particle diameter distribution or rubber particle diameter distribution having two or more uplifts. Further, as to its morphology, the rubber particles may form a simple phase or may have a salami structure by containing an occlusion phase around the particles.

The weight ratio (graft ratio (wt %)) of the grafted vinyl cyanide compound and aromatic vinyl compound to the diene rubber component is preferably 10 to 100%, more preferably 15 to 70%, much more preferably 15 to 40%.

The ABS copolymer may be produced by any of bulk polymerization, suspension polymerization and emulsion polymerization, but it is preferably produced by suspension polymerization or bulk polymerization. Further, in the production method, an AS copolymer that is not grafted to the diene rubber is produced in no small amount. Therefore, the ABS copolymer is generally produced as a mixture with the AS copolymer.

(Polyolefin Resin)

A polyolefin resin used in the present invention is a polymer of one or more α-olefins such as ethylene, propylene, 1-butene, 3-methyl-1-butene, 1-pentene, 4-methyl-1-pentene, 1-hexene, and 5-methyl-1-hexene. Alternatively, a mixture of two or more of these polymers can also be used.

The polyolefin resin in the present invention may be copolymerized with other copolymerizable monomer components. Illustrative examples of the copolymerizable components include diene compounds, α,β-unsaturated carboxylic acid derivatives, styrene compounds, and vinyl acetate derivatives. Specific examples of the copolymerizable components include acrylic acid, methacrylic acid, maleic acid, fumaric acid, itaconic acid, crotonic acid, methyl maleic acid, methyl fumaric acid, mesaconic acid, citraconic acid, glutaconic acid, methyl acrylate, ethyl acrylate, butyl acrylate, 2-ethylhexyl acrylate, hydroxyethyl acrylate, methyl methacrylate, 2-ethylhexyl methacrylate, hydroxyethyl methacrylate, aminoethyl methacrylate, dimethyl maleate, dimethyl itaconate, sodium methacrylate, potassium methacrylate, magnesium methacrylate, zinc acrylate, maleic anhydride, itaconic anhydride, citraconic anhydride, glycidyl acrylate, and glycidyl methacrylate.

Specific examples of the polyolefin resin include a polyethylene, polypropylene, ethylene-vinyl acetate copolymer, ethylene-ethyl acrylate copolymer, ethylene-acrylic acid copolymer, ethylene-methyl methacrylate copolymer, ethylene-α-olefin copolymer, ethylene-propylene copolymer, and propylene-butene copolymer. These may be used alone or in combination of two or more.

<Polylactic Acid: Component B>

The polylactic acid (component B) comprises a polylactic acid (component B-1) that comprises 90 to 100 mol % of L-lactic acid unit and 0 to 10 mol % of D-lactic acid unit and/or units other than lactic acid and a polylactic acid (component B-4) that comprises 90 to 100 mol % of D-lactic acid unit and 0 to 10 mol % of L-lactic acid unit and/or units other than lactic acid.

The component B-1 and the component B-4 are polylactic acids comprising an L-lactic acid unit and D-lactic acid unit represented by the following formula (i) as basic components.

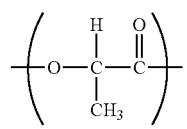

The weight average molecular weight of the polylactic acid (component B) is preferably 100,000 to 500,000, more preferably 100,000 to 300,000. The weight average molecular weight is a weight average molecular weight value in terms of standard polystyrene by gel permeation chromatography (GPC) measurement using chloroform as an eluent.

The component B comprises a component B-1, B-2 or B-3 composed essentially of the L-lactic acid unit and a component B-4, B-5 or B-6 composed essentially of the D-lactic acid unit.

(Poly-L-Lactic Acid)

The component B-1 is a polylactic acid comprising 90 to 100 mol % of the L-lactic acid unit and 0 to 10 mol % of the D-lactic acid unit and/or units other than lactic acid. The component B-2 is a polylactic acid comprising 90 to 99 mol % of the L-lactic acid unit and 1 to 10 mol % of the D-lactic acid unit and/or units other than lactic acid. The component B-3 is a polylactic acid comprising higher than 99 mol % to not higher than 100 mol % of the L-lactic acid unit and 0 mol % or higher to lower than 1 mol % of the D-lactic acid unit and/or units other than lactic acid. Therefore, the component B-1 includes the component B-2 and the component B-3. These may be referred to as "poly-L-lactic acid".

(Poly-D-Lactic Acid)

The component B-4 is a polylactic acid comprising 90 to 100 mol % of the D-lactic acid unit and 0 to 10 mol % of the L-lactic acid unit and/or units other than lactic acid. The component B-5 is a polylactic acid comprising 90 to 99 mol % of the D-lactic acid unit and 1 to 10 mol % of the L-lactic acid unit and/or units other than lactic acid. The component B-6 is a polylactic acid comprising higher than 99 mol % to not higher than 100 mol % of the D-lactic acid unit and 0 mol % or higher to lower than 1 mol % of the L-lactic acid unit and/or units other than lactic acid. Therefore, the component B-4 includes the component B-5 and the component B-6. These may be referred to as "poly-D-lactic acid".

The polylactic acid (component B) preferably comprises a specific combination of the poly-L-lactic acid and the poly-D-lactic acid. That is, the polylactic acid (component B) preferably comprises the component B-1 and the component B-4 in a weight ratio (component B-1/component B-4) of 10/90 to 90/10.

The polylactic acid (component B):
(1) preferably comprises the component B-1 and the component B-5 in a weight ratio (component B-1/component B-5) of 10/90 to 90/10, or
(2) preferably comprises the component B-4 and the component B-2 in a weight ratio (component B-4/component B-2) of 10/90 to 90/10.

The polylactic acid (component B) particularly preferably comprises:
(1) a combination of the component B-2 and the component B-5 in a weight ratio (component B-2/component B-5) of 10/90 to 90/10 (combination 1), (2) a combination of the component B-3 and the component B-5 in a weight ratio (component B-3/component B-5) of 10/90 to 90/10 (combination 2), or
(3) a combination of the component B-6 and the component B-2 in a weight ratio (component B-6/component B-2) of 10/90 to 90/10 (combination 3).

The above particularly preferable combinations are summarized below.

|  | Polylactic Acids | Components (mol %) |
| --- | --- | --- |
| Combination 1: | B-2 | 90 ≤ [L] ≤ 99 |
|  | B-5 | 90 ≤ [D] ≤ 99 |
| Combination 2: | B-3 | 99 < [L] ≤ 100 |
|  | B-5 | 90 ≤ [D] ≤ 99 |
| Combination 3: | B-2 | 90 ≤ [L] ≤ 99 |
|  | B-6 | 99 < [D] ≤ 100 |

[L]: L-lactic acid unit
[D]: D-lactic acid unit

As can be understood from the above description, a combination of the component B-3 and the component B-6 is excluded from the above particularly preferable combinations.

The weight ratio of the poly-L-lactic acid to the poly-D-lactic acid (poly-L-lactic acid/poly-D-lactic acid) in the polylactic acid (component B) is 10/90 to 90/10. To form more stereocomplexes, the weight ratio is preferably 25/75 to 75/25, more preferably 40/60 to 60/40. When the weight ratio of one of the polymers is lower than 10 or higher than 90, homocrystallization is prioritized, thereby making formation of the stereocomplex difficult disadvantageously.

As the copolymerizable components other than lactic acid in the polylactic acid (component B), units derived from a dicarboxylic acid, polyhydric alcohol, hydroxycarboxylic acid, lactone or the like that has two or more ester-bond-formable functional groups and units derived from various polyesters, various polyethers, various polycarbonates or the like that comprise the above various constituents can be used alone or in admixture of two or more.

Illustrative examples of the dicarboxylic acid include succinic acid, adipic acid, azelaic acid, sebacic acid, terephthalic acid, and isophthalic acid. Illustrative examples of the polyhydric alcohol include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol, and aromatic polyhydric alcohols such as one resulting from addition of ethylene oxide to bisphenol. Illustrative examples of the hydroxycarboxylic acid include glycolic acid and hydroxybutyl carboxylic acid. Illustrative examples of the lactone include glycolide, ε-caprolactone glycolide, s-caprolactone, β-propiolactone, δ-butyrolactone, β- or γ-butyrolactone, pivalolactone, and δ-valerolactone.

(Production of Poly-L-Lactic Acid or Poly-D-Lactic Acid)

The poly-L-lactic acid or poly-D-lactic acid can be produced by a known polylactic acid polymerization method. For example, they can be produced by a method such as ring-opening polymerization of lactide, dehydration and condensation of lactic acid, or a combination of these methods with solid-phase polymerization.

When the poly-L-lactic acid or poly-D-lactic acid is produced, a lactide that is a cyclic dimer of lactic acid may be produced as a by-product. Each polylactic acid may contain the lactide in an amount that does not impair the stability of the resin. After completion of polymerization of the polylactic acid, the lactide contained in the polylactic acid is preferably removed from the polylactic acid by a method of removing it in molten state under reduced pressure, a method of extracting and removing it by use of a solvent, or other method, so as to improve the thermal stability of the resin. The content of the lactide in the polylactic acid is not higher than 2%, preferably not higher than 1%, more preferably not higher than 0.5%, based on the polylactic acid.

The poly-L-lactic acid or poly-D-lactic acid may contain a catalyst for the polymerization in an amount that does not impair the thermal stability of the resin. Illustrative examples of such a catalyst include various tin compounds, aluminum compounds, titanium compounds, zirconium compounds, calcium compounds, organic acids, and inorganic acids. Illustrative examples of such a catalyst further include fatty acid salts of tin, aluminum, zirconium and titanium, and, carbonates, sulfates, phosphates, oxides, hydroxides, halides and alcoholates of these metals, or these metals themselves. Specific examples thereof include tin octylate, aluminum acetylacetonate, aluminum alkoxide, titanium alkoxide, and zirconium alkoxide. After completion of the polymerization reaction of the polylactic acid, the polymerization catalyst contained in the poly-L-lactic acid or poly-D-lactic acid is preferably removed or deactivated by a method of extracting and removing it by use of a solvent, a method of causing to coexist a known stabilizer that deactivates the catalyst or other method, so as to improve the thermal stability of the resin.

(Formation of Stereocomplex)

The poly-L-lactic acid and poly-D-lactic acid may be mixed with the thermoplastic resin (component A) and other components to produce the resin composition.

However, before mixed with the thermoplastic resin (component A) and other components, the poly-L-lactic acid and the poly-D-lactic acid are preferably caused to coexist and heat-treated to form a stereocomplex.

The heat treatment is preferably carried out with the poly-L-lactic acid (components B-1 to B-3) and the poly-D-lactic acid (components B-4 to B-6) coexisting in a weight ratio of 10/90 to 90/10 and kept in a temperature range of 245 to 300° C. The heat treatment temperature is more preferably 270 to 300° C., much more preferably 280 to 290° C. If it exceeds 300° C., it becomes difficult to inhibit a decomposition reaction disadvantageously. Although not particularly limited, the heat treatment time is 0.2 to 60 minutes, preferably 1 to 20 minutes. The heat treatment can be carried out in an inert atmosphere at normal pressure or under reduced pressure.

The heat treatment can be carried out by melt-kneading the poly-L-lactic acid and the poly-D-lactic acid. The heat treatment is preferably carried out by a method comprising mixing given amounts of the poly-L-lactic acid and the poly-ID-lactic acid in the form of fine particles or chips together and then melt-kneading them. Further, it is also possible to melt one of the poly-L-lactic acid and the poly-D-lactic acid, add the other polymer and knead them. In the heat treatment, the poly-L-lactic acid and the poly-D-lactic acid are preferably mixed together as uniformly as possible.

Although the size of the fine particles or chips is not particularly limited as long as the fine particles or chips of the poly-L-lactic acid and poly-D-lactic acid are mixed uniformly, they preferably have a size of not larger than 3 mm, more preferably 1 to 0.25 mm. When they are mixed together in the form of fine particles or chips, a tumbler-type powder blender, a continuous powder blender, various milling machines or the like can be used.

To melt-knead the poly-L-lactic acid (components B-1 to B-3) and the poly-D-lactic acid (components B-4 to B-6), a batch-type reactor having stirring blades, a continuous reactor or a twin-screw or single-screw extruder can be used.

Further, after the poly-L-lactic acid and the poly-D-lactic acid are mixed together in the presence of a solvent, the mixture may be obtained by reprecipitating it or by removing the solvent by heating. When they are mixed together in the presence of a solvent, it is preferable to mix separate solutions prepared by dissolving the poly-L-lactic acid and the poly-D-lactic acid in a solvent, respectively, or to mix the poly-L-lactic acid and the poly-D-lactic acid by dissolving them in a solvent together. The solvent is not particularly limited as long as the poly-L-lactic acid and the poly-D-lactic acid can be dissolved therein. As the solvent, chloroform, methylene chloride, dichloroethane, tetrachloroethane, phenol, tetrahydrofuran, N-methylpyrrolidone, N,N-dimethyl formamide, butyrolactone, trioxane, hexafluoroisopropanol or the like can be used alone or in admixture of two or more. Even if the solvent exists, the solvent evaporates by heating, and the heat treatment can be carried out in the presence of no solvent. The temperature elevation rate after evaporation of the solvent (heat treatment) is not particularly limited, but the heat treatment is preferably carried out in a short time since the polymers may be decomposed when heat-treated for a long time.

In the resin composition of the present invention, the content of the polylactic acid (component B) is 1 to 200 parts by weight, preferably 10 to 190 parts by weight, more preferably 20 to 180 parts by weight, based on 100 parts by weight of the thermoplastic resin (component A).

(Physical Properties of Resin Composition)

The resin composition of the present invention shows a proportion ($R_{195\ or\ higher}$) of melt peaks at 195° C. or higher to all melt peaks in a temperature rising process in measurement by a differential scanning calorimeter (DSC) of at least 20%, preferably at least 50%, more preferably at least 80%, much more preferably at least 90%, particularly preferably at least 95%. The larger the $R_{195\ or\ higher}$ is, the higher the hydrolysis resistance of a molded article becomes. High $R_{195\ or\ higher}$ indicates a high content of stereocomplex crystals. A polylactic acid having high $R_{195\ or\ higher}$ can be produced by melt-kneading the poly-L-lactic acid and the poly-D-lactic acid at high temperatures of 245 to 300° C.

The $R_{195\ or\ higher}$ is obtained as follows. A measurement is made by use of DSC in a nitrogen atmosphere at a temperature elevation rate of 20° C./min, and the proportion (%) of melt peaks at 195° C. or higher is calculated from a melt peak area at 195° C. or higher (high temperatures) and a melt peak area at 140 to 180° C. (low temperatures) in accordance with the following formula.

$$R_{195\ or\ higher}(\%) = A_{195\ or\ higher}/(A_{195\ or\ higher} + A_{140\ to\ 180}) \times 100$$

$R_{195\ or\ higher}$: proportion of melt peaks at 195° C. or higher
$A_{195\ or\ higher}$: melt peak area at 195° C. or higher
$A_{140\ to\ 180}$: melt peak area at 140 to 180° C.

When a DSC measurement is conducted on the resin composition of the present invention, a melt peak derived from the thermoplastic resin (component A) and melt peaks derived from the polylactic acid emerge at different positions, and they can be easily differentiated accordingly.

The resin composition of the present invention has a melting point of preferably 195 to 250° C., more preferably 200 to 220° C., and a fusion enthalpy of preferably at least 20 J/g, more preferably at least 30 J/g. The resin composition of the present invention preferably has an $R_{195\ or\ higher}$ of at least 30%, a melting point of 195 to 250° C. and a fusion enthalpy of at least 20 J/g.

The resin composition of the present invention has excellent heat resistance, hydrolysis resistance and chemical resistance, because it contains the polylactic acid having a high content of stereocomplex crystals and the thermoplastic resin. The retention of the viscosity average molecular weight of the resin composition of the present invention is preferably at least 30%, more preferably at least 60%, much more preferably at least 70%.

<Crystal Nucleating Agent: Component C>

The crystal nucleating agent (component C) used in the present invention is primarily a known compound which is commonly used as a crystal nucleating agent for crystalline resins such as polylactic acids and thermoplastic resins.

Illustrative examples thereof include inorganic fine particles such as talc, silica, graphite, carbon powder, pyroferrite, gypsum and neutral clay, metal oxides such as magnesium oxide, aluminum oxide and titanium dioxide, sulfate, phosphate, phosphonate, silicate, oxalate, stearate, benzoate, salicylate, tartrate, sulfonate, montan wax salt, montan wax ester salt, terephthalate, benzoate, and carboxylate.

Of these compounds which are used as the crystal nucleating agent (component C), talc is particularly effective. Talc having an average particle diameter of not larger than 20 μm is preferably used, and talc having an average particle diameter of not larger than 5 μm is more preferably used.

The content of the crystal nucleating agent cannot be determined uniformly, because an amount in which the crystal nucleating agent exhibits its effect differs according to the type and shape of the crystal nucleating agent. However, the content thereof is 0.01 to 5 parts by weight, preferably 0.05 to 3 parts by weight, more preferably 0.1 to 2 parts by weight, based on 100 parts by weight of the polylactic acid (component B). When the amount of the crystal nucleating agent added is too small, the effect of the crystal nucleating agent is not exhibited, while when it is too large, mechanical properties and the like may be adversely affected, not to mention that the effect of the crystal nucleating agent is not enhanced.

A method of adding the crystal nucleating agent (component C) is not particularly limited. However, it is preferable to add it after the poly-L-lactic acid and the poly-D-lactic acid are melt-kneaded to form a stereocomplex, because an adverse effect on formation of the stereocomplex is small.

<Inorganic Filler: Component D>

In the resin composition of the present invention, an inorganic filler (component D) can be added to improve mechanical properties, dimensional properties and the like.

As the inorganic filler (component D), generally known inorganic fillers can be used, such as glass fibers, carbon fibers, glass flakes, wollastonite, kaolin clay, mica, talc and various whiskers (such as potassium titanate whiskers and aluminum borate whiskers). The shape of the inorganic filler can be selected freely from fibrous, flaky, spherical and hollow shapes. For improvements in the strength and impact resistance of the resin composition, a fibrous or flaky inorganic filler is suitable.

In particular, the inorganic filler is suitably an inorganic filler comprising a ground natural mineral, more suitably an inorganic filler comprising a ground natural silicate and is preferably mica, talc or wollastonite in view of its shape.

Meanwhile, since these inorganic fillers are nonoil resource materials that will replace oil resource materials such as carbon fibers, use of these raw materials that cause lower environmental burdens emphasizes significance of use of the components B and C that cause low environmental burdens. Further, the above more suitable inorganic filler exerts an advantageous effect that it develops better flame retardancy than carbon fibers or the like.

The average particle diameter of the mica is a number average particle diameter calculated by number average of 1,000 particles having a size of at least 1 μm extracted by observation using a scanning electron microscope. The number average particle diameter is preferably 10 to 500 μm, more preferably 30 to 400 μm, much more preferably 30 to 200 most preferably 35 to 80 μm. When the number average particle diameter is smaller than 10 μm, impact strength may deteriorate. Meanwhile, when it is larger than 500 μm, impact strength improves, but the appearance is liable to deteriorate.

The thickness of the mica can be 0.01 to 10 preferably 0.1 to 5 μm, as thickness measured by observation using an electron microscope. The aspect ratio of the mica can be 5 to 200, preferably 10 to 100. The mica is preferably muscovite mica, and its Mohs hardness is about 3. The muscovite mica can achieve higher rigidity and higher strength and provides a more suitable molded article than other micas such as phlogopite.

Further, a method of milling the mica is a dry milling method of milling raw mica in a dry mill. Another method of milling the mica is a wet milling method comprising coarse-milling raw mica in a dry mill, adding a milling aid such as water, subjecting the resulting slurry to actual milling in a wet mill, and dehydrating and drying the resulting product. Although mica produced by either of the milling methods can be used, the dry milling method is less costly and more common. On the other hand, the wet milling method is effective for milling mica more thinly and finely, but is costly. The mica may be surface-treated with various surface treatment agents such as a silane coupling agent, higher fatty acid ester and wax and may be granulated by sizing agents such as various resins, higher fatty acid ester and wax.

Talc that can be used in the present invention is scale-like particles that have a layered structure and is hydrous magnesium silicate in terms of chemical composition. The talc is generally represented by a chemical formula $4SiO_2 \cdot 3MgO \cdot 2H_2O$ and generally contains 56 to 65 wt % of $SiO_2$, 28 to 35 wt % of MgO and about 5 wt % of $H_2O$. The talc also contains other components in small amounts, such as 0.03 to 1.2 wt % of $Fe_2O_3$, 0.05 to 1.5 wt % of $Al_2O_3$, 0.05 to 1.2 wt % of CaO, up to 0.2 wt % of $K_2O$, and up to 0.2 wt % of $Na_2O$. The talc has a specific viscosity of about 2.7 and a Mohs hardness of 1.

The average particle diameter of the talc is preferably 0.5 to 30 μm. The average particle diameter is a particle diameter at an accumulation rate of 50% which is determined from particle size distribution measured by an Andreasen pipette method measured in accordance with JIS M8016. The particle diameter of the talc is more preferably 2 to 30 μm, much more preferably 5 to 20 μm, most preferably 10 to 20 μm. Talc having a particle diameter of 0.5 to 30 μm provides not only rigidity and low anisotropy but also a good surface appearance and flame retardancy to the resin composition.

Further, a method of milling a raw stone to produce the talc is not particularly limited, and axial-flow milling, annular milling, roll milling, ball milling, jet milling and container-rotating compression shear milling can be used. Further, milled talc is suitably classified by various classifiers to achieve uniform particle size distribution. The classifiers are not particularly limited. Illustrative examples thereof include impactor-type inertial classifiers (such as a variable impactor), inertial classifiers using the Coanda effect (such as an elbow jet), and centrifugal classifiers (such as a multistage cyclone, Microplex, dispersion separator, AccuCut, turbo classifier, Turboplex, micron separator, and super separator).

Further, the talc is preferably in an aggregated state in view of ease of its handling or the like. Illustrative examples of a method of producing aggregated talc include a method of compressing the talc by deaeration, and a method of compressing the talc by use of a sizing agent. In particular, the method of compressing the talc by deaeration is preferred because it is easy to practice and prevents unwanted sizing agent resin components from being mixed into the molded article of the present invention.

Further, wollastonite that can be used in the present invention is virtually represented by a chemical formula $CaSiO_3$ and generally contains at least about 50 wt % of $SiO_2$ and at least about 47 wt % of CaO, in addition to $Fe_2O_3$ and $Al_2O_3$. The wollastonite is white needle-like powder obtained by milling and classifying rough wollastonite and has a Mohs hardness of about 4.5. The average fiber diameter of the wollastonite is preferably 0.5 to 20 μm, more preferably 0.5 to 10 μm, most preferably 1 to 5 μm. The average fiber diameter is calculated by number average of 1,000 fibers having a fiber diameter of at least 0.1 μm extracted by observation using a scanning electron microscope.

Some of these inorganic fillers can serve as the crystal nucleating agent which is the component C. However, they are considered as the inorganic filler (component D) when used to improve mechanical properties and the like.

The content of the inorganic filler (component D) is preferably 0.3 to 200 parts by weight, more preferably 1 to 100 parts by weight, much more preferably 3 to 50 parts by weight, based on 100 parts by weight of the thermoplastic resin (component A). When the content of the component D is lower than 0.3 parts by weight, its effect of reinforcing the mechanical properties of the molded article is not sufficient, while when it is higher than 200 parts by weight, moldability and color deteriorate disadvantageously.

<Terminal Blocking Agent: Component E>

In the resin composition of the present invention, when a terminal blocking agent (component E) is contained, hydrolysis resistance can be improved.

The terminal blocking agent (component E) reacts with some or all of carboxyl group terminals of the polylactic acid (component B) in the resin composition of the present invention to block them. Illustrative examples thereof include condensation-reaction-type compounds such as aliphatic alcohols and amide compounds, and addition-reaction-type compounds such as carbodiimide compounds, epoxy compounds, oxazoline compounds, oxazine compounds and aziridine compounds. When the latter addition-reaction-type compound is used, there is no need to discharge an unwanted by-product out of a reaction system, as in the case of terminal blocking by a dehydration condensation reaction of alcohol with carboxyl group, for example.

Accordingly, by adding an addition-reaction-type terminal blocking agent when the poly-L-lactic acid (components B-1 to B-3) and the poly-D-lactic acid (components B-4 to B-6) are melt-kneaded, a sufficient carboxyl group terminal blocking effect can be achieved while decomposition of the resin by a by-product is inhibited. As a result, the hydrolysis resistance of the stereocomplex polylactic acid can be improved.

As the carbodiimide compounds (including polycarbodiimide compounds), those synthesized by generally well-known methods can be used. Illustrative examples thereof include those which can be synthesized by subjecting various polyisocyanates to a decarboxylation condensation reaction by use of an organophosphorus or organometallic compound as a catalyst, at a temperature of at least about 70° C., in the presence of an inert solvent or no solvent.

Illustrative examples of monocarbodiimide compounds included in the carbodiimide compounds include dicyclohexyl carbodiimide, diisopropyl carbodiimide, dimethyl carbodiimide, diisobutyl carbodiimide, dioctyl carbodiimide, t-butyl isopropyl carbodiimide, diphenyl carbodiimide, di-t-butyl carbodiimide, and di-β-naphthyl carbodiimide. Of these, dicyclohexyl carbodiimide or diisopropyl carbodiimide is suitable particularly because they are industrially easily available.

Further, as the polycarbodiimide compounds included in the above carbodiimide compounds, those produced by various methods can be used. Basically, those produced by a conventional method of producing a polycarbodiimide (U.S. Pat. No. 2,941,956, Japanese Patent Publication No. 47-33279, J. Org. Chem. 28, 2069 to 2075 (1963), Chemical Review 1981, Vol. 81, No. 4, pp. 619 to 621) can be used.

Illustrative examples of an organic diisocyanate which is a synthetic raw material in production of the polycarbodiimide compound include an aromatic diisocyanate, aliphatic diisocyanate, alicyclic diisocyanate, and mixtures thereof. Specific examples thereof include 1,5-naphthalene diisocyanate, 4,4'-diphenylmethane diisocyanate, 4,4'-diphenyldimethylmethane diisocyanate, 1,3-phenylene diisocyanate, 1,4-phenylene diisocyanate, 2,4-tolylene diisocyanate, 2,6-tolylene diisocyanate, a mixture of 2,4-tolylene diisocyanate and 2,6-tolylene diisocyanate, hexamethylene diisocyanate, cyclohexane-1,4-diisocyanate, xylylene diisocyanate, isophorone diisocyanate, dicyclohexylmethane-4,4'-diisocyanate, methyl cyclohexane diisocyanate, tetramethylxylylene diisocyanate, 2,6-diisopropylphenyl isocyanate, and 1,3,5-triisopropylbenzene-2,4-diisocyanate.

Further, in the case of the polycarbodiimide compound, it can be controlled to an appropriate polymerization degree by use of a compound such as a monoisocyanate that reacts with a terminal isocyanate of the polycarbodiimide compound.

Illustrative examples of the monoisocyanate for controlling the polymerization degree of the polycarbodiimide compound by blocking the terminal of the polycarbodiimide compound include phenyl isocyanate, tolyl isocyanate, dimethylphenyl isocyanate, cyclohexyl isocyanate, butyl isocyanate, and naphthyl isocyanate.

Illustrative examples of the epoxy compounds as the terminal blocking agent (component E) include N-glycidyl phthalimide, N-glycidyl-4-methyl phthalimide, N-glycidyl-4,5-dimethyl phthalimide, N-glycidyl-3-methyl phthalimide, N-glycidyl-3,6-dimethyl phthalimide, N-glycidyl-4-ethoxy phthalimide, N-glycidyl-4-chlorophthalimide, N-glycidyl-4,5-dichlorophthalimide, N-glycidyl-3,4,5,6-tetrabromophthalimide, N-glycidyl-4-n-butyl-5-bromophthalimide, N-glycidyl succinimide, N-glycidyl hexahydrophthalimide, N-glycidyl-1,2,3,6-tetrahydrophthalimide, N-glycidyl maleinimide, N-glycidyl-α,β-dimethyl succinimide, N-glycidyl-α-ethyl succinimide, N-glycidyl-α-propyl succinimide, N-glycidyl benzamide, N-glycidyl-p-methyl benzamide, N-glycidyl naphthamide, N-glycidyl steramide, N-methyl-4,5-epoxycyclohexane-1,2-dicarboxylicimide, N-ethyl-4,5-epoxycyclohexane-1,2-dicarboxylicimide, N-phenyl-4,5-epoxycyclohexane-1,2-dicarboxylic imide, N-naphthyl-4,5-epoxycyclohexane-1,2-dicarboxylic imide, N-tolyl-3-methyl-4,5-epoxycyclohexane-1,2-dicarboxylic imide, o-phenylphenyl glycidyl ether, 2-methyloctyl glycidyl ether, phenyl glycidyl ether, 3-(2-xenyloxy)-1,2-epoxypropane, allyl glycidyl ether, butyl glycidyl ether, lauryl glycidyl ether, benzyl glycidyl ether, cyclohexyl glycidyl ether, α-cresyl glycidyl ether, p-t-butylphenyl glycidyl ether, methacrylic glycidyl ether, ethylene oxide, propylene oxide, styrene oxide, octylene oxide, hydroquinone diglycidyl ether, resorcin diglycidyl ether, 1,6-hexanediol diglycidyl ether, and hydrogenated bisphenol A-diglycidyl ether.

Illustrative examples of the epoxy compounds further include diglycidyl terephthalate, diglycidyl tetrahydrophthalate, diglycidyl hexahydrophthalate, dimethyl diglycidyl phthalate, phenylene diglycidyl ether, ethylene diglycidyl ether, trimethylene diglycidyl ether, tetramethylene diglycidyl ether, and hexamethylene diglycidyl ether.

One or more compounds are arbitrarily selected out of these epoxy compounds to block the carboxyl terminal of the polylactic acid unit. From the viewpoint of reactivity, ethylene oxide, propylene oxide, phenyl glycidyl ether, o-phenylphenyl glycidyl ether, p-t-butylphenyl glycidyl ether, N-glycidyl phthalimide, hydroquinone diglycidyl ether, resorcin diglycidyl ether, 1,6-hexanediol diglycidyl ether, hydrogenated bisphenol A-diglycidyl ether and the like are preferred.

Illustrative examples of the oxazoline compounds as the terminal blocking agent (component E) include 2-methoxy-2-oxazoline, 2-ethoxy-2-oxazoline, 2-propoxy-2-oxazoline, 2-butoxy-2-oxazoline, 2-pentyloxy-2-oxazoline, 2-hexyloxy-2-oxazoline, 2-heptyloxy-2-oxazoline, 2-octyloxy-2-oxazoline, 2-nonyloxy-2-oxazoline, 2-decyloxy-2-oxazoline, 2-cyclopentyloxy-2-oxazoline, 2-cyclohexyloxy-2-oxazoline, 2-allyloxy-2-oxazoline, 2-methallyloxy-2-oxazoline, 2-crotyloxy-2-oxazoline, 2-phenoxy-2-oxazoline, 2-cresyl-2-oxazoline, 2-o-ethylphenoxy-2-oxazoline, 2-o-propylphenoxy-2-oxazoline, 2-o-phenylphenoxy-2-oxazoline, 2-m-ethylphenoxy-2-oxazoline, 2-m-propylphenoxy-2-oxazoline, 2-p-phenylphenoxy-2-oxazoline, 2-methyl-2-oxazoline, 2-ethyl-2-oxazoline, 2-propyl-2-oxazoline, 2-butyl-2-oxazoline, 2-pentyl-2-oxazoline, 2-hexyl-2-oxazoline, 2-heptyl-2-oxazoline, 2-octyl-2-oxazoline, 2-nonyl-2-oxazoline, 2-decyl-2-oxazoline, 2-cyclopentyl-2-oxazoline, 2-cyclohexyl-2-oxazoline, 2-allyl-2-oxazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-o-phenylphenyl-2-oxazoline, 2-m-ethylphenyl-2-oxazoline, 2-m-propylphenyl-2-oxazoline, 2-p-phenylphenyl-2-oxazoline, 2,2'-bis(2-oxazoline), 2,2'-bis(4-methyl-2-oxazoline), 2,2'-bis(4,4'-dimethyl-2-oxazoline), 2,2'-bis(4-ethyl-2-oxazoline), 2,2'-bis(4,4'-diethyl-2-oxazoline), 2,2'-bis(4-propyl-2-oxazoline), 2,2'-bis(4-butyl-2-oxazoline), 2,2'-bis(4-hexyl-2-oxazoline), 2,2'-bis(4-phenyl-2-oxazoline), 2,2'-bis(4-cyclohexyl-2-oxazoline), 2,2'-bis(4-benzyl-2-oxazoline), 2,2'-p-phenylenebis(2-oxazoline), 2,2'-m-phenylenebis(2-oxazoline), 2,2'-o-phenylenebis(2-oxazoline), 2,2'-p-phenylenebis(4-methyl-2-oxazoline), 2,2'-p-phenylenebis(4,4'-dimethyl-2-oxazoline), 2,2'-m-phenylenebis(4-methyl-2-oxazoline), 2,2'-m-phenylenebis(4,4'-dimethyl-2-oxazoline), 2,2'-ethylenebis(2-oxazoline), 2,2'-tetramethylenebis(2-oxazoline), 2,2'-hexamethylenebis(2-oxazoline), 2,2'-octamethylenebis(2-oxazoline), 2,2'-decamethylenebis(2-oxazoline), 2,2'-ethylenebis(4-methyl-2-oxazoline), 2,2'-tetramethylenebis(4,4'-dimethyl-2-oxazoline), 2,2'-9,9'-diphenoxyethanebis(2-oxazoline), 2,2'-cyclohexylenebis(2-oxazoline), and 2,2'-diphenylenebis(2-oxazoline). Illustrative examples of the oxazoline compounds further include polyoxazoline compounds containing the above compounds as monomer units, such as a styrene.2-isopropenyl-2-oxazoline copolymer. One or more compounds are arbitrarily selected out of these oxazoline compounds to block the carboxyl terminal of the polylactic acid unit.

Illustrative examples of the oxazine compounds as the terminal blocking agent (component E) include 2-methoxy-5,6-dihydro-4H-1,3-oxazine, 2-ethoxy-5,6-dihydro-4H-1,3-oxazine, 2-propoxy-5,6-dihydro-4H-1,3-oxazine, 2-butoxy-5,6-dihydro-4H-1,3-oxazine, 2-pentyloxy-5,6-dihydro-4H-

1,3-oxazine, 2-hexyloxy-5,6-dihydro-4H-1,3-oxazine, 2-heptyloxy-5,6-dihydro-4H-1,3-oxazine, 2-octyloxy-5,6-dihydro-4H-1,3-oxazine, 2-nonyloxy-5,6-dihydro-4H-1,3-oxazine, 2-decyloxy-5,6-dihydro-4H-1,3-oxazine, 2-cyclopentyloxy-5,6-dihydro-4H-1,3-oxazine, 2-cyclohexyloxy-5,6-dihydro-4H-1,3-oxazine, 2-allyloxy-5,6-dihydro-4H-1,3-oxazine, 2-methallyloxy-5,6-dihydro-4H-1,3-oxazine, 2-crotyloxy-5,6-dihydro-4H-1,3-oxazine, 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-propylenebis(5,6-dihydro-4H-1,3-oxazine), 2,2'-butylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine), 2,2'-m-phenylenebis(5,6-dihydro-4H-1,3-oxazine), 2,2'-naphthylenebis(5,6-dihydro-4H-1,3-oxazine), and 2,2'-P,P'-diphenylenebis(5,6-dihydro-4H-1,3-oxazine)

Illustrative examples of the oxazine compounds further include polyoxazine compounds containing the above compounds as monomer units. One or more compounds are arbitrarily selected out of these oxazine compounds to block the carboxyl terminal of the polylactic acid unit.

Further, one or more compounds may be arbitrarily selected out of the above oxazoline compounds and oxazine compounds and used in combination to block the carboxyl terminal of the polylactic acid. In view of heat resistance, reactivity and affinity for aliphatic polyesters, 2,2'-m-phenylenebis(2-oxazoline) and 2,2'-p-phenylenebis(2-oxazoline) are preferred.

Illustrative examples of the aziridine compounds as the terminal blocking agent (component E) include an addition reaction product of mono, bis or polyisocyanate compound and ethylene imine.

Further, two or more compounds out of the carbodiimide compounds, epoxy compounds, oxazoline compounds, oxazine compounds and aziridine compounds described above as the terminal blocking agents that can be used in the present invention can be used in combination as the terminal blocking agent.

In the resin composition of the present invention, blocking of the carboxyl terminal group is carried out to a proper extent according to intended use. As for a specific degree of blocking of the carboxyl group terminals, the concentration of the carboxyl group terminals of the polylactic acid is preferably not higher than 10 equivalent/$10^3$ kg, more preferably not higher than 6 equivalent/$10^3$ kg, from the viewpoint of an improvement in hydrolysis resistance.

As a method for blocking the carboxyl group terminals of the polylactic acid (component B) in the resin composition of the present invention, a condensation-reaction-type or addition-reaction-type terminal blocking agent is reacted with the terminals. As a method of blocking the carboxyl group terminals by a condensation reaction, the carboxyl group terminals can be blocked by adding a proper amount of a condensation-reaction-type terminal blocking agent such as an aliphatic alcohol or amide compound into a polymerization system at the time of polymerization of the polymer to cause a dehydration condensation reaction under reduced pressure. To achieve a high polymerization degree of the polymer, the condensation-reaction-type terminal blocking agent is preferably added upon completion of the polymerization reaction.

As a method of blocking the carboxyl group terminals by an addition reaction, the carboxyl group terminals can be blocked by reacting the terminals with a proper amount of a terminal blocking agent such as a carbodiimide compound, epoxy compound, oxazoline compound, oxazine compound or aziridine compound, with the polylactic acid in a molten state. The terminal blocking agent can be added to and reacted with the terminals after completion of the polymerization reaction of the polymer.

When the poly-L-lactic acid (components B-1 to B-3) and the poly-D-lactic acid unit (components B-4 to B-6) are melt-kneaded in the presence of the terminal blocking agent (component E), decomposition and degradation of the thermoplastic resin (component A) are inhibited.

The content of the terminal blocking agent (component E) is preferably 0.01 to 5 parts by weight, more preferably 0.05 to 4 parts by weight, much more preferably 0.1 to 3 parts by weight, based on 100 parts by weight of the polylactic acid (component B).

<Flame Retardant: Component F>

The resin composition of the present invention can also contain a flame retardant. Illustrative examples of the flame retardant include halogen-containing flame retardants such as a brominated epoxy resin, brominated polystyrene, brominated polycarbonate, brominated polyacrylate and chlorinated polyethylene; phosphate-containing flame retardants such as monophosphate compounds and phosphate oligomer compounds; organophosphorus flame retardants other than phosphate-based flame retardants, such as phosphonate oligomer compounds, phosphonitrile oligomer compounds and amide phosphonate compounds; organometallic-salt-containing flame retardants such as organic sulfonic acid alkali (earth) metal salts, boric-acid-metallic-salt-containing flame retardants and stannic-acid-metallic-salt-containing flame retardants; and silicone-containing flame retardants. Further, the flame retardant may be used in combination with a flame retarding aid (such as sodium antimonate or antimony trioxide) or a dripping inhibitor (such as a polytetrafluoroethylene having a fibril forming ability).

Of the above flame retardants, compounds that do not contain a chlorine atom and a bromine atom are more suitable as the flame retardant in the molded article of the present invention which is characterized by a reduction of environmental burdens, since factors considered unfavorable when waste incineration or thermal recycling is carried out are reduced.

Further, the phosphate-containing flame retardants are particularly preferred, because they provide good color and also exert an effect of improving moldability. Specific examples of the phosphate-containing flame retardants particularly include one or more phosphate compounds represented by the following general formula (II):

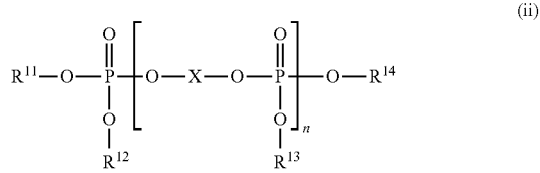

(ii)

wherein X is a group derived from hydroquinone, resorcinol, bis(4-hydroxydiphenyl)methane, bisphenol A, dihydroxydiphenyl, dihydroxy naphthalene, bis(4-hydroxyphenyl)sulfone, bis(4-hydroxyphenyl)ketone or bis(4-hydroxyphenyl)sulfide, n is an integer of 0 to 5 and is the average of 0 to 5 in the case of a blend of phosphates differing in the value of n, and $R^{11}$, $R^{12}$, $R^{13}$ and $R^{14}$ are each independently a group derived from phenol, cresol, xylenol, isopropylphenol, butylphenol or p-cumylphenol in which are substituted or unsubstituted by one or more halogen atoms.

More preferably, X in the formula is a group derived from hydroquinone, resorcinol, bisphenol A or dihydroxydiphenyl, n is an integer of 1 to 3 or the average thereof in the case of a blend of phosphates differing in the value of n, and $R^{11}$, $R^{12}$, $R^{13}$ and $R^{14}$ are each independently a group derived from phenol, cresol or xylenol in which are substituted or more suitably unsubstituted one or more halogen atoms.

Of the organophosphate flame retardants, triphenyl phosphate is preferred as the phosphate compound. As the phosphate oligomer, resorcinol bis(dixylenyl phosphate) and bisphenol A bis(diphenyl phosphate) can be preferably used because they are also excellent in hydrolysis resistance and the like. Resorcinol bis(dixylenyl phosphate) and bisphenol A bis(diphenyl phosphate) are more preferred in terms of heat resistance and the like, since they also have good heat resistance and do not thermally degrade or evaporate accordingly.

In the resin composition of the present invention, the content of the flame retardant is preferably 0.05 to 50 parts by weight, based on 100 parts by weight of the thermoplastic resin (component A). When the content is lower than 0.05 parts by weight, sufficient flame retardancy is not developed, while when it is higher than 50 parts by weight, the strength and heat resistance of the molded article are impaired.

<Heat Stabilizer: Component P>

The resin composition of the present invention preferably contains a phosphorus stabilizer to obtain better color and stable flowability. In particular, the composition preferably contains, as the phosphorus stabilizer, a pentaerythritol-type phosphite compound represented by the following general formula (III):

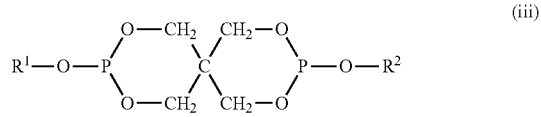

(iii)

wherein $R^1$ and $R^2$ independently represent a hydrogen atom, an alkyl group having 1 to 20 carbon atoms, an aryl or alkylaryl group having 6 to 20 carbon atoms, an aralkyl group having 7 to 30 carbon atoms, a cycloalkyl group having 4 to 20 carbon atoms or a 2-(4-oxyphenyl)propyl-substituted aryl group having 15 to 25 carbon atoms, and the cycloalkyl group and the aryl group may be substituted with an alkyl group.

Specific examples of the pentaerythritol-type phosphite compound include distearyl pentaerythritol diphosphite, bis (2,4-di-t-butylphenyl)pentaerythritol diphosphite, bis(2,6-di-t-butyl-4-methylphenyl)pentaerythritol diphosphite, bis (2,6-di-t-butyl-4-ethylphenyl)pentaerythritol diphosphite, phenyl bisphenol A pentaerythritol diphosphite, bis(nonylphenyl)pentaerythritol diphosphite, and dicyclohexyl pentaerythritol diphosphite. Of these, distearyl pentaerythritol diphosphite and bis(2,4-di-t-butylphenyl)pentaerythritol diphosphite are suitable.

Illustrative examples of other phosphorus stabilizers include various phosphite compounds, phosphonite compounds and phosphate compounds.

Specific examples of the phosphite compounds include triphenyl phosphite, tris(nonylphenyl)phosphite, tridecyl phosphite, trioctyl phosphite, trioctadecyl phosphite, didecyl monophenyl phosphite, dioctyl monophenyl phosphite, diisopropyl monophenyl phosphite, monobutyl diphenyl phosphite, monodecyl diphenyl phosphite, monooctyl diphenyl phosphite, 2,2-methylenebis(4,6-di-t-butylphenyl)octyl phosphite, tris(diethylphenyl)phosphite, tris(di-iso-propylphenyl)phosphite, tris(di-n-butylphenyl)phosphite, tris(2,4-di-t-butylphenyl)phosphite, and tris(2,6-di-t-butylphenyl) phosphite.

Further, as other phosphite compounds, those that react with dihydric phenols and have a cyclic structure can also be used. Specific examples thereof include 2,2'-methylenebis(4, 6-di-t-butylphenyl)(2,4-di-t-butylphenyl)phosphite, 2,2'-methylenebis(4,6-di-t-butylphenyl)(2-t-butyl-4-methylphenyl) phosphite, 2,2'-methylenebis(4-methyl-6-t-butylphenyl)(2-t-butyl-4-methylphenyl)phosphite, and 2,2'-ethylidenebis(4-methyl-6-t-butylphenyl)(2-t-butyl-4-methylphenyl) phosphite.

Specific examples of the phosphate compounds include tributyl phosphate, trimethyl phosphate, tricresyl phosphate, triphenyl phosphate, trichlorophenyl phosphate, triethyl phosphate, diphenylcresyl phosphate, diphenyl monoorthoxenyl phosphate, tributoxyethyl phosphate, dibutyl phosphate, dioctyl phosphate, and diisopropyl phosphate. Triphenyl phosphate and trimethyl phosphate are preferred.

Specific examples of the phosphonite compounds include tetrakis(2,4-di-t-butylphenyl)-4,4'-biphenylene diphosphonite, tetrakis(2,4-di-t-butylphenyl)-4,3'-biphenylene diphosphonite, tetrakis(2,4-di-t-butylphenyl)-3,3'-biphenylene diphosphonite, tetrakis(2,6-di-t-butylphenyl)-4,4'-biphenylene diphosphonite, tetrakis(2,6-di-t-butylphenyl)-4,3'-biphenylene diphosphonite, tetrakis(2,6-di-t-butylphenyl)-3, 3'-biphenylene diphosphonite, bis(2,4-di-t-butylphenyl)-4-phenyl-phenyl phosphonite, bis(2,4-di-t-butylphenyl)-3-phenyl-phenyl phosphonite, bis(2,6-di-n-butylphenyl)-3-phenyl-phenyl phosphonite, bis(2,6-di-t-butylphenyl)-4-phenyl-phenyl phosphonite, and bis(2,6-di-t-butylphenyl)-3-phenyl-phenyl phosphonite. Tetrakis(di-t-butylphenyl)-biphenylene diphosphonite and bis(di-t-butylphenyl)-phenyl-phenyl phosphonite are preferred, and tetrakis(2,4-di-t-butylphenyl)-biphenylene diphosphonite and bis(2,4-di-t-butylphenyl)-phenyl-phenyl phosphonite are more preferred. The phosphonite compounds can be preferably used in combination with the above phosphite compounds having an aryl group substituted with two or more alkyl groups.

Specific examples of the phosphonate compounds include dimethyl benzenephosphonate, diethyl benzenephosphonate, and dipropyl benzenephosphonate.

The phosphorus stabilizers can be used alone or in combination of two or more. It is preferable to add at least the pentaerythritol-type phosphite compound in an effective amount. The phosphorus stabilizer is preferably contained in an amount of 0.001 to 1 part by weight, more preferably 0.01 to 0.5 parts by weight, much more preferably 0.01 to 0.3 parts by weight, based on 100 parts by weight of the thermoplastic resin (component A).

<Break Inhibitor>

The resin composition of the present invention can contain a break inhibitor for inhibiting breakage of fibrous inorganic filler or flaky inorganic filler when the filler is used. The break inhibitor inhibits breakage of the inorganic filler by inhibiting adhesion between the matrix resin and the inorganic filler and reducing stress applied to the inorganic filler at the time of melt-kneading. Illustrative examples of effects of the break inhibitor include (1) an improvement in rigidity (the aspect ratio of the inorganic filler becomes large), (2) an improvement in toughness, and (3) an improvement in electrical conductivity (in the case of a conductive inorganic filler). Specific examples of the break inhibitor include (i) a compound when the compound having a low affinity for the resin is directly coated on the surface of the inorganic filler, and (ii) a compound having a structure showing a low affinity for the resin and having a functional group that can react with the surface of the inorganic filler.

Representative examples of the compound having a low affinity for the resin include various lubricants. Specific examples of the lubricants include mineral oil, synthetic oil, higher fatty acid ester, higher fatty acid amide, polyorganosiloxane (such as silicone oil or silicone rubber), olefinic wax (such as paraffin wax or polyolefin wax), polyalkylene glycol, and fluorine oils such as fluorinated fatty acid ester, trifluorochloroethylene and polyhexafluoropropylene glycol.

Illustrative examples of a method for coating the compound having a low affinity for the resin directly on the surface of the inorganic filler include (1) a method of immersing the inorganic filler in the compound directly or in a solution or emulsion of the compound, (2) a method of passing the inorganic filler through vapor or powder of the compound, (3) a method of spraying powder of the compound to the inorganic filler at high speed, and (4) a mechanochemical method of rubbing the inorganic filler and the compound against each other.

Illustrative examples of the compound having a structure showing a low affinity for the resin and having a functional group that can react with the surface of the inorganic filler include the above lubricants modified with various functional groups. Illustrative examples of the functional groups include a carboxyl group, carboxylic anhydride group, epoxy group, oxazoline group, isocyanate group, ester group, amino group, and alkoxysilyl group.

A suitable break inhibitor is an alkoxysilane compound in which an alkyl group having 5 or more carbon atoms is bonded to a silicon atom. The alkyl group bonded to the silicon atom has preferably 5 to 60, more preferably 5 to 20, much more preferably 6 to 18, particularly preferably 8 to 16 carbon atoms. The number of the alkyl group is suitably 1 or 2, particularly preferably 1. Further, suitable examples of the alkoxy group include a methoxy group and an ethoxy group. The alkoxysilane compound is preferred in that it shows high reactivity with the surface of the inorganic filler and has excellent coating efficiency. Therefore, it is suitable for finer inorganic fillers.

A suitable break inhibitor is polyolefin wax having at least one functional group selected from a carboxyl group and a carboxylic anhydride group. Its molecular weight is preferably 500 to 20,000, more preferably 1,000 to 15,000, in terms of weight average molecular weight. The amount of the carboxyl group and carboxylic anhydride group in the polyolefin wax is preferably 0.05 to 10 meq/g, more preferably 0.1 to 6 meq/g, much more preferably 0.5 to 4 meq/g, per gram of the lubricant having at least one functional group selected from the carboxyl group and the carboxylic anhydride group. The proportion of functional groups other than the carboxyl group in the break inhibitor is preferably nearly equal to the proportion of the above carboxyl group and carboxylic anhydride group.

Particularly preferable as the break inhibitor is a copolymer of α-olefin and maleic anhydride. The copolymer can be produced by a conventional melt polymerization or bulk polymerization method in the presence of a radical catalyst. The α-olefin is preferably one having 10 to 60 carbon atoms on the average. The α-olefin is more preferably one having 16 to 60 carbon atoms on the average, much more preferably one having 25 to 55 carbon atoms on the average.

The content of the break inhibitor is preferably 0.01 to 2 parts by weight, more preferably 0.05 to 1.5 parts by weight, much more preferably 0.1 to 0.8 parts by weight, based on 100 parts by weight of the thermoplastic resin (component A).

<Elastomeric Polymer>

In the resin composition of the present invention, an elastomeric polymer can be used as a impact improving agent. An example of the elastomeric polymer is a graft copolymer obtained by copolymerization of a rubber component having a glass transition temperature of not higher than 10° C. with one or more monomers selected from aromatic vinyl, vinyl cyanide, acrylic ester, methacrylic ester and vinyl compounds copolymerizable with these compounds. A more suitable elastomeric polymer is a core-shell-type graft copolymer obtained by graft-copolymerization of the core of the rubber component with the shell (s) of one or more of the above monomers.

Another example of the elastomeric polymer is a block copolymer comprising the rubber component and the above monomers. Specific examples of the block copolymer include thermoplastic elastomers such as a styrene-ethylene propylene-styrene elastomer (hydrogenated styrene-isoprene-styrene elastomer) and a hydrogenated styrene-butadiene-styrene elastomer. Further, various other elastomeric polymers known as thermoplastic elastomers, such as an urethane elastomer, polyester elastomer and polyether amide elastomer, can also be used.

More suitable as the impact improving agent is a core-shell-type graft copolymer. The particle diameter of the core of the core-shell-type graft copolymer is preferably 0.05 to 0.8 μm, more preferably 0.1 to 0.6 μm, much more preferably 0.1 to 0.5 μm, in terms of weight average particle diameter. With the particle diameter of the core in a range of 0.05 to 0.8 μm, better impact resistance is achieved. The elastomeric polymer preferably contains the rubber component in a proportion of at least 40%, more preferably at least 60%.

Illustrative examples of the rubber component include butadiene rubber, butadiene-acrylic composite rubber, acrylic rubber, acrylic-silicone composite rubber, isobutylene-silicone composite rubber, isoprene rubber, styrene-butadiene rubber, chloroprene rubber, ethylene-propylene rubber, nitrile rubber, ethylene-acrylic rubber, silicone rubber, epichlorohydrin rubber, fluoro-rubber, and these compounds with their unsaturation binding portions hydrogenated. Due to fear of generation of harmful substances upon combustion, a rubber component containing no halogen atom is preferred in terms of environmental burdens.

The glass transition temperature of the rubber component is preferably not higher than −10° C., more preferably not higher than −30° C. The rubber component is particularly preferably butadiene rubber, butadiene-acrylic composite rubber, acrylic rubber or acrylic-silicone composite rubber. The composite rubber refers to rubber obtained by copolymerizing two rubber components or rubber obtained by polymerizing two rubber components such that the rubber has an IPN structure in which the rubber components are entangled with each other so that they cannot be separated.

Illustrative examples of the aromatic vinyl to be copolymerized with the rubber component include styrene, α-methylstyrene, p-methylstyrene, alkoxystyrene, and halogenated styrene. Styrene is particularly preferred. Illustrative examples of the acrylic ester include methyl acrylate, ethyl acrylate, butyl acrylate, cyclohexyl acrylate, and octyl acrylate. Illustrative examples of the methacrylic ester include methyl methacrylate, ethyl methacrylate, butyl methacrylate, cyclohexyl methacrylate, and octyl methacrylate. Methyl methacrylate is particularly preferred. Of these, especially methacrylic ester such as methyl methacrylate is preferably contained as an essential component. The reason is that since this shows an excellent affinity for the thermoplastic resin, more elastomeric polymers exist in the resin and good impact resistance of the thermoplastic resin is exerted more effectively, so that the impact resistance of the resin composition becomes good. More specifically, methacrylic ester is preferably contained in an amount of at least 10 wt %, more preferably at least 15 wt %, in 100 wt % of graft component (or in 100 wt % of shell in the case of a core-shell-type polymer).

The elastomeric polymer containing the rubber component having a glass transition temperature of not higher than 10° C. may be produced by any of bulk polymerization, solution polymerization, suspension polymerization and emulsion polymerization methods. The copolymerization method may be a one-stage graft or multistage graft. Further, it may be a mixture with a copolymer comprising only graft components that is by-produced upon production. Further, illustrative examples of polymerization methods include a soap-free polymerization method using an initiator such as potassium persulfate, a seed polymerization method, and a two-stage swelling polymerization method, in addition to general emulsion polymerization method. Further, in a suspension polymerization method, it is possible to retain an aqueous phase and a monomer phase individually, feed them to a continuous dispersing device accurately and control the particle diameter by the rotation speed of the dispersing device. Further, in a continuous production method, it is possible to feed a monomer phase into aqueous liquid having a dispersing ability through small orifices having a diameter of several micrometers to several tens of micrometers or a porous filter to control the particle diameter. In the case of a core-shell-type graft polymer, the reaction for the core and the shell may be one-stage or multistage.

The elastomeric polymers are commercially and easily available. Illustrative examples of those composed essentially of butadiene rubber, acrylic rubber or butadiene-acrylic composite rubber as a rubber component include Kane Ace B series (e.g. B-56) of KANEKA CORPORATION, METABLEN C series (e.g. C-223A) and W series (e.g. W-450A) of MITSUBISHI RAYON CO., LTD., PARALOID EXL series (e.g. EXL-2602), HIA series (e.g. HIA-15), BTA series (e.g. BTA-III) and KCA series of KUREHA CORPORATION, PARALOID EXL series and KM series (e.g. KM-336P, KM-357P) of Rohm and Haas Company, and UCL MODIFIER RESIN series of Ube Cyclon, Ltd. (UMG AXS RESIN series of UMG ABS, Ltd.). Illustrative examples of those composed essentially of acrylic-silicone composite rubber as a rubber component include those which are commercially available from MITSUBISHI RAYON CO., LTD. under trade names METABLEN S-2001 and SRK-200.

The content of the impact improving agent is preferably 0.2 to 50 parts by weight, more preferably 1 to 30 parts by weight, much more preferably 1.5 to 20 parts by weight, based on 100 parts by weight of the thermoplastic resin (component A). With the content within the above range, good impact resistance can be provided to the composition while deterioration in rigidity is inhibited.

<Others>

The resin composition of the present invention may contain an antioxidant (such as a hindered phenol compound and sulfur-containing antioxidant), ultraviolet absorber (such as a benzotriazole, triazine or benzophenone-containing ultraviolet absorber), light stabilizer (such as HALS), mold releasing agent (such as a saturated fatty acid ester, unsaturated fatty acid ester, polyolefin wax, fluorine compound, paraffin wax and beeswax), flow modifier (such as a polycaprolactone), colorant (such as carbon black, titanium dioxide, various organic dyes and metallic pigments), light diffusing agent (such as acrylic crosslinked particles and silicone crosslinked particles), fluorescent brightener, light-storing pigment, fluorescent dye, antistatic agent, inorganic and organic antimicrobial agents, photocatalytic antifouling agent (such as titanium oxide fine particles and zinc oxide fine particles), infrared absorber, and photochromic agent ultraviolet absorber, as long as the effect of the present invention is exerted. These various additives can be used in known contents when contained in the thermoplastic resin.

<Production Method of Resin Composition>

The resin composition can be produced by melt-kneading 100 parts by weight of the thermoplastic resin (component A) and 1 to 200 parts by weight of the polylactic acid (component B). The resin composition is generally formed into pellets. The pellets are preferably cut out of strands. For example, the pellets are preferably in the shape of a cylinder having a diameter of 2 to 10 mm and a height of 2 to 15 mm, a sphere having a diameter of 3 to 10 mm or an oval sphere having a long diameter of 3 to 10 mm.

The component B is as have been described in the above section of the resin composition. Therefore, the polylactic acid (component B) to be melt-kneaded comprises the component B-1 and the component B-4, and the weight ratio (component B-1/component B-4) of the component B-1 to the component B-4 is 10/90 to 90/10.

The component B to be melt-kneaded shows a proportion ($R_{195\ or\ higher}$) of melt peaks at 195° C. or higher to all melt peaks in a temperature rising process in measurement by a differential scanning calorimeter (DSC) of at least 20%. The $R_{195\ or\ higher}$ is preferably at least 50%, more preferably at least 80%, much more preferably at least 90%, particularly preferably at least 95%.

The component B is preferably obtained by melt-kneading the component B-1 and the component B-4 at 245 to 300° C.

The thermoplastic resin (component A) is as have been described above. The components C, D and E may be present at the time of the melt-kneading. These components are as have been described in the above section of the resin composition. The melt-kneading is preferably carried out in the presence of 0.01 to 5 parts by weight of the crystal nucleating agent (component C) based on 100 parts by weight of the component B. The component C is preferably talc. The melt-kneading is preferably carried out in the presence of 0.3 to 200 parts by weight of the inorganic filler (component D) based on 100 parts by weight of the component A. The melt-kneading is preferably carried out in the presence of 0.01 to 5 parts by weight of the terminal blocking agent (component E) based on 100 parts by weight of the component B.

The components may be premixed before melt-kneaded. Illustrative examples of means for premixing the components include a NAUTA mixer, V-shaped blender, Henschel mixer, mechanochemical device, and extrusion blender. In the premixing, granulation can be carried out by means of an extrusion granulator, briquetting machine or the like in some cases.

After premixed, the components are melt-kneaded by a melt-kneader typified by a vented twin-screw extruder and pelletized by equipment such as a pelletizer. Illustrative examples of the melt-kneader further include a Banbury mixer, kneading roll, and constant-heat agitator. The vented twin-screw extruder is preferred. In addition, it is also possible to use a method of feeding the above components and optionally other components to a melt-kneader typified by a twin-screw extruder independently without premixing them.

When a molded article is crushed and added as the thermoplastic resin (component A), the crushed molded article has a relatively high bulk density. Hence, it is preferably fed to an extruder as a mixture with other components having a high bulk density or fed to the extruder together with the components having a high bulk density even when the components are fed independently. By the production method, deterioration of the resin which is caused by the recycled thermoplastic resin is further inhibited, and a resin composition having more suitable color can be obtained. Further, liquid raw materials are preferably fed separately by use of a liquid feeder. Further, when the inorganic filler is added, it may be fed through a first feed port at the base of a screw of the extruder but is more preferably fed through a second feed port located at the middle of the extruder by use of a side feeder.

<Molded Articles>

The resin composition of the present invention is generally obtained as pellets, and molded articles can be produced by various molding methods such as injection molding and extrusion using the pellets as raw materials.

The $R_{195\ or\ higher}$ of the molded article is preferably at least 20%, more preferably at least 50%, much more preferably at least 80%, further preferably at least 90%, particularly preferably at least 95%.

For injection molding, a general cold runner method can be used. A hot runner type molding method is also possible. For the injection molding, injection compression molding, injection press molding, gas assist injection molding, foam molding (including one involving infusion of supercritical fluid), insert molding, in-mold coating molding, insulated metal molding, rapid heating-cooling molding, two-color molding, sandwich molding, ultrafast injection molding and the like can be used. The advantages of these various molding methods are already widely known.

By extrusion, molded articles such as an irregularly shaped extruded article, sheet and film can be obtained. Further, to form the sheet or film, inflation, calendaring, casting or the like can also be employed. Further, a heat shrinkable tube can also be molded by stretching.

The resin composition of the present invention can also be molded into a hollow molded article by rotational molding, blow molding or the like.

The molded articles of the present invention include an automobile part, an electric/electronic part, an electrical equipment exterior part, an office automation equipment exterior part or an optical disk substrate. These molded articles can be provided with other functions by being subjected to surface modification. The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods used for resin molded articles can be used.

(Automobile Parts)

Illustrative examples of the automobile parts of the present invention include vehicle exterior parts, vehicle interior parts, drive system mechanism parts, electronic control system electronic/electric parts, electronic control system mechanism parts, internal combustion engine associated parts, exhaust system associated parts, various display components, and various lighting equipment components. Specific examples thereof include a back panel, fender, bumper, facia, door panel, side garnish, pillar, radiator grill, side protector, side lacing, rear protector, rear lacing, various spoilers, hood, roof panel, trunk lid, detachable top, wind reflector, headlamp lens, mirror housing, outer door handle, wiper parts, windshield washer nozzle, automotive antenna parts, trim, lamp socket, lamp reflector, lamp housing, instrumental panel, center console panel, deflector parts, meter parts, airflow meter, actuator, ignition coil, distributor parts, gas cap, fuse case, sensor housing, harness connector, various switches, various relays, fuel tubing parts, engine locker cover, engine ornament cover, timing belt cover, belt tensioner pulley, chain guide, cam sprocket, generator bobbin, air cleaner case, air intake duct, surge tank, fuel tank, intake manifold, fuel injection parts, car navigation parts, car audio visual parts, and automobile computer parts.

(Electric/Electronic Parts)

The electric/electronic parts of the present invention are parts of electric/electronic equipments such as OA equipments, household electric appliances, play equipments and special industrial products.

Illustrative examples of parts of OA equipments and household electric appliances include parts used for mutual connection of electric wires, mutual connection of electric insulated wires or connection of electric/electronic equipment and an electric wire. Illustrative examples thereof include various connectors, outlets, plugs, various switches for switching between connection and disconnection of circuit, various electronic devices for controlling the energization status of circuit, and various electromechanical parts incorporated in other electric/electronic equipments.

Specific examples thereof include connectors, relays, condenser cases, switches, trans bobbins, terminal blocks, printed circuit boards, cooling fans, valves, shield boards, various buttons, various handles, various sensors, small motor parts, various sockets, tuner parts, fuse cases, fuse holders, brush holders, breaker parts, electromagnetic switches, deflection yokes, flyback transformers, keycaps, rollers, bearings, and lamp housings.

Specific examples of the OA equipments include desktop personal computers, notebook-size personal computers, displays (such as CRT, liquid crystal, plasma, projector and organic electroluminescence), mice, and printers, copying machines, scanners and fax machines (including their complex machines), drives for recording media (such as CD, MD, DVD, next-generation high density disks and hard disks), and readers for recording media (such as IC cards, smart media and memory sticks).

Specific examples of the household electric appliances include personal digital assistances (so-called "PDA"), cellular phones, portable books (such as dictionaries), portable television sets, optical cameras, digital cameras, parabolic antennas, electric tools, VTR, irons, hair dryers, rice cookers, microwave ovens, hotplates, audio equipments, lighting equipments, refrigerators, air conditioners, air cleaners, negative ion generators, typewriters, and clocks.

Specific examples of the play equipments include home video game machines, arcade video game machines, pinball machines, and slot machines. Specific examples of the special industrial products include trays, carrier tapes, carrier cases and containers used for carrying silicon wafers, integrated circuit chips, glass substrates and the like.

(Electrical Equipment Exterior Parts)

Illustrative examples of the electrical equipment exterior parts of the present invention include exterior parts for personal computers such as desktop personal computers and notebook-size personal computers.

(OA Equipment Exterior Parts)

Illustrative examples of the OA equipment exterior parts include exterior parts for printers, copying machines, scanners and fax machines (including their complex machines), displays (such as CRT, liquid crystal, plasma, projector and organic electroluminescence), and mice. Illustrative examples thereof further include switch mechanism parts such as keys in keyboards and various switches, and exterior parts for game machines (such as home video game machines, arcade video game machines, pinball machines and slot machines). Illustrative examples of the OA equipments include personal digital assistances (so-called "PDA"), cellular phones, portable books (such as dictionaries), portable television sets, drives for recording media (such as CD, MD, DVD, next-generation high density disks and hard disks), readers for recording media (such as IC cards, smart media and memory sticks), optical cameras, digital cameras, parabolic antennas, electric tools, VTR, irons, hair dryers, rice cookers, microwave ovens, hot plates, audio equipments, lighting equipments, refrigerators, air conditioners, air cleaners, negative ion generators, typewriters, and clocks.

(Optical Disk Substrates)

The optical disk substrate of the present invention is obtained by injection-molding pellets of the resin composition. For the injection molding, a hot runner type molding method as well as a general cold runner method is possible. For the injection molding, in addition to a general molding method, such an injection molding method as injection compression molding, injection press molding, gas assist injection molding, foam molding (including one involving infusion of supercritical fluid), insert molding, in-mold coating molding, insulated metal molding, rapid heating-cooling molding, two-color molding, sandwich molding and ultrafast injection molding can be used as appropriate according to purpose to obtain the molded article. The advantages of these various molding methods are already widely known.

For the injection molding, an injection molding machine (including an injection compression molding machine) is used. As this injection molding machine, one using a material that has low adhesion to resins as a cylinder or screw and shows corrosion resistance and abrasion resistance is preferably used from the viewpoints of inhibition of production of carbide and improvement of the reliability of the optical disk substrate, and an optical disk substrate which is optically excellent can be obtained by use of such an injection molding machine. The environment for the molding process is preferably as clean as possible in view of the object of the present invention. Further, it is important to fully dry the material to be subjected to molding to remove water and to be careful not to allow retention that causes decomposition of molten resin to occur.

The shape of the optical disk substrate is generally circular (disk-shaped). However, the shape and size thereof are not particularly limited and are selected as appropriate according to intended use. Further, a suitable thickness of the optical disk substrate ranges from 0.3 to 1.2 mm. In the case of the optical disk substrate in the present invention, bits or grooves are often formed on one or both surfaces of the substrate by a stamper at the time of its molding. However, such bits or grooves may not be formed at the time of molding depending on intended use of the optical disk substrate.

On the optical disk substrate of the present invention, a reflective layer, a recording layer, a light transmissive layer (transparent protective layer) and the like are laminated according to intended use thereof, resulting in an optical disk as an information recording medium.

The reflective layer can be formed by using metal elements alone or in combination of two or more. As metal that forms the reflective layer, Al or Au alone is preferably used, or an Al alloy containing 0.5 to 10 wt %, particularly preferably 3.0 to 10 wt % of Ti or an Al alloy containing 0.5 to 10 wt % of Cr is preferably used. The reflective layer comprising the above metal can be formed by a method such as an ion-beam sputtering method, DC (direct current) sputtering method or RF sputtering method.

On the optical disk substrate in the present invention, a recording layer (phase-change recording layer, dye recording layer in the case of DVD-RAM, CD-R, DVD-R, DV-R or the like, magnetooptical recording layer in the case of MO (magnetooptical disk)) and a light transmissive layer are basically formed in addition to the reflective layer to form an optical disk as an information recording medium. As the phase-change recording layer, chalcogen alone or a chalcogen compound is used, for example. More specifically, Te or Se alone or a chalcogenite-containing material such as Ge—Sb—Te, Ge—Te, In—Sb—Te, In—Se—Te—Ag, In—Se, In—Se—Tl—Co, In—Sb—Se, $Bi_2Te_3$, BiSe, $Sb_2Se_3$ or $Sb_2Te_3$ is used. Meanwhile, as the magnetooptical recording layer, a perpendicular magnetization layer having a magnetooptical property such as a Kerr Effect or a Faraday effect, such as an amorphous alloy thin film such as Tb—Fe—Co, is used.

A dielectric layer is preferably formed on both sides of the recording layer to control optical properties and thermal properties. As the dielectric layer, metal such as Al or Si or a nitride, oxide or sulfide of metalloid element is used, for example. Specific examples thereof include a mixture of ZnS and $SiO_2$, AlN, $Si_3N_4$, $SiO_2$, $Al_2O_3$, ZnS and $M_gF_2$.

The light transmissive layer is formed on the recording layer, or on the dielectric layer when the dielectric layer exists. This light transmissive layer becomes a transparent protective layer for protecting the recording layer and pits or grooves on the substrate. Illustrative examples of a material of this light transmissive layer include transparent thermoplastic resins such as an aromatic polycarbonate and amorphous polyolefin resin, and various thermosetting (particularly, light curing) resins. A method of forming the transparent protective layer is exemplified by a method of laminating a transparent sheet such as a sheet made of a thermoplastic resin such as an aromatic polycarbonate or amorphous polyolefin resin on the recording layer (light curable resin is suitable as an adhesive layer in this case). Another example of such a method is a method of forming the protective layer by coating an ultraviolet curable resin by a technique such as spin coating and exposing the resin to ultraviolet radiation. Further, particularly in a method using a transparent sheet, a protective transparent layer having a high hardness property, antistatic property and the like can be further formed on the surface thereof. The thickness (including the thickness of the protective transparent layer when it exists) of the light transmissive layer is limited to a range of 3 to 200 μm to keep somatic aberration small. A thickness of about 100 μm is particularly preferred.

In many cases, recording/reproduction of information signal is conducted on the optical disk by applying a ray of light from the light transmissive layer side of the disk and allowing the light to reach and be reflected on the recording layer or the like through the light transmissive layer.

Further, the configuration of grooves or bits transferred onto the optical disk substrate of the present invention, the configuration of lamination formed on the substrate and the configuration of the reflective layer (reflective film) or the recording layer and the light transmissive layer are not particularly limited. The grooves or pits may be formed on both sides of the substrate, and the reflective layer or the recording layer and the light transmissive layer may also be formed on both sides of the substrate. Further, such a multilayer structure as described above of the optical disk is widely known, and details thereof are described in Japanese Patent Laid-Open Publication No. 11-7658, for example.

Next, specific examples of the multilayer structure of the optical disk will be described in detail with reference to drawings. It is needless to say that the drawings merely exemplify typical structures of the optical disk and use of the optical disk substrate of the present invention is not limited only to optical disks having the illustrated structures.

Figure 6:
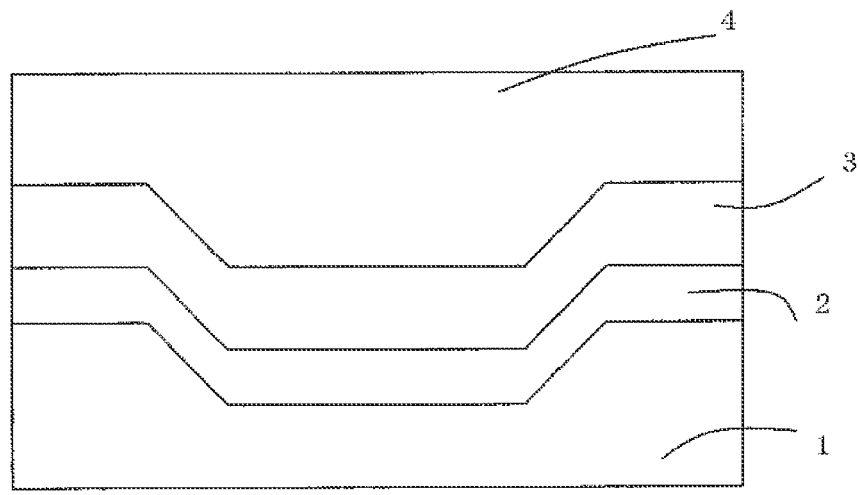
FIG. 6 is an example of a vertical section of an optical disk.
Figure 7:
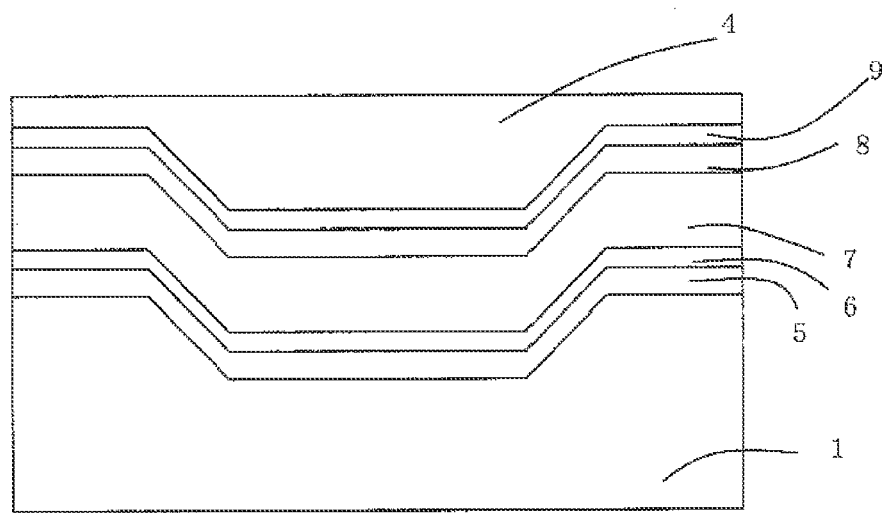
FIG. 7 is an example of a vertical section of an optical disk.
Figure 8:
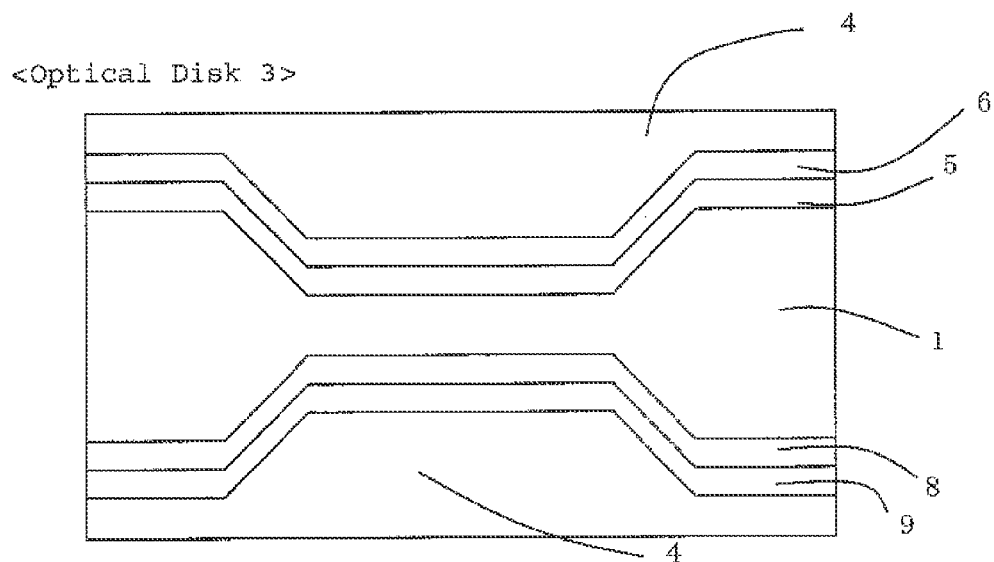
FIG. 8 is an example of a vertical section of an optical disk.

FIGS. 6 to 9 each illustrate an example of the structure of the optical disk as an optical recording medium and are a partial view of a vertical cross section of the disk surface. An optical disk 1 shown in FIG. 6 is formed by laminating, on an optical disk substrate (1) that comprises the resin composition of the present invention, a reflective layer (2), a recording layer (3) and a light transmissive layer (4) sequentially. On the top surface of the substrate (1), phase pits or grooves comprising a predetermined convex and concave pattern such as fine projections and pits such as pregrooves for recording data information, tracking servo signals or the like are formed. Further, an optical disk 2 shown in FIG. 7 has a multilayer structure in which, on an optical disk substrate (1) that comprises the resin composition of the present invention, a first reflective layer (5), a first recording layer (6), an intermediate layer (7), a second reflective layer (8), a second recording layer (9) and a light transmissive layer (4) are laminated sequentially. Further, an optical disk 3 shown in FIG. 8 is formed by laminating, on the top surface of a substrate (1) that comprises the polylactic acid resin composition and has pits or grooves formed on both surfaces, a first reflective layer (5), a first recording layer (6) and a light transmissive layer (4) sequentially and laminating, on the under surface of the substrate (1), a second reflective layer (8), a second recording layer (9) and a light transmissive layer (4) sequentially. As materials of the substrates, reflective layers, recording layers, light transmissive layers and the like that constitute the optical disks shown in FIGS. 6 to 8, materials having the same or similar characteristics can be used.

Figure 9:
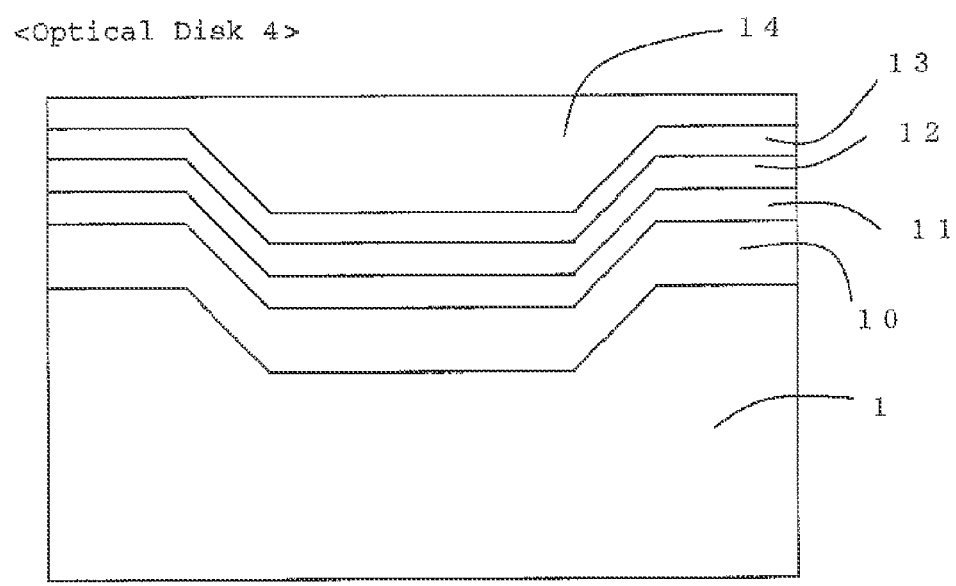
FIG. 9 is an example of a vertical section of an optical disk.
(Explanations of Letters or Notations in FIGS. 6 to 9)
1: Substrate
2: Reflexing layer 3: Recording layer
4: Light-permeative layer
5: First reflexing layer
6: First recording layer
7: Medium layer
8: Second reflexing layer
9: Second recording layer
10: Reflexing film
11: First dielectric layer
12: Phase-changing type recording layer
13: Second dielectric layer
14: Light-permeative layer

Further, FIG. 9 shows an optical disk 4 that has a multilayer structure in which a dielectric layer is formed on both sides of a recording layer. In this disk 4, a reflective film (10), a first dielectric layer (11), a phase-change-type recording layer (12) and a second dielectric layer (13) are laminated on a substrate (1), and the surface of the second dielectric layer (13) is covered with a light transmissive layer (14). An example of the thickness of each of the layers in the above layer constitution is 1.1 mm for the substrate, 60 nm for the reflective film, 19 nm for the first dielectric layer, 24 nm for the phase-change-type recording layer, 100 nm for the second dielectric layer and 100 μm for the light transmissive layer.

In the present invention, as long as an optical disk has the optical disk substrate comprising the polylactic acid (component B) described in detail above, the optical disk is included within the scope of the present invention regardless of the constitution and number of layers laminated on the substrate.

The optical disk substrate of the present invention preferably has an $R_{195\ or\ higher}$ of at least 20%, more preferably at least 50%, much more preferably at least 80%, further preferably at least 95%. The larger the $R_{195\ or\ higher}$, the higher the hydrolysis resistance of molded article becomes.

The melting point is preferably 195 to 250° C., more preferably 200 to 220° C. The fusion enthalpy is preferably at least 20 J/g, more preferably at least 30 J/g.

More specifically, it is preferred that the $R_{195\ or\ higher}$ be at least 30%, the melting point be 195 to 250° C. and the fusion enthalpy be at least 20 J/g.

Further, the optical disk substrate of the present invention can be provided with other functions by being subjected to surface modification. The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods used for resin molded articles can be used.

Second Embodiment

Molded Articles

The present invention includes a molded article that comprises a polylactic acid (component B) showing a proportion ($R_{195\ or\ higher}$) of melt peaks at 195° C. or higher to all melt peaks in a temperature rising process in measurement by a differential scanning calorimeter (DSC) of at least 20%.
(Component B)

The polylactic acid (component B) is as described in the above section of the first embodiment. Thus, the component B preferably comprises a polylactic acid (component B-1) that comprises 90 to 100 mol % of L-lactic acid unit and 0 to 10 mol % of D-lactic acid unit and/or units other than lactic acid and a polylactic acid (component B-4) that comprises 90 to 100 mol % of D-lactic acid unit and 0 to 10 mol % of L-lactic acid unit and/or units other than lactic acid, and the weight ratio of the component B-1 to the component B-4 (component B-1/component B-4) is preferably within a range of 10/90 to 90/10.

The $R_{195\ or\ higher}$ of the component B in the molded article is preferably at least 70%, more preferably at least 80%, much more preferably at least 90%, particularly preferably at least 95%. The molded article of the present invention has excellent heat resistance, hydrolysis resistance and chemical resistance since it comprises the polylactic acids having a high stereocomplex crystal content. The molded article of the present invention preferably has a molecular weight retention of at least 60%, more preferably at least 80%, much more preferably at least 90%.
(Other Components)

The molded article may comprise a crystal nucleating agent (component C), inorganic filler (component D), terminal blocking agent (component E), flame retardant (component F), heat stabilizer (component P) and other components. These are as described in the above section of the first embodiment. Thus, the content of the crystal nucleating agent (component C) is preferably 0.01 to 5 parts by weight based on 100 parts by weight of the component B. The component C is preferably talc. The content of the inorganic filler (component D) is preferably 0.3 to 200 parts by weight based on 100 parts by weight of the component B. The content of the terminal blocking agent (component E) is preferably 0.01 to 5 parts by weight based on 100 parts by weight of the component B.

The shape of the molded article is preferably in a block shape. That is, the molded article is preferably one having effective length in three directions, rather than a fiber having effective length in one direction or a film having effective length in two directions.

The molded article in the second embodiment is also preferably an automobile part, an electric/electronic part, an electrical equipment exterior part, an OA equipment exterior part or an optical disk substrate. Specific examples thereof are as described in the above first embodiment.
[Production Method of Molded Article]

The present invention includes a method of producing a molded article that comprises molding pellets comprising a polylactic acid (component B) showing a proportion of melt peaks at 195° C. or higher to all melt peaks in a temperature rising process in measurement by a differential scanning calorimeter (DSC) of at least 70%.

The component B in the pellets is as described in the section of the resin composition of the first embodiment. The $R_{195\ or\ higher}$ of the component B in the pellets is preferably at least 80%, more preferably at least 90%, particularly preferably at least 95%.

The component B in the pellets preferably comprises a polylactic acid (component B-1) that comprises 90 to 100 mol % of L-lactic acid unit and 0 to 10 mol % of D-lactic acid unit and/or units other than lactic acid and a polylactic acid (component B-4) that comprises 90 to 100 mol % of D-lactic acid unit and 0 to 10 mol of L-lactic acid unit and/or units other than lactic acid, and the weight ratio of the component B-1 to the component B-4 (component B-1/component B-4) is preferably within a range of 10/90 to 90/10.

The component B is preferably a polylactic acid obtained by kneading the component B-1 and the component B-4 at 245 to 300° C.

The polylactic acid (component B) having an $R_{195\ or\ higher}$ of at least 70% can be obtained by kneading the component B-1 and the component B-4 at high temperatures that have been unattempted. The kneading temperature is preferably 245 to 300° C., more preferably 260 to 300° C.

The pellets preferably contain 0.01 to 5 parts by weight of crystal nucleating agent (component C) based on 100 parts by weight of the component B. The component C is preferably talc. The pellets preferably contain 0.3 to 200 parts by weight of inorganic filler (component D) based on 100 parts by weight of the component B. The pellets preferably contain 0.01 to 5 parts by weight of terminal blocking agent (component E) based on 100 parts by weight of the component B.

The pellets are preferably molded by injection molding, extrusion, heat molding, blow molding or foam molding. Hereinafter, an injection molded article, extruded article, heat molded article, blow molded article and foam molded article will be described in detail.

(Injection Molded Article)

An injection molded article is obtained by injection molding the pellets containing the component B. The mold temperature is preferably 80 to 130° C., more preferably 100 to 120° C. Although a general polylactic acid (poly-L-lactic acid or poly-D-lactic acid) is a crystalline polymer, its crystallization rate is very slow, and it is very difficult to obtain a crystallized molded article by injection molding even if a crystal nucleating agent is added. As to a stereocomplex polylactic acid, although the crystallization rate becomes faster than the polylactic acid, a mold temperature of at least 140° C. is still required even if a crystal nucleating agent is added. However, when the polylactic acid (component B) having an $R_{195\ or\ higher}$ of at least 70% is used, a crystallized molded article can be injection-molded in good condition at a mold temperature of 80 to 130° C. that is a preferable range in terms of productivity as well. When the mold temperature is higher than 130° C., the cooling rate of molded article becomes slow, so that a molding cycle becomes long disadvantageously. Meanwhile, when the mold temperature is lower than 80° C., solidification is very slow or a molded article is obtained in an amorphous state disadvantageously.

For the injection molding, a hot runner method as well as a general cold runner method can be employed. For the injection molding, injection compression molding, injection press molding, gas assist injection molding, foam molding (including one involving infusion of supercritical fluid), insert molding, in-mold coating molding, insulated metal molding, rapid heating-cooling molding, two-color molding, sandwich molding and ultrafast injection molding can be used. The advantages of these various molding methods are already widely known.

A decrease in the $R_{195\ or\ higher}$ of injection-molded article is not observed, and the $R_{195\ or\ higher}$ of the injection-molded article is comparable to the $R_{195\ or\ higher}$ of the component B in the pellets. That is, the $R_{195\ or\ higher}$ of the injection-molded article is preferably at least 50%, more preferably at least 80%, much more preferably at least 90%, particularly preferably at least 95%. The larger the proportion of melt peaks at 195° C. or higher, the higher the hydrolysis resistance of the molded article becomes.

The melting point of the injection-molded article is preferably 195 to 250° C., more preferably 200 to 220° C. The fusion enthalpy is preferably at least 20 J/g, more preferably at least 30 J/g.

The injection-molded article preferably shows a proportion of melt peaks at 195° C. or higher to all melt peaks derived from the polylactic acid in a temperature rising process in measurement by a differential scanning calorimeter (DSC) of at least 70%, a melting point of 195 to 250° C. and a fusion enthalpy of at least 20 J/g.

(Extruded Article)

An extruded article is obtained by extruding a resin obtained by melting the pellets at 200° C. or higher. The obtained extruded article is preferably heat-treated at temperatures ranging from the crystallization temperature to the melting point.

The extruded article is a molded article shaped by the shape of the die of extruder by a melt process and is generally provided in the shape of a sheet, film, rod, tube or the like. The sheet refers to a sheet obtained by extruding a molten polymer into a sheet from a die or the like and cooling it and may not have to be particularly subjected to a stretching treatment. Meanwhile, the film refers to a film obtained by stretching a sheet in a uniaxial or biaxial direction sequentially or simultaneously to orient the molecular chain.

The extruded article can be obtained by use of a general known production method. For example, a film and a sheet can be produced by, for example, supplying the polylactic acid as a raw material into the hopper of single-screw or twin-screw extruder to which a T die or I die is connected via a gear pump, melting the raw material in the cylinder of the extruder, extruding it into a sheet from the die and cooling the sheet by a casting roll. As to the casting roll, the sheet is preferably closely attached to the roll by use of an electrostatic adhesion device or air knife, because nonuniformity in thickness and inclusion of air can be prevented.

When the extruded article is a film, it can be produced by a conventionally known film production method used for thermoplastic resins. Illustrative examples of the method include an extrusion method using a T die or I die, an inflation extrusion method using a circular die, a flow casting method, a calender molding method, and a press molding method. The film is preferably molded by use of any stretching method out of uniaxial stretching and biaxial stretching using a roll or tenter. Illustrative examples of the biaxial stretching include sequential biaxial stretching and simultaneous biaxial stretching.

The $R_{195\ or\ higher}$ of the extruded article is preferably at least 20%, more preferably at least 50%, much more preferably at least 80%, further preferably at least 90%, particularly preferably at least 95%. The larger the $R_{195\ or\ higher}$ the higher the hydrolysis resistance of the extruded article becomes.

The melting point is preferably 195 to 250° C., more preferably 200 to 220° C. The fusion enthalpy is preferably at least 10 J/g, more preferably at least 20 J/g, much more preferably at least 30 J/g.

The extruded article preferably has an $R_{195\ or\ higher}$ of at least 20%, a melting point of 195 to 250° C. and a fusion enthalpy of at least 10 J/g.

The extruded article can be used not only as structural members, packaging materials, industrial materials for electric/electronic applications, automotive applications, and the like but also as materials for heat molding.

The extruded article can be provided with other functions by being subjected to surface modification.

The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods used for extruded articles such as a sheet and a film can be used.

(Heat Molded Article)

A heat molded article is obtained by extruding a resin obtained by melting the pellets at 200° C. or higher into a sheet from a slit die to obtain an extruded article and heating the extruded article to the glass transition temperature or higher to conduct heat molding. The obtained molded article is preferably heat-treated at temperatures ranging from the crystallization temperature to the melting point. The heat molded article is produced by use of the sheet-shaped extruded article.

The sheet-shaped molded article can be prepared by known equipment and method. That is, the sheet-shaped molded article is obtained by a method comprising feeding the raw material into an extruder, extruding the raw material through a slit die and cooling and solidifying the extruded material on a casting drum to form a sheet. As a method of feeding the raw material into the extruder, any of the following methods, i.e. 1. a method comprising mixing the components together, melt-kneading and extruding the components by an extruder to prepare pellets and feeding the pellets into an extruder equipped with a slit die to prepare a sheet, 2. a method comprising preparing pellets of different compositions, mixing predetermined amounts of the pellets together and feeding them into an extruder for preparing a sheet to obtain the "sheet" and 3. a method of charging one or more of the components directly into an extruder for preparing a sheet, can be used. Further, it is also possible to use flakes obtained by crushing a prepared sheet, a prepared heat molded article and/or stripping debris produced upon heat molding as the material or one of the components in sheet formation in 1 and 2. It is preferable to add and mix some of the components as fine powder into other components for the purpose of uniform compounding of these components. The pellets and the components are preferably dried before fed into an extruder.

Further, when the sheet is statically charged to be closely attached to the cooling drum upon casting, a sheet having excellent flatness can be obtained.

By heat-molding the thus obtained sheet of the present invention, a variety of shapes can be formed and used for a variety of applications.

The thus obtained sheet is subjected to heat molding after preheated by an infrared heater, a hot-plate heater or hot air. As a method for the heat molding, vacuum molding, pressure molding or vacuum pressure molding using a negative mold, or a negative mold and a positive mold, or a plug, can be employed, for example. Upon molding, the negative mold, the positive mold and the plug can be heated. In the present invention, all or some of processed articles or heat molded articles of sheets may be bonded to each other or other materials to further increase a degree of processing or may be coated with various functional materials and used.

The heat molded article of the present invention preferably has an $R_{195\ or\ higher}$ of at least 20%, more preferably at least 50%, much more preferably at least 80%, further preferably at least 90%, particularly preferably at least 95%. The larger the $R_{195\ or\ higher}$, the higher the hydrolysis resistance of the heat molded article becomes.

The melting point is preferably 195 to 250° C., more preferably 200 to 220° C. The fusion enthalpy is preferably at least 10 J/g, more preferably at least 20 J/g, much more preferably at least 30 J/g.

More specifically, it is preferred that the $R_{195\ or\ higher}$ be at least 20%, the melting point be 195 to 250° C. and the fusion enthalpy be at least 10 J/g.

The heat molded article of the present invention is useful for packaging because it has excellent heat resistance and hydrolysis resistance. For example, it is used for packaging miscellaneous goods, toys, clothing, foods, optical products, OA products, electric products, tools, machines, other industrial products or their parts. However, the heat molded article of the present invention is also used as a constituent part or a material of the constituent part for electrical equipment, electronic devices, OA equipment, electrically-operated machines and other various devices. Further, the heat molded article can also be used as a base material for various tapes or a base material for products.

Further, the heat molded article of the present invention can be provided with other functions by being subjected to surface modification. The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods used for extruded articles such as a sheet and a film can be used.

(Blow Molded Article)

A blow molded article is obtained by molding a resin obtained by melting the pellets at 200° C. or higher to form a parison, heating the parison to the glass transition temperature or higher and then performing blow molding. The obtained molded article is preferably heat-treated at temperatures ranging from the crystallization temperature to the melting point.

The blow molded article refers to a hollow molded article such as a bottle obtained by orientation-blowing a container or preform obtained by injection molding or a hollow molded article such as a bottle obtained by direct blowing. The orientation-blowing and direct blowing can be carried out by known equipment and a known method.

The blow molded article preferably has an $R_{195\ or\ higher}$ of at least 20%, more preferably at least 50%, much more preferably at least 80%, further preferably at least 90%, particularly preferably at least 95%. The larger the $R_{195\ or\ higher}$, the higher the hydrolysis resistance of the blow molded article becomes.

The melting point is preferably 195 to 250° C., more preferably 200 to 220° C. The fusion enthalpy is preferably at least 10 J/g, more preferably at least 20 J/g, much more preferably at least 30 J/g.

The blow molded article preferably has an $R_{195\ or\ higher}$ of at least 20%, a melting point of 195 to 250° C. and a fusion enthalpy of at least 10 J/g.

The blow molded article can be used not only as a structural member, a packaging material or the like but also as an industrial material for electric/electronic applications, automotive applications and the like.

Further, the blow molded article can be provided with other functions by being subjected to surface modification. The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods for decorating molded articles can be used.

(Foam Molded Article)

A foam molded article is obtained by foam-molding a resin obtained by melting the pellets at 160° C. or higher. The obtained molded article is preferably heat-treated at temperatures ranging from the crystallization temperature to the melting point.

As a method of forming foam in the foam molded article, conventionally known various methods can be used. The foam molded article can be produced by a method of forming a foam molded article by including a thermally decomposable foaming agent in the resin composition and thermally decomposing the foaming agent to form foam. The thermally decomposable foaming agent is suitably mixed with the polylactic acid as a raw material uniformly in advance. Other methods include a method of mixing the foaming agent directly with the pellets of the polylactic acid at the time of production of the foam molded article and a method of mixing the foaming agent in the form of a master agent.

Illustrative examples of the thermally decomposable foaming agent include an azo compound, diazo compound, nitroso compound, azi compound, tetrazole derivative, triazine derivative, semicarbazide derivative, urea derivative, guanidine derivative, carbonate, bicarbonate, and nitrite.

Further, the foam molded article of the present invention can be produced by a method comprising a step of impregnating the above polylactic acid with a volume expandable chemical substance and a step of expanding the volume of the chemical substance within the polylactic acid to form foam so as to obtain the foam molded article. The gas pressure at the time of impregnation is preferably at least 1 MPa, more preferably at least 10 MPa.

As the chemical substance, any organic or inorganic gas that is in a gaseous state at normal temperature (23° C.) and normal pressure (atmospheric pressure) can be used. Illustrative examples thereof include inorganic gases such as carbon dioxide (carbon dioxide gas), nitrogen, oxygen, argon and water, and organic gases such as chlorofluorocarbons, low-molecular-weight hydrocarbons, chlorinated aliphatic hydrocarbons, brominated aliphatic hydrocarbons, alcohols, benzene, toluene, xylene and methylene. Specific examples of the low-molecular-weight hydrocarbons include pentane, butane and hexane. An example of the chlorinated aliphatic hydrocarbons is methyl chloride. An example of the brominated aliphatic hydrocarbons is methyl bromide. Further, various fluorinated aliphatic hydrocarbons (such as tetrafluoroethylene) can also be used. Of the chemical substances, carbon dioxide is suitable. Further, carbon dioxide can be rendered supercritical at relatively low temperature and low pressure and is easy to use in a more suitable aspect of the present invention. As the chemical substance, one that is liquid at normal temperature can also be used. Illustrative examples of such a chemical substance include pentane, neopentane, hexane, heptane, methylene chloride, trichloroethylene, and chlorofluorocarbons such as CFC-11, CFC-12, CFC-113 and CFC-141b.

A method of impregnating the polylactic acid with the chemical substance is not particularly limited. An example of such a method is a method comprising enclosing the chemical substance in a sealed autoclave as gas and pressurizing the chemical substance. When the foam molded article is molded by a melt extruder, a method of injecting gas as the chemical substance into the resin composition in a molten state from a vent by use of a vented screw extruder can be used. In that case, impregnation with the chemical substance is conducted with the resin composition in a molten state being pressure-sealed.

Another suitable aspect of producing the foam molded article of the present invention is a method of producing the foam molded article by a method comprising a step of impregnating the resin composition with a volume expandable chemical substance in the cylinder of injection molding machine under high pressure, a step of filling the resin composition impregnated with the chemical substance in the mold cavity of the injection molding machine and a step of expanding the volume of the chemical substance within the composition without substantially expanding the cavity to form foam so as to obtain the foam molded article. By the method, a foam molded article that has a high degree of flexibility in shape, low warpage attributed to filling of resin into a mold under low pressure, few sinks even when a change in thickness is large and excellent lightweight and rigidity and that is suitable as a structural material is obtained.

"Without substantially expanding the cavity" indicates that the volume of the cavity is kept unchanged from completion of filling of the resin. However, the volume may be slightly expanded as long as the size of the product is secured. The degree of expansion of the cavity is suitably within 1.05 times, preferably within 1.01 times, particularly preferably 1 time of the cavity volume at the time of completion of filling of the resin. The impregnated chemical substance expands in volume and forms foam such that it compensates the volume shrinkage which occurs with cooling and solidification of the resin. As a result, a foam molded article that matches target size and shape is obtained without sinks in a thick portion and warpage.

Further, for production of the foam molded article of the present invention, a method of impregnating the resin composition with the chemical substance that is in a gaseous state at normal temperature and normal pressure in a supercritical state is more preferred. With the method, the effect of the present invention is exerted more prominently in that a fine and uniform foamed cell is obtained.

The foam molded article of the present invention preferably has an $R_{195\ or\ higher}$ of at least 20%, more preferably at least 50%, much more preferably at least 80%, further preferably at least 90%, particularly preferably at least 95%. The larger the proportion of melt peaks at 195° C. or higher, the higher the hydrolysis resistance of the foam molded article becomes.

The melting point is preferably 195 to 250° C., more preferably 200 to 220° C. The fusion enthalpy is preferably at least 10 J/g, more preferably at least 20 J/g, much more preferably at least 30 J/g.

More specifically, it is preferred that the $R_{195}$ or higher be at least 20%, the melting point be 195 to 250° C. and the fusion enthalpy be at least 10 J/g.

The foam molded article of the present invention can be used not only as a structural member, a packaging material, a container, a cushioning material or the like but also as an industrial material for electric/electronic applications, automotive applications and the like.

Further, the foam molded article of the present invention can be provided with other functions by being subjected to surface modification. The surface modification includes vapor deposition (e.g. physical vapor deposition, chemical vapor deposition), plating (e.g. electroplating, electroless plating, hot-dip plating), painting, coating, printing and the like for forming a new layer on the surface layer of the resin molded article, and general methods for decorating molded articles can be used.

EXAMPLES

Hereinafter, the present invention will be further described with reference to Examples. However, the present invention shall not be limited to these Examples.
(Component B)
Polylactic acids were produced in the following manners. Physical properties were determined in the following manners.
(1) Reduced Viscosity: 0.12 g of polylactic acid was dissolved in 10 ml of tetrachloroethane/phenol (volume ratio: 1/1), and reduced viscosity (ml/g) at 35° C. was measured.
(2) weight Average Molecular Weight: The weight average molecular weight (Mw) of polylactic acid was determined by GPC (column temperature: 40° C., chloroform), through comparison with a polystyrene standard sample.
(3) Crystallization Point and Melting Point: A polylactic acid was measured by use of DSC in a nitrogen atmosphere at a temperature elevation rate of 20° C./min to determine its crystallization point (Tc) and melting point (Tm).

Production Example 1

Production of Component B-3

50 parts by weight of L-lactide (Musashino Chemical Laboratory, Ltd.) was charged into a polymerization tank, the inside of the system was substituted with nitrogen, 0.05 parts by weight of stearyl alcohol and $25 \times 10^{-3}$ parts by weight of tin octylate as a catalyst were added, and polymerization was conducted at 190° C. for 2 hours to obtain a component B-3. The obtained component B-3 had a reduced viscosity of 1.48 (ml/g), a weight average molecular weight of 110,000, a melting point (Tm) of 158° C. and a crystallization point (Tc) of 117° C.

Production Example 2

Production of Component B-6

50 parts by weight of D-lactide (Musashino Chemical Laboratory, Ltd.) was charged into a polymerization tank, the inside of the system was substituted with nitrogen, 0.05 parts by weight of stearyl alcohol and $25 \times 10^{-3}$ parts by weight of tin octylate as a catalyst were added, and polymerization was conducted at 190° C. for 2 hours to obtain a component B-6. The obtained component B-6 had a reduced viscosity of 1.95 (ml/g), a weight average molecular weight of 110,000, a melting point (Tm) of 158° C. and a crystallization point (Tc) of 121° C.

Production Example 3

Production of Component B-2

48.75 parts by weight of L-lactide (product of Musashino Chemical Laboratory, Ltd.) and 1.25 parts by weight of D-lactide (product of Musashino Chemical Laboratory, Ltd.) were charged into a polymerization tank, the inside of the system was substituted with nitrogen, 0.05 parts by weight of stearyl alcohol and $25 \times 10^{-3}$ parts by weight of tin octylate as a catalyst were added, and polymerization was carried out at 190° C. for 2 hours to produce a polymer. This polymer was washed with an acetone solution of 7% 5N hydrochloric acid to remove the catalyst. Thereby, a component B-2 was obtained. The obtained component B-2 had a reduced viscosity of 1.47 (ml/g), a weight average molecular weight of 100,000, a melting point (Tm) of 159° C. and a crystallization point (Tc) of 120° C.

Production Example 4

Production of Component B-5

1.25 parts by weight of L-lactide (product of Musashino Chemical Laboratory, Ltd.) and 48.75 parts by weight of D-lactide (product of Musashino Chemical Laboratory, Ltd.) were charged into a polymerization tank, the inside of the system was substituted with nitrogen, 0.05 parts by weight of stearyl alcohol and $25 \times 10^{-3}$ parts by weight of tin octylate as a catalyst were added, and polymerization was carried out at 190° C. for 2 hours to produce a polymer. This polymer was washed with an acetone solution of 7% 5N hydrochloric acid to remove the catalyst. Thereby, a component B-5 was obtained. The obtained component B-5 had a reduced viscosity of 1.76 (ml/g), a weight average molecular weight of 120,000, a melting point (Tm) of 156° C. and a crystallization point (Tc) of 120° C.

Production Example 5

Production of Polylactic Acid 1

100 parts by weight of the component B-3 obtained in Production Example 1 and 100 parts by weight of the component B-6 obtained in Production Example 2 were fed to a 30-mm-φ vented twin-screw extruder [TEX30XSST of Japan Steel Works, Ltd.], melt-extruded at a cylinder temperature of 280° C., a screw rotation speed of 150 rpm, a discharge rate of 15 kg/h and a vent pressure reduction degree of 3 kPa and pelletized to obtain a polylactic acid 1.

Production Example 6

Production of Polylactic Acid 2

100 parts by weight of the component B-2 obtained in Production Example 3 and 100 parts by weight of the component B-5 obtained in Production Example 4 were fed to a 30-mm-φ vented twin-screw extruder [TEX30XSST of Japan Steel Works, Ltd.], melt-extruded at a cylinder temperature of 280° C., a screw rotation speed of 150 rpm, a discharge rate of 15 kg/h and a vent pressure reduction degree of 3 kPa and pelletized to obtain a polylactic acid 2.

Production Example 7

Production of Polylactic Acid 3

100 parts by weight of the component B-2 obtained in Production Example 3, 100 parts by weight of the component B-5 obtained in Production Example 4 and 1 part by weight of carbodiimide compound (CARBODILITE HMV-8CA of NISSHINBO INDUSTRIES, INC.) were fed to a 30-mm-φ vented twin-screw extruder [TEX30XSST of Japan Steel Works, Ltd.], melt-extruded at a cylinder temperature of 280° C., a screw rotation speed of 150 rpm, a discharge rate of 15 kg/h and a vent pressure reduction degree of 3 kPa and pelletized to obtain a polylactic acid 3.

Production Example 8

Production of Polylactic Acid 4

100 parts by weight of the component B-2 obtained in Production Example 3 and 100 parts by weight of the component B-5 obtained in Production Example 4 were fed to a 30-mm-φ vented twin-screw extruder [TEX30XSST of Japan Steel Works, Ltd.], melt-extruded at a cylinder temperature of 230° C., a screw rotation speed of 150 rpm, a discharge rate of 10 kg/h and a vent pressure reduction degree of 3 kPa and pelletized to obtain a polylactic acid 4.

Production Example 9

Production of Polylactic Acid 5

A polylactic acid 5 was obtained in the same manner as in Production Example 8 except that the cylinder temperature was changed to 260° C.
(Component A)
A-1: aromatic polycarbonate resin powder (Panlite L-1250WP of TEIJIN CHEMICALS LTD., viscosity average molecular weight: 23,900)
(Component C)
C-1: talc (HiTalc Premium HTP ultra 5C of TOMOE Engineering Co., Ltd.)
(Component D)
D-1: glass fibers (ECS-03T-511 of Nippon Electric Glass Co., Ltd., chopped strand having an average diameter of 13 μm and a cut length of 3 mm)
D-2: talc (HST-0.8 of Hayashi-Kasei Co., Ltd.)
(Component E)
E: carbodiimide compound (Carbodilite HMV-8CA of Nisshinbo Industries, Inc.)
(Component F)
F-1: phosphoric ester flame retardant (PX-200 of Daihachi Chemical Industry Co., Ltd.)
F-2: polytetrafluoroethylene having a fibril forming ability (POLYFLON MPA FA-500 of DAIKIN INDUSTRIES, Ltd.)
F-3: phosphoric ester flame retardant (CR-741 of Daihachi Chemical Industry Co., Ltd.)
(Component P)
P-1: distearyl pentaerythritol diphosphite (ADKSTAB PEP-8 of ADEKA CORPORATION)

Examples 1 to 12 and Comparative Example 1

Pellets

Aromatic polycarbonate resins (component A), polylactic acids (component B), crystal nucleating agents (component C), inorganic fillers (component D), phosphorus stabilizers (component P), phosphoric ester flame retardants (component F) and the like were fed to a 30-mm-φ vented twin-screw extruder [TEX30XSST of Japan Steel Works, Ltd.] according to compositions shown in Table 1, melt-extruded at a cylinder temperature of 260° C., a screw rotation speed of 150 rpm, a discharge rate of 20 kg/h and a vent pressure reduction degree of 3 kPa, and pelletized.

As for screw configuration, a first kneading zone (comprising two forward kneading disks, one forward rotor, one backward rotor and one backward kneading disk) was provided before a side feeder position, and a second kneading zone (comprising one forward rotor and one backward rotor) was provided after the side feeder position.

Productions of the pellets in the above Examples and Comparative Example were carried out in the following manners (descriptions of the components are given by use of the above symbols).

(i) Examples 1 to 3, 6, 7 and 10 and Comparative Example 1

All components were mixed uniformly by use of a tumbler to prepare a premixture, and the mixture was fed from a first feed port of the extruder. Further, PTFE was premixed into PC-1 uniformly to a concentration of 2.5 wt %, and the mixture was fed into the tumbler.

(ii) Examples 4, 5, 8, 9, 11 and 12

The inorganic filler D-1 was fed from a second feed port by use of a side feeder, and the remaining components were premixed by use of a tumbler and fed from the first feed port. Further, PTFE was premixed into A-1 uniformly to a concentration of 2.5 wt %, and the mixture was fed into the tumbler.
(Test Pieces)

The obtained pellets were dried by a hot-air circulation-type dryer at 100° C. for 5 hours. The dried pellets were molded into test pieces of various sizes by an injection molding machine (IS-150EN of Toshiba Machine Co., Ltd.) at a cylinder temperature of 240° C., a mold temperature of 80° C. and a molding cycle of 40 seconds. By use of these test pieces, a proportion ($R_{195}$ or higher) of melt peaks at 195° C. or higher, flexural strength, flexural modulus, deflection temperature under load, combustibility and hydrolysis resistance were evaluated. The results are shown in Table 1. The physical properties were measured in the following manners. The $R_{195\ or\ higher}$ of notebook-size personal computer housing and office automation equipment exterior part were evaluated by cutting test pieces out of molded articles.

(1) Proportion ($R_{195\ or\ higher}$) of Melt Peaks at 195° C. or Higher:

A measurement was made by use of DSC in a nitrogen atmosphere at a temperature elevation rate of 20° C./min, and a proportion (%) of melt peaks at 195° C. or higher was calculated from a melt peak area at 195° C. or higher (high temperatures) and a melt peak area at 140 to 180° C. (low temperatures) in accordance with the following formula.

$$R_{195\ or\ higher}(\%) = A_{195\ or\ higher}/(A_{195\ or\ higher} + A_{140\ to\ 180}) \times 100$$

$R_{195\ or\ higher}$: proportion of melt peaks at 195° C. or higher
$A_{195\ or\ higher}$: melt peak area at 195° C. or higher
$A_{140\ to\ 180}$: melt peak area at 140 to 180° C.

(2) Flexural Strength:

Flexural strength was measured in accordance with ISO178 by use of a test piece having a length of 80 mm, a width of 10 mm and a thickness of 4 mm.

(3) Flexural Modulus:

Flexural modulus was measured in accordance with ISO178 by use of a test piece having a length of 80 mm, a width of 10 mm and a thickness of 4 mm.

(4) Deflection Temperature Under Load:

Deflection temperature under load was measured in accordance with ISO75-1 and -2 under a load of 1.80 MPa.

(5) Combustibility:

The combustibility of test piece having a thickness of 1.6 mm was evaluated in accordance with a method (UL94) provided by Underwriter Laboratory in the U.S. (only those containing a phosphoric ester flame retardant were evaluated).

(6) Hydrolysis Resistance:

The viscosity average molecular weight of test piece after it was treated in a pressure cooker tester at 120° C. and a relative humidity of 100% for 8 hours was measured, and retention between before and after the treatment was determined. The viscosity average molecular weight is a viscosity average molecular weight resulting from converting a methylene chloride soluble part in the test piece into an aromatic polycarbonate resin. The viscosity average molecular weight was determined according to the following procedure.

(Preparation of Methylene Chloride Soluble Solid Part (Sample))

A test piece was mixed with 20 to 30 times by weight of methylene chloride to dissolve a methylene chloride soluble part in the test piece. A methylene chloride insoluble part was separated by sellite filtration, methylene chloride was removed from the resulting solution, and the remaining solid part was fully dried to obtain a methylene chloride soluble solid part.

(Procedure for Determining Viscosity Average Molecular Weight)

A sample solution prepared by dissolving 0.7 g of the methylene chloride soluble solid part in 100 ml of methylene chloride and a methylene chloride solvent were measured for time of flow in an Ostwald viscometer at 20° C., and specific viscosity ($\eta_{sp}$) was calculated in accordance with the following formula.

Specific Viscosity($\eta_{sp}$)=$(t-t_0)/t_0$

[$t_0$ is time of flow of methylene chloride in seconds, and t is time of flow of sample solution in seconds.] Limiting viscosity [$\eta$] was calculated from the determined specific viscosity ($\eta_{sp}$) in accordance with the following formula.

$\eta_{sp}/c=[\eta]+0.45\times[\eta]^2 c$

M determined from the limiting viscosity [$\eta$] by use of the following formula was taken as viscosity average molecular weight. Further, as K and a in the following formula that are Mark-Houwink constants, values that are generally determined for a methylene chloride solution of a polycarbonate resin at 20° C. were used.

$[\eta]=KM^a (K=1.23\times10^{-4}, a=0.83)$ (7) Chemical Resistance
(i) Test 2 . . . Automobile Part The obtained pellets were dried by a hot-air circulation-type dryer at 100° C. for 5 hours. Thereafter, the pellets were molded into a test piece for an automobile part complying with ISO527-1 and -2 and having a thickness of 3.2 mm by an injection molding machine (IS-150EN of Toshiba Machine Co., Ltd.) at a cylinder temperature of 240° C., a mold temperature of 80° C. and a molding cycle of 40 seconds. With a distortion of 0.5% applied, the test piece was immersed in Esso regular gasoline at room temperature for 12 hours. Subsequently, the appearance of the test piece was observed visually and rated based on the occurrence of cracking. An overview of attachment of the test piece is shown in FIG. 1.

◯: No cracking occurred.
x: Cracking occurred.

The distortion ($\in$=0.005) is a value calculated from a formula $\in=(6hy)/L^2$ when the span between two points at both ends out of three points is L (100 mm), the thickness of the test piece is h (3.2 mm) and height to which the test piece was lifted from a horizontal state is y (mm).

(ii) Test 3 . . . Connector

The obtained pellets were dried by a hot-air circulation-type dryer at 100° C. for 5 hours.

Thereafter, the pellets were molded into a connector for 24 (12×2) pins having an external size of 20 mm×5 mm×5 mm by use of an injection molding machine (N40A of Japan Steel Works, Ltd.) at a cylinder temperature of 250° C. and a mold temperature of 90° C. After the obtained connector was immersed in methanol at room temperature for one week, its surface condition was observed and rated based on the following criteria.

⊚: No change is observed.
◯: Slight surface roughness of acceptable degree as a product is observed.
x: Surface roughness of unacceptable degree as a product is observed.

(iii) Test 4 . . . Notebook-Size Personal Computer Housing

Figure 2:
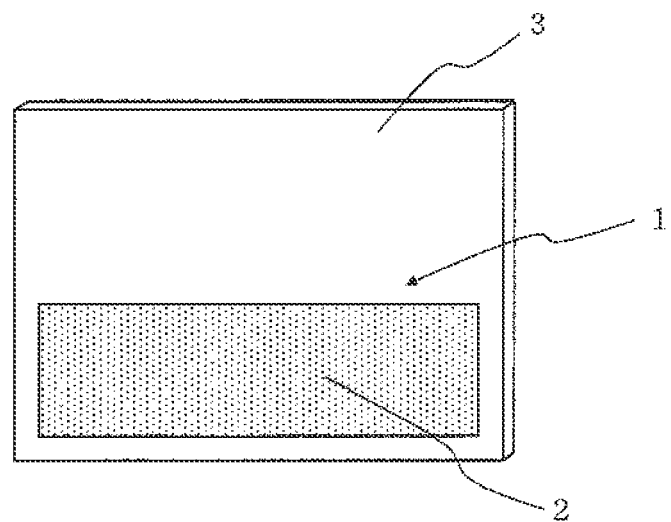
FIG. 2 is a perspective view of the front side of the housing of a notebook-size personal computer used in a chemical resistance test 4 (length: 178 mm, width: 245 mm, edge height: 10 mm, thickness: 1.2 mm).
Figure 3:
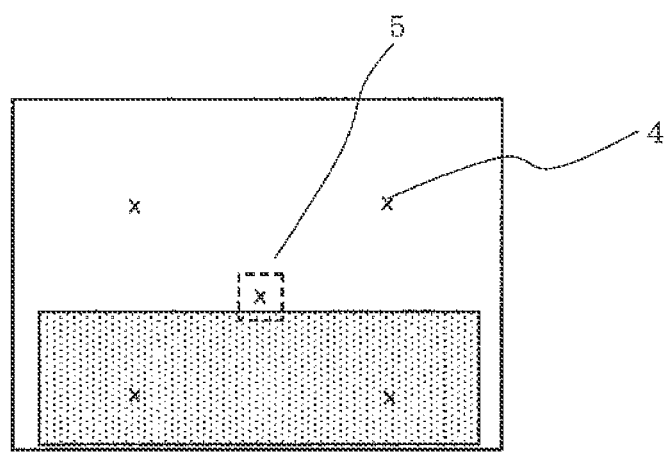
FIG. 3 is a front view of the front side of the housing of the notebook-size personal computer, with gate positions and a position from which a test piece for evaluation is cut.
Figure 4:
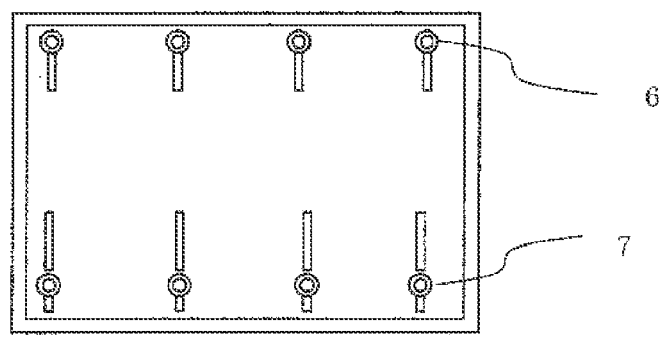
FIG. 4 is a front view of the back side of the housing of the notebook-size personal computer, with ribbed bosses (matte surface parts have bosses having ribs on the upper and lower sides).
(Explanations of Letters or Notations in FIGS. 2 to 4)
1: Notebook-size personal computer housing
2: Frosted surface side
3: Mirror side
4: Gate (five pin-gates, 0.8 mmφ)
5: Collecting test pieces portion for measurement of proportion ($R_{195\ or\ higher}$) of melt peak of 195° C. or higher
6: Boss with rib (corresponding to rear side of mirror)
7: boss with rib (corresponding to rear side of frosted surface side)

The obtained pellets were dried by a hot-air circulation-type dryer at 100° C. for 5 hours. Then, the pellets were molded into a notebook-size personal computer housing shown in FIGS. 2 to 4 by use of an injection molding machine having a cylinder inner diameter of 50 mm φ (ULTRA220-NIVA of Sumitomo Heavy Industries, Ltd.) at a cylinder temperature of 250° C. and a mold temperature of 80° C. After the notebook-size personal computer housing was immersed in methanol at room temperature for one week, its surface condition was observed and rated based on the following criteria.

⊚: No change is observed.
◯: Slight surface roughness of acceptable degree as a product is observed.
x: Surface roughness of unacceptable degree as a product is observed.

(iv) Test 5 . . . Office Automation Equipment Exterior Part

Figure 5:
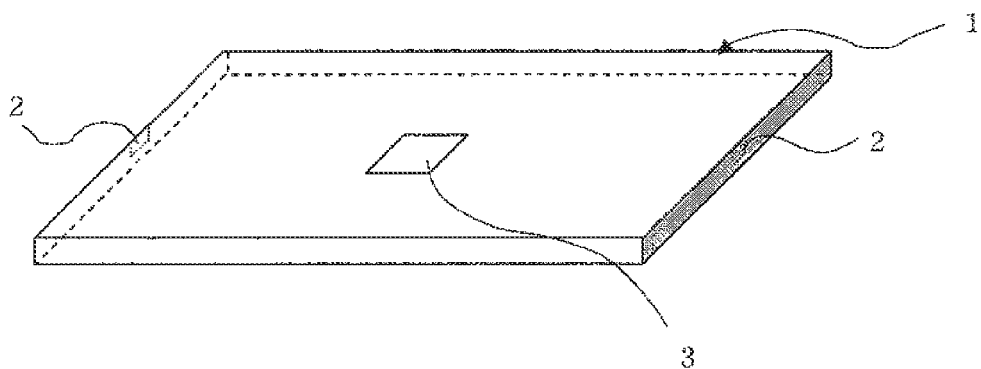
FIG. 5 is a perspective view of the front side of an OA equipment exterior part used in a chemical resistance test 5 (dimension: length=500 mm, width=600 mm, thickness: 2.5 mm).
(Explanations of Letters or Notations in FIG. 5)
1: Office Automation equipment exterior part
2: Pin-side gate (width of side-gate of 5 mm, thickness of 1.2 mm, gate bend length of 6 mm; side gate tab of width of 8 mm×length of 15 mm; diameter of pin-gate to tab portion of 1.8 mm)
3: Collecting test pieces portion for measurement of proportion ($R_{195\ or\ higher}$) of melt peak of 195° C. or higher

The obtained pellets were dried by a hot-air circulation-type dryer at 100° C. for 5 hours. Then, the pellets were molded into an office automation equipment exterior part shown in FIG. 5 by use of an injection molding machine (J1300E-05 of Japan Steel Works, Ltd.) at a cylinder temperature of 250° C. and a mold temperature of 80° C. After the office automation equipment exterior part was immersed in methanol at room temperature for one week, its surface condition was observed and rated based on the following criteria.

⊚: No change is observed.
◯: Slight surface roughness of acceptable degree as a product is observed.
x: Surface roughness of unacceptable degree as a product is observed.

TABLE 1

|  |  | C. Ex. 1 | Ex. 1 | Ex. 2 | Ex. 3 | Ex. 4 | Ex. 5 |
| --- | --- | --- | --- | --- | --- | --- | --- |
| Component B | A-1 | 100 | 100 | 100 | 100 | 100 | 100 |
| Component A | B-3 | 20 | — | — | — | — | — |
|  | B-6 | — | — | — | — | — | — |
|  | B-2 | — | — | — | — | — | — |
|  | B-5 | — | — | — | — | — | — |
|  | Polylactic Acid 1 | — | 20 | 20 | — | — | — |
|  | Polylactic Acid 2 | — | — | — | 20 | 20 | 20 |

TABLE 1-continued

| | | | | | | | |
|---|---|---|---|---|---|---|---|
| Components B + E | Polylactic Acid 3 | — | — | — | — | — | — |
| Component C | C-1 | — | — | 0.5 | — | — | 0.5 |
| Component D | D-1 | — | — | — | — | 50 | 50 |
| | D-2 | — | — | — | — | — | — |
| Others | F-1 | — | — | — | — | — | — |
| | F-2 | — | — | — | — | — | — |
| | F-3 | — | — | — | — | — | — |
| | P-1 | 0.1 | 0.1 | 0.1 | 0.1 | 0.1 | 0.1 |
| | $R_{195\ or\ higher}$ of Pellets (%) | 0 | 32 | 51 | 98 | 98 | 98 |
| Test Piece | $R_{195\ or\ higher}$ (%) | 0 | 35 | 47 | 96 | 96 | 97 |
| | Flexural Strength (MPa) | 97 | 96 | 96 | 97 | 165 | 167 |
| | Flexural Modulus (MPa) | 2300 | 2300 | 2300 | 2300 | 7300 | 7300 |
| | Deflection Temperature under Load (° C.) | 116 | 118 | 118 | 119 | 140 | 140 |
| | Combustibility (UL94) | — | — | — | — | — | — |
| | Hydrolysis Resistance Before Test | 29400 | 28500 | 28600 | 28100 | 28000 | 27800 |
| | (Viscosity Average After Test | 5300 | 10000 | 10900 | 18000 | 19300 | 19500 |
| | Molecular Weight) Retention (%) | 18 | 35 | 38 | 64 | 69 | 70 |
| Chemical | Test 2 (Automobile Part) | X | ○ | ○ | ○ | ○ | ○ |
| Resistance | Test 3 (Connector) | X | ○ | ○ | ○ | ○ | ○ |
| | Test 4 (Notebook-size Computer Housing) | X | ○ | ○ | ○ | ○ | ○ |
| | Test 5 (OA Equipment Exterior Part) | X | ○ | ○ | ○ | ○ | ○ |

| | | Ex. 6 | Ex. 7 | Ex. 8 | Ex. 9 | Ex. 10 | Ex. 11 | Ex. 12 |
|---|---|---|---|---|---|---|---|---|
| Component A | A-1 | 100 | 100 | 100 | 100 | 100 | 100 | 100 |
| Component B | B-3 | — | — | — | — | — | — | — |
| | B-6 | — | — | — | — | — | — | — |
| | B-2 | — | — | — | — | — | — | — |
| | B-5 | — | — | — | — | — | — | — |
| | Polylactic Acid 1 | — | — | — | — | — | — | — |
| | Polylactic Acid 2 | — | — | — | — | 40 | — | — |
| Components B + E | Polylactic Acid 3 | 20 | 20 | 20 | 30 | — | 100 | 180 |
| Component C | C-1 | — | — | 0.5 | 0.5 | 0.5 | 0.5 | 0.5 |
| Component D | D-1 | — | — | 50 | 10 | — | 50 | 50 |
| | D-2 | — | 10 | — | — | 10 | — | — |
| Others | F-1 | — | 15 | 15 | 15 | — | — | — |
| | F-2 | — | 0.5 | 0.5 | 0.5 | 0.5 | — | — |
| | F-3 | — | — | — | — | — | 15 | — |
| | P-1 | 0.1 | 0.1 | 0.1 | 0.1 | 0.1 | 0.1 | 0.1 |
| | $R_{195\ or\ higher}$ of Pellets (%) | 99 | 98 | 99 | 97 | 96 | 95 | 96 |
| Test Piece | $R_{195\ or\ higher}$ (%) | 97 | 96 | 98 | 98 | 95 | 96 | 94 |
| | Flexural Strength (MPa) | 97 | 85 | 160 | 130 | 135 | 162 | 180 |
| | Flexural Modulus (MPa) | 2300 | 3100 | 7400 | 4300 | 4400 | 7500 | 7900 |
| | Deflection Temperature under Load (° C.) | 117 | 84 | 125 | 93 | 81 | 140 | 145 |
| | Combustibility (UL94) | — | V-0 | V-0 | V-2 | V-2 | — | — |
| | Hydrolysis Resistance Before Test | 27900 | 27700 | 27500 | 26900 | 27200 | 27800 | 28200 |
| | (Viscosity Average After Test | 22300 | 23000 | 23100 | 22100 | 21500 | 23600 | 24000 |
| | Molecular Weight) Retention (%) | 80 | 83 | 84 | 82 | 79 | 85 | 85 |
| Chemical | Test 1 (Automobile Part) | ○ | ○ | ○ | ○ | ○ | ○ | ○ |
| Resistance | Test 2 (Connector) | ○ | ○ | ○ | ○ | ○ | ○ | ○ |
| | Test 3 (Notebook-size Computer Housing) | ○ | ○ | ○ | ○ | ○ | ○ | ○ |
| | Test 4 (OA Equipment Exterior Part) | ○ | ○ | ○ | ○ | ○ | ○ | ○ |

C. Ex.: Comparative Example,
Ex.: Example

As is clear from Table 1, the resin compositions of the present invention show high $R_{195\ or\ higher}$ and a high stereocomplex crystal content and are, as a result, excellent in hydrolysis resistance. It can be seen that hydrolysis resistance is further improved by containing the terminal blocking agent (component E). Further, the molded articles of the present invention show excellent hydrolysis resistance and chemical resistance. Further, it can be seen that mechanical strength is improved by containing the inorganic filler (component D). Further, it can be seen that flame retardancy is improved by containing the flame retardant (component F).

Example 13

100 parts by weight of the polylactic acid 3 produced in Production Example 7, 100 parts by weight of polyethylene terephthalate resin (TR-8550 of TEIJIN CHEMICALS LTD.), 0.1 parts by weight of bis(2,4-di-t-butylphenyl)pentaerythritol diphosphite (ADKSTAB PEP-24G of ADEKA CORPORATION) and 0.05 parts by weight of trimethyl phosphate (TMP of Daihachi Chemical Industry Co., Ltd.) were fed to a 30-mm-φ vented twin-screw extruder (TEX30XSST of Japan Steel Works, Ltd.), melt-extruded at a cylinder temperature of 250° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 250° C., a mold temperature of 110° C. and a molding cycle of 180 seconds to obtain a molded piece.

Example 14

100 parts by weight of the polylactic acid 3 produced in Production Example 7, 100 parts by weight of polybutylene terephthalate resin (DURANEX 700FP of WinTech Polymer Ltd.), 0.1 parts by weight of bis(2,4-di-t-butylphenyl)pentaerythritol diphosphite (ADKSTAB PEP-24G of ADEKA CORPORATION) and 0.1 parts by weight of hindered phenol antioxidant (IRGANOX 1076 of Ciba Specialty Chemicals) were fed to a 30-mm-φ vented twin-screw extruder (TEX30XSST of Japan Steel Works, Ltd.), melt-extruded at a cylinder temperature of 250° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 250° C., a mold temperature of 110° C. and a molding cycle of 180 seconds to obtain a molded piece.

Example 15

100 parts by weight of the polylactic acid 3 produced in Production Example 7, 100 parts by weight of polyethylene naphthalate resin (TN-8065 of TEIJIN CHEMICALS LTD.), 0.1 parts by weight of bis(2,6-di-t-butyl-4-methylphenyl) pentaerythritol diphosphite (ADKSTAB PEP-36 of ADEKA CORPORATION) and 0.1 parts by weight of hindered phenol antioxidant (IRGANOX 1076 of Ciba Specialty Chemicals) were fed to a 30-mm-φ vented twin-screw extruder (TEX30XSST of Japan Steel Works, Ltd.), melt-extruded at a cylinder temperature of 270° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 270° C., a mold temperature of 110° C. and a molding cycle of 180 seconds to obtain a molded piece.

Example 16

100 parts by weight of the polylactic acid 3 produced in Production Example 7, 100 parts by weight of polybutylene naphthalate resin (TQB-OT of TEIJIN CHEMICALS LTD.), 0.1 parts by weight of bis(2,6-di-t-butyl-4-methylphenyl) pentaerythritol diphosphite (ADKSTAB PEP-36 of ADEKA CORPORATION) and 0.1 parts by weight of hindered phenol antioxidant (IRGANOX 1076 of Ciba Specialty Chemicals) were fed to a 30-mm-φ vented twin-screw extruder (TEX30XSST of Japan Steel Works, Ltd.), melt-extruded at a cylinder temperature of 270° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 270° C., a mold temperature of 110° C. and a molding cycle of 180 seconds to obtain a molded piece.

Example 17

100 parts by weight of the polylactic acid 3 produced in Production Example 7, 100 parts by weight of ABS resin (SANTAC UT-61 of NIPPON A&L INC.), 0.1 parts by weight of distearyl pentaerythritol diphosphite (ADKSTAB PEP-8 of ADEKA CORPORATION) and 0.05 parts by weight of trimethyl phosphate (TMP of Daihachi Chemical Industry Co., Ltd.) were fed to a 30-mm-φ vented twin-screw extruder (TEX30XSST of Japan Steel Works, Ltd.), melt-extruded at a cylinder temperature of 230° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 230° C., a mold temperature of 80° C. and a molding cycle of 180 seconds to obtain a molded piece.

Example 18

100 parts by weight of the polylactic acid 3 produced in Production Example 7, 100 parts by weight of ABS resin (KRALASTIC GA-704 of NIPPON A&L INC.), 0.1 parts by weight of distearyl pentaerythritol diphosphite (ADKSTAB PEP-8 of ADEKA CORPORATION) and 0.05 parts by weight of trimethyl phosphate (TMP of Daihachi Chemical Industry Co., Ltd.) were fed to a 30-mm-φ vented twin-screw extruder (TEX30XSST of Japan Steel Works, Ltd.), melt-extruded at a cylinder temperature of 230° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 230° C., a mold temperature of 80° C. and a molding cycle of 180 seconds to obtain a molded piece.

Example 19

100 parts by weight of the polylactic acid 3 produced in Production Example 7, 100 parts by weight of ABS resin (KRALASTIC 53710 of NIPPON A&L INC.), 0.1 parts by weight of distearyl pentaerythritol diphosphite (ADKSTAB PEP-8 of ADEKA CORPORATION) and 0.05 parts by weight of trimethyl phosphate (TMP of Daihachi Chemical Industry Co., Ltd.) were fed to a 30-mm-φ vented twin-screw extruder (TEX30XSST of Japan Steel Works, Ltd.), melt-extruded at a cylinder temperature of 230° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS-150EN of Toshiba Machine Co., Ltd.) at a cylinder temperature of 230° C., a mold temperature of 80° C. and a molding cycle of 180 seconds to obtain a molded piece.

Example 20

100 parts by weight of the polylactic acid 3 produced in Production Example 7, 100 parts by weight of polyethylene resin (HI-ZEX 7000F of Prime Polymer Co., Ltd.), 0.1 parts by weight of distearyl pentaerythritol diphosphite (ADKSTAB PEP-8 of ADEKA CORPORATION) and 0.1 parts by weight of hindered phenol antioxidant (IRGANOX 1076 of Ciba Specialty Chemicals) were fed to a 30-mm-φ vented twin-screw extruder (TEX30XSST of Japan Steel Works, Ltd.), melt-extruded at a cylinder temperature of 230° C., a screw rotation speed of 150 rpm, a discharge rate of 20 kg/h and a vent pressure reduction degree of 3 kPa, and pelletized. The obtained pellets were dried by a hot-air circulation-type dryer at 100° C. for 5 hours. After dried, the pellets were injection-molded by an injection molding machine (IS- 150EN of Toshiba Machine Co., Ltd.) at a cylinder temperature of 230° C., a mold temperature of 80° C. and a molding cycle of 180 seconds to obtain a molded piece.

All components were mixed uniformly by use of a tumbler to prepare a premixture, and the mixture was fed from the first feed port of the extruder.

Examples 21 to 24 and Comparative Example 2

Optical Disk Substrates (Pellets)

Aromatic polycarbonate resins (component A), polylactic acids (component B), crystal nucleating agents (component C) and phosphorus stabilizers (component P) were mixed uniformly by use of a tumbler according to compositions shown in Table 2 to prepare premixtures, and the mixtures were fed to a 30-mm-φ vented twin-screw extruder [TEX30XSST of Japan Steel Works, Ltd.] from its first feed port, melt-extruded at a cylinder temperature of 260° C., a screw rotation speed of 150 rpm, a discharge rate of 20 kg/h and a vent pressure reduction degree of 3 kPa, and pelletized.

As for screw configuration, a first kneading zone (comprising two forward kneading disks, one forward rotor, one backward rotor and one backward kneading disk) was provided before a side feeder position, and a second kneading zone (comprising one forward rotor and one backward rotor) was provided after the side feeder position.

(Test Pieces)

The obtained pellets were dried by a hot-air circulation-type dryer at 100° C. for 5 hours. After dried, the pellets were molded into test pieces for evaluating flexural strength, flexural modulus, deflection temperature under load and hydrolysis resistance, by an injection molding machine (IS-150EN of Toshiba Machine Co., Ltd.) at a cylinder temperature of 240° C., a mold temperature of 80° C. and a molding cycle of 80 seconds. The following properties of the test pieces were measured in the same manners as described above.
(1) Proportion of Melt Peaks at 195° C. or Higher
(2) Flexural Strength
(3) Flexural Modulus
(4) Deflection Temperature under Load
(5) Hydrolysis Resistance
The results of measurements are shown in Table (Optical Disk Substrates)

Then, optical disk substrates having a diameter of 120 mm and a thickness of 1.2 mm were molded from the dried pellets by use of an injection molding machine (M35B-D-DM of MEIKI CO., LTD.) and a CD stamper (pit depth: 100 nm, pit pitch: 1.6 μm) at a cylinder temperature of 250° C., a mold temperature of 80° C. and a molding cycle of 60 seconds.

Various properties of the optical disk substrates were measured. The measurement results thereof are shown in Table 2.
(1) Chemical Resistance:

After the optical disk substrate was immersed in methanol at room temperature for one week, its surface condition was observed and rated based on the following criteria.

◎: No change is observed.

○: Slight surface roughness of acceptable degree as a product is observed.

x: Surface roughness of unacceptable degree as a product is observed.

(2) Transfer Rate:

The depths of grooves transferred onto the optical disk substrate were measured at 5 points which were at 40 mm from the center toward the periphery, by use of an electron microscope (SPI3700 of Seiko Instruments Inc.). Transferability was expressed as a transfer rate represented by the following formula.

Transfer Rate(%)=100×Depth of Groove on Disk/ Depth of Groove of Stamper

The closer this value is to 100%, the better transferability the optical disk substrate has.
(3) Surface Condition:

The surface condition of the stamper nontransferred surface of the optical disk substrate was observed at a position which was at 40 mm from the center of the stamper toward the periphery, by means of a confocal reflecting microscope (MX50 of Olympus Corporation) and rated based on the following criteria.

○: Smoothness abnormalities such as exposed foreign matters and fine sinks are not observed at all.

Δ: Some smoothness abnormalities are observed.

x: Smoothness abnormalities are clearly observed.

(Optical Disks)

Then, optical disks were prepared in the following manner. On the optical disk substrate, an Al metal layer having a thickness of 70 nm was formed by sputtering to form a recording layer of a compact disk. After an ultraviolet curable resin was coated on this recording layer to a thickness of 10 μm by spin coating, the resin was cured by ultraviolet irradiation to form a protective layer. The heat resistance of the optical disk was evaluated in the following manner.
(1) Heat Resistance:

After the optical disk was heat-treated under the conditions provided in JIS S 8605 (55° C., relative humidity of 70%, 96 hours), it was played on a commercial CD player. The disk was rated as "○" if it could be played without problems and rated as "x" if not.

TABLE 2

|  |  | C. Ex. 2 | Ex. 21 | Ex. 22 | Ex. 23 | Ex. 24 |
| --- | --- | --- | --- | --- | --- | --- |
| Component A | A-1 | 100 | 100 | 100 | 100 | 100 |
| Component B | B-3 | 20 | — | — | — | — |
|  | B-6 | — | — | — | — | — |
|  | B-2 | — | — | — | — | — |
|  | B-5 | — | — | — | — | — |
|  | Polylactic Acid 1 | — | 20 | 20 | — | — |
|  | Polylactic Acid 2 | — | — | — | 20 | — |
|  | Polylactic Acid 3 | — | — | — | — | 20 |
| Component C | C-1 | — | — | 0.5 | — | — |
| Other | P-1 | 0.1 | 0.1 | 0.1 | 0.1 | 0.1 |
| Test Piece | $R_{195\ or\ higher}$ (%) | 0 | 35 | 47 | 96 | 97 |
|  | Flexural Strength (MPa) | 97 | 96 | 96 | 97 | 97 |
|  | Flexural Modulus (MPa) | 2300 | 2300 | 2300 | 2300 | 2300 |

TABLE 2-continued

|  |  | C. Ex. 2 | Ex. 21 | Ex. 22 | Ex. 23 | Ex. 24 |
|---|---|---|---|---|---|---|
|  | Deflection Temperature under Load (° C.) | 116 | 118 | 118 | 119 | 117 |
|  | Hydrolysis Resistance (Molecular Weight Retention (%)) | 18 | 35 | 38 | 64 | 80 |
| Optical Disk Substrate | Chemical Resistance | X | ◯ | ◯ | ◎ | ◎ |
|  | Transfer Rate (%) | 88 | 92 | 90 | 90 | 89 |
|  | Surface Condition | ◯ | ◯ | ◯ | ◯ | ◯ |
|  | Heat Resistance of Optical Disk (JIS S 8605) | ◯ | ◯ | ◯ | ◯ | ◯ |

C. Ex.: Comparative Example,
Ex.: Example

As is clear from Table 2, the resin compositions of the present invention are excellent in heat resistance and hydrolysis resistance. According to the present invention, an optical disk substrate and an optical disk are obtained that are excellent in chemical resistance, heat resistance and transferability and have a good surface condition.

Examples 25 to 28 and Comparative Examples 3 to 6

Pellets

Polylactic acids (component B), crystal nucleating agents (component C) and inorganic fillers (component D) were fed to a 30-mm-φ vented twin-screw extruder [TEX30XSST of Japan Steel Works, Ltd.] according to compositions shown in Table 3, melt-extruded at a cylinder temperature of 260° C., a screw rotation speed of 150 rpm, a discharge rate of 20 kg/h and a vent pressure reduction degree of 3 kPa, and pelletized.

As for screw configuration, a first kneading zone (comprising two forward kneading disks, one forward rotor, one backward rotor and one backward kneading disk) was provided before a side feeder position, and a second kneading zone (comprising one forward rotor and one backward rotor) was provided after the side feeder position.

Productions of the pellets in the above Examples and Comparative Example were carried out in the following manners (descriptions of the components are given by use of the above symbols).

(i) Examples 25 to 27 and Comparative Examples 3 to 6

All components were mixed uniformly by use of a tumbler to prepare a premixture, and the mixture was fed from a first feed port of the extruder.

(ii) Example 28

The inorganic filler D-1 was fed from a second feed port by use of a side feeder, and the remaining components were premixed by use of a tumbler and fed from the first feed port.

(Test Pieces)

The obtained pellets were dried by a hot-air circulation-type dryer at 100° C. for 5 hours. The dried pellets were molded into test pieces for evaluating flexural strength, flexural modulus, deflection temperature under load and hydrolysis resistance, by an injection molding machine (IS-150EN of Toshiba Machine Co., Ltd.) at mold temperatures shown in Table 3, a cylinder temperature of 240° C. and a molding cycle of 180 seconds. By use of these test pieces, the following properties excluding hydrolysis resistance and chemical resistance 1 were measured in the same manners as described above. The measurement results and injection moldabilities thereof are shown in Table 3. The $R_{195\ or\ higher}$ of notebook-size personal computer housing and office automation equipment exterior part were evaluated by cutting test pieces out of molded articles.

(1) Proportion ($R_{195\ or\ higher}$) of Melt Peaks at 195° C. or higher
(2) Flexural Strength
(3) Flexural Modulus
(4) Deflection Temperature under Load
(5) Hydrolysis Resistance:

The molecular weight of test piece prepared in accordance with IS0178 after it was treated in a pressure cooker tester at 120° C. and a relative humidity of 100% for 8 hours was evaluated by retention with respect to the value before the treatment. To calculate the retention, a weight average molecular weight (Mw) in terms of polystyrene determined from GPC was used.

(6) Chemical Resistance:
(i) Test 1

After the same test piece as used for evaluation of the above flexural strength was immersed in methanol at room temperature for one month, its surface condition was observed and rated based on the following criteria.
x: Surface roughness occurred.
◯: Good.
(ii) Test 2 (automobile part), (iii) test 3 (connector), (iv) test 4 (notebook-size personal computer housing) and (v) test 5 (OA equipment exterior part) were measured and evaluated in the same manners as described above.

TABLE 3

|  |  | C. Ex. 3 | C. Ex. 4 | C. Ex. 5 | C. Ex. 6 | Ex. 25 | Ex. 26 | Ex. 27 | Ex. 28 |
|---|---|---|---|---|---|---|---|---|---|
| Component B | B-3 | 100 | 100 | — | — | — | — | — | — |
|  | B-6 | — | — | — | — | — | — | — | — |
|  | B-2 | — | — | — | — | — | — | — | — |
|  | B-5 | — | — | — | — | — | — | — | — |
|  | Polylactic Acid 1 | — | — | 100 | — | — | — | — | — |
|  | Polylactic Acid 4 | — | — | — | 100 | — | — | — | — |
|  | Polylactic Acid 5 | — | — | — | — | 100 | — | — | — |
|  | Polylactic Acid 2 | — | — | — | — | — | 100 | — | 100 |

TABLE 3-continued

|  |  | C. Ex. 3 | C. Ex. 4 | C. Ex. 5 | C. Ex. 6 | Ex. 25 | Ex. 26 | Ex. 27 | Ex. 28 |
|---|---|---|---|---|---|---|---|---|---|
| Components B + E | Polylactic Acid 3 | — | — | — | — | — | — | 100 | — |
| Component C | C-1 | 1 | 1 | 1 | 1 | 1 | 1 | 1 | 1 |
| Component D | D-1 | — | — | — | — | — | — | — | 40 |
|  | $R_{195\ or\ higher}$ of Pellets (%) | 0 | 0 | 40 | 55 | 84 | 97 | 96 | 97 |
|  | Mold Temperature (° C.) | 110 | 30 | 110 | 110 | 110 | 110 | 110 | 110 |
|  | Injection Moldability | I.M. | M | I.M. | I.M. | M | M | M | M |
| Test Piece | $R_{195\ or\ higher}$ (%) | — | 0 | — | — | 85 | 97 | 96 | 98 |
|  | Flexural Strength (MPa) | — | 96 | — | — | 97 | 98 | 97 | 142 |
|  | Flexural Modulus (MPa) | — | 3500 | — | — | 3800 | 3800 | 3800 | 9000 |
|  | Deflection Temperature under Load (° C.) | — | 50 | — | — | 66 | 65 | 66 | 180 |
|  | Hydrolysis Resistance Before Test | — | 112000 | — | — | 107000 | 106000 | 103000 | 106000 |
|  | (Weight Average Molecular After Test | — | 9000 | — | — | 26000 | 33000 | 44000 | 32000 |
|  | Weight) Retention (%) | — | 8 | — | — | 24 | 31 | 43 | 30 |
| Chemical | Test 1 | — | X | — | — | ○ | ○ | ○ | ○ |
| Resistance | Test 2 (Automobile Part) | — | X | — | — | ○ | ○ | ○ | ○ |
|  | Test 3 (Connector) | — | X | — | — | ○ | ○ | ○ | ○ |
|  | Test 4 (Notebook-size Computer Housing) | — | X | — | — | ○ | ○ | ○ | ○ |
|  | Test 5 (OA Equipment Exterior Part) | — | X | — | — | ○ | ○ | ○ | ○ |

C. Ex.: Comparative Example,
Ex.: Example
I.M.: Immoldable,
M: Moldable

It can be clearly seen from the results shown in Table 3 that the resin compositions of the present invention have excellent injection moldability and the obtained molded articles have significantly improved hydrolysis resistance. Further, it can be seen that improvements in mechanical properties due to inclusion of the inorganic filler and a further improvement in hydrolysis resistance due to inclusion of the terminal blocking agent have been achieved.

Examples 29 to 31 and Comparative Examples 7 to 10

Optical Disk Substrates

Pellets were prepared in the following manner, and flexural test pieces complying with IS0178 and disk substrates were produced and evaluated.
(Pellets)
Polylactic acids (component B), crystal nucleating agents (component C) and phosphorus stabilizers (component P) were mixed uniformly by use of a tumbler according to compositions shown in Table 4 to prepare premixtures, and the mixtures were fed to a 30-mm-φ vented twin-screw extruder [TEX30XSST of Japan Steel Works, Ltd.] from its first feed port, melt-extruded at a cylinder temperature of 260° C., a screw rotation speed of 150 rpm, a discharge rate of 20 kg/h and a vent pressure reduction degree of 3 kPa, and pelletized.

As for screw configuration, a first kneading zone (comprising two forward kneading disks, one forward rotor, one backward rotor and one backward kneading disk) was provided before a side feeder position, and a second kneading zone (comprising one forward rotor and one backward rotor) was provided after the side feeder position.
(Test Pieces)
The obtained pellets were dried by a hot-air circulation-type dryer at 100° C. for 5 hours. Thereafter, the pellets were molded into test pieces for evaluating flexural strength, flexural modulus and deflection temperature under load, by an injection molding machine (IS-150EN of Toshiba Machine Co., Ltd.) at mold temperatures shown in Table 4, a cylinder temperature of 240° C. and a molding cycle of 180 seconds. The test pieces were evaluated for the following items in the same manners as described above.

(1) Proportion of Melt Peaks at 195° C. or Higher
(2) Flexural Strength
(3) Flexural Modulus
(4) Deflection Temperature under Load
(5) Hydrolysis Resistance
(Optical Disk Substrates)
Then, optical disk substrates having a diameter of 120 mm and a thickness of 1.2 mm were molded from the dried pellets by use of an injection molding machine (M35B-D-DM of MEIKI CO., LTD.) and a CD stamper (pit depth: 100 nm, pit pitch: 1.6 μm) at mold temperatures shown in Table 4, a cylinder temperature of 250° C. and a molding cycle of 60 seconds. The following properties of the obtained optical disk substrates were measured in the same manners as described above. The measurement results and injection moldabilities thereof are shown in Table 4.

(1) Transfer Rate
(2) Surface Condition
(Optical Disks)
Then, optical disks were prepared in the following manner. On the optical disk substrate, an Al metal layer having a thickness of 70 nm was formed by sputtering to form a recording layer of a compact disk. After an ultraviolet curable resin was coated on this recording layer to a thickness of 10 μm by spin coating, the resin was cured by ultraviolet irradiation to form a protective layer. The heat resistance of the optical disk was evaluated in the same manner as described above.

TABLE 4

|  |  | C. Ex. 7 | C. Ex. 8 | C. Ex. 9 | C. Ex. 10 | Ex. 29 | Ex. 30 | Ex. 31 |
|---|---|---|---|---|---|---|---|---|
| Component B | B-3 | 100 | 100 | — | — | — | — | — |
|  | B-6 | — | — | — | — | — | — | — |
|  | B-2 | — | — | — | — | — | — | — |

TABLE 4-continued

|  |  | C. Ex. 7 | C. Ex. 8 | C. Ex. 9 | C. Ex. 10 | Ex. 29 | Ex. 30 | Ex. 31 |
|---|---|---|---|---|---|---|---|---|
|  | B-5 | — | — | — | — | — | — | — |
|  | Polylactic Acid 1 | — | — | 100 | — | — | — | — |
|  | Polylactic Acid 4 | — | — | — | 100 | — | — | — |
|  | Polylactic Acid 5 | — | — | — | — | 100 | — | — |
|  | Polylactic Acid 2 | — | — | — | — | — | 100 | — |
|  | Polylactic Acid 3 | — | — | — | — | — | — | 100 |
| Component C | C-1 | 1 | 1 | 1 | 1 | 1 | 1 | 1 |
| Other | P-1 | 0.1 | 0.1 | 0.1 | 0.1 | 0.1 | 0.1 | 0.1 |
|  | $R_{195\ or\ higher}$ of Pellets (%) | 0 | 0 | 40 | 55 | 84 | 97 | 96 |
| Test Piece | Mold Temperature of Injection Molding (° C.) | 110 | 30 | 110 | 110 | 110 | 110 | 110 |
|  | Injection Moldability | I.M. | M | I.M. | I.M. | M | M | M |
|  | $R_{195\ or\ higher}$ (%) | — | 0 | — | — | 85 | 97 | 96 |
|  | Flexural Strength (MPa) | — | 96 | — | — | 97 | 98 | 97 |
|  | Flexural Modulus (MPa) | — | 3500 | — | — | 3800 | 3800 | 3800 |
|  | Deflection Temperature under Load (° C.) | — | 50 | — | — | 66 | 65 | 66 |
|  | Hydrolysis Resistance (Molecular Weight Retention (%)) | — | 8 | — | — | 24 | 31 | 43 |
| Optical Disk Substrate | Mold Temperature of Injection Molding (° C.) | 80 | 80 | 80 | 80 | 80 | 80 | 80 |
|  | Injection Moldability | I.M. | M | I.M. | I.M. | M | M | M |
|  | Substrate Transfer Rate (%) | — | 30 | — | — | 95 | 96 | 94 |
|  | Surface Condition of Substrate | — | X | — | — | ○ | ○ | ○ |
|  | Heat Resistance of Optical Disk (JIS S 8605) | — | X | — | — | ○ | ○ | ○ |

C. Ex.: Comparative Example,
Ex.: Example
I.M.: Immoldable,
M: Moldable

As is clear from Table 4, the resin compositions of the present invention have excellent injection moldability. According to the present invention, optical disk substrates that are excellent in transfer rate, surface condition, heat resistance and hydrolysis resistance are obtained.

Examples 32 to 34 and Comparative Example 11

Extruded Articles

Polylactic acid pellets of compositions shown in Table 5 were prepared and dried at 90° C. for 5 hours. Then, the pellets were fed to an extruder hopper, molten at a melt temperature of 250° C., extruded onto a rotating cooling drum having a surface temperature of 25° C. through a 1-mm slit die, and quenched to obtain sheets having a thickness of 0.3 mm. The following properties of the obtained sheets were evaluated in the following manners. A proportion of melt peaks at 195° C. or higher was evaluated in the same manner as described above. The results are shown in Table 5.

(1) Proportion of Melt Peaks at 195° C. or Higher
(2) Tensile Strength, Modulus of tensile elasticity:
These were measured in accordance with JIS-C2318.
(3) Hydrolysis Resistance:
The weight average molecular weight (Mw) of the polylactic acid after the sheet was treated in a thermo-hygrostat at 65° C. and a relative humidity of 95% for 100 hours was evaluated by retention with respect to the value before the treatment.

TABLE 5

|  |  | C. Ex. 11 | Ex. 32 | Ex. 33 | Ex. 34 |
|---|---|---|---|---|---|
| Component B | B-3 | 100 | — | — | — |
|  | B-6 | — | — | — | — |
|  | B-2 | — | — | — | — |
|  | B-5 | — | — | — | — |
|  | Polylactic Acid 1 | — | — | — | — |
|  | Polylactic Acid 4 | — | — | — | — |
|  | Polylactic Acid 5 | — | 100 | — | — |
|  | Polylactic Acid 2 | — | — | 100 | — |
| Components B + C | Polylactic Acid 3 | — | — | — | 100 |
| Pellets | $R_{195\ or\ higher}$ (%) | 0 | 84 | 97 | 96 |
| Extruded Article | $R_{195\ or\ higher}$ of Extruded Article (%) | 0 | 82 | 97 | 97 |
|  | Tensile Strength (MPa) | 70 | 72 | 73 | 72 |
|  | Modulus of tensile elasticity (MPa) | 2,000 | 2,100 | 2,100 | 2,100 |
|  | Hydrolysis Resistance (Molecular Weight Retention (%)) | 55 | 86 | 90 | 98 |

C. Ex.: Comparative Example,
Ex.: Example

As is clear from Table 5, the extruded articles of the present invention have excellent mechanical properties and hydrolysis resistance.

Examples 35 to 37 and Comparative Example 12

Heat Molded Articles

Polylactic acid pellets of compositions shown in Table 6 were prepared and dried at 90° C. for 5 hours. Then, the pellets were fed to an extruder hopper, molten at a melt temperature of 250° C., extruded onto a rotating cooling drum having a surface temperature of 25° C. through a 1-mm slit die, and quenched to obtain sheets having a thickness of 0.5 mm. After preheated, these sheets were subjected to vacuum air-pressure molding by use of FC-1APA-W type vacuum air-pressure molding machine of Asano Laboratories Co., Ltd. with a tray-shaped mold having an opening of 56 mm×121 mm, a bottom of 38 mm×102 mm and a depth of 20 mm attached thereto. Moldabilities and the properties of the obtained heat molded articles were evaluated in the following manners. A proportion of melt peaks at 195° C. or higher was evaluated in the same manner as described above. The results are shown in Table 6.

(1) Proportion of Melt Peaks at 195° C. or Higher
(2) Moldability:
This was evaluated by observing the shape of the heat molded article.

(3) Hydrolysis Resistance:
The weight average molecular weight (Mw) of the polylactic acid after the heat molded article was treated in a thermo-hygrostat at 65° C. and a relative humidity of 95% for 100 hours was evaluated by retention with respect to the value before the treatment.

As is clear from Table 6, the resin compositions of the present invention have excellent heat moldability. The heat molded articles of the present invention have excellent hydrolysis resistance.

Examples 38 to 40 and Comparative Example 13

Blow Molded Articles

Polylactic acid pellets of compositions shown in Table 7 were prepared and dried at 90° C. for 5 hours. Then, the pellets were injection-molded into preforms by an injection molding machine 100DM of MEIKI CO., LTD., and the obtained preforms were blow-molded into hollow molded articles having an inner volume of 1.55 liters and a barrel wall thickness of 300 p.m. As for conditions for the injection molding, the cylinder temperature was set at 250° C., and the molding cycle was 60 seconds. The blow molding was carried out by use of an LB01 blow molding machine of CORPO-PLAST CO., LTD. The properties of the obtained hollow molded articles were measured in the following manners. A proportion of melt peaks at 195° C. or higher was evaluated in the same manner as described above. The results are shown in Table 7.

(1) Proportion of Melt Peaks at 195° C. or Higher
(2) Drop Breakage Rate:
After carbonated water was filled in the hollow molded article, it was dropped from a height of 0.5 m onto concrete having a slope angle of 30° to determine a breakage rate, thereby evaluating impact resistance.

(3) Hydrolysis Resistance:
The weight average molecular weight (Mw) of the polylactic acid after the hollow molded article was treated in a thermo-hygrostat at 65° C. and a relative humidity of 95% for 100 hours was evaluated by retention with respect to the value before the treatment.

TABLE 6

|  |  | C. Ex. 12 | Ex. 35 | Ex. 36 | Ex. 37 |
| --- | --- | --- | --- | --- | --- |
| Component B | B-3 | 100 | — | — | — |
|  | B-6 | — | — | — | — |
|  | B-2 | — | — | — | — |
|  | B-5 | — | — | — | — |
|  | Polylactic Acid 1 | — | — | — | — |
|  | Polylactic Acid 4 | — | — | — | — |
|  | Polylactic Acid 5 | — | 100 | — | — |
|  | Polylactic Acid 2 | — | — | 100 | — |
| Components B + E | Polylactic Acid 3 | — | — | — | 100 |
| Pellets | $R_{195\ or\ higher}$ (%) | 0 | 84 | 97 | 96 |
| Heat Molded | Moldability | Good | Good | Good | Good |
| Article | $R_{195\ or\ higher}$ of Heat Molded Article (%) | 0 | 82 | 98 | 97 |
|  | Hydrolysis Resistance (Molecular Weight Retention (%)) | 54 | 86 | 91 | 98 |

C. Ex.: Comparative Example,
Ex.: Example

TABLE 7

| | | C. Ex. 13 | Ex. 38 | Ex. 39 | Ex. 40 |
|---|---|---|---|---|---|
| Component B | B-3 | 100 | — | — | — |
| | B-6 | — | — | — | — |
| | B-2 | — | — | — | — |
| | B-5 | — | — | — | — |
| | Polylactic Acid 1 | — | — | — | — |
| | Polylactic Acid 4 | — | — | — | — |
| | Polylactic Acid 5 | — | 100 | — | — |
| | Polylactic Acid 2 | — | — | 100 | — |
| Components B + E | Polylactic Acid 3 | — | — | — | 100 |
| Pellets | $R_{195\ or\ higher}$ (%) | 0 | 84 | 97 | 96 |
| Blow Molded Article | $R_{195\ or\ higher}$ (%) | 0 | 81 | 97 | 98 |
| | Drop Breakage Rate (%) | 5 | 0 | 0 | 0 |
| | Hydrolysis Resistance (Molecular Weight Retention (%)) | 56 | 84 | 90 | 98 |

C. Ex.: Comparative Example,
Ex.: Example

As is clear from Table 7, the blow molded articles of the present invention have excellent mechanical properties and hydrolysis resistance. Further, it can be seen that the terminal blocking agent (component E) improves hydrolysis resistance.

Examples 41 to 43 and Comparative Example 14

Foam Molded Articles

Polylactic acid pellets of compositions shown in Table 8 were prepared and dried at 90° C. for 5 hours. Then, the pellets were subjected to extrusion foaming using a single-screw extruder (diameter: 40 mm, L/D: 30) with 5-mm-φ nozzle mold attached thereto. In the extrusion foaming, liquefied butane gas as a foaming agent was injected at the middle of the extrusion cylinder in a proportion of 2.0 parts based on 100 parts of molten material, and a good rod-shaped foam molded article comprising fine bubbles was obtained at a rate of 5 kg/hr under the following conditions, i.e. at a temperature of the feed section of the extruder of 150 to 180° C., a temperature of the compression section of the extruder of 180 to 220° C., a temperature of the melting section of the extruder of 180 to 220° C., a temperature of the head of the extruder of 160 to 200° C., a temperature of the mold of the extruder of 160 to 200° C., and a screw rotation speed of 32 rpm.

The foam molded article was sampled at 20 minutes after the start of production of the foam molded article, and the physical properties of the foam molded article were measured in the following manners. A proportion of melt peaks at 195° C. or higher was evaluated in the same manner as described above.

(1) Proportion of Melt Peaks at 195° C. or Higher (2) Apparent Density:

This was measured in accordance with JIS-K7222.

(3) Condition of Bubbles:

The condition of bubbles in the foam molded article was evaluated by an optical microscope (magnification: 60-fold).

(4) Hydrolysis Resistance:

The weight average molecular weight (Mw) of the polylactic acid after the foam molded article was treated in a thermo-hygrostat at 65° C. and a relative humidity of 95% for 100 hours was evaluated by retention with respect to the value before the treatment. The measurement results thereof are shown in Table 8.

TABLE 8

| | | C. Ex. 14 | Ex. 41 | Ex. 42 | Ex. 43 |
|---|---|---|---|---|---|
| Component B | B-3 | 100 | — | — | — |
| | B-6 | — | — | — | — |
| | B-2 | — | — | — | — |
| | B-5 | — | — | — | — |
| | Polylactic Acid 1 | — | — | — | — |
| | Polylactic Acid 4 | — | — | — | — |
| | Polylactic Acid 5 | — | 100 | — | — |
| | Polylactic Acid 2 | — | — | 100 | — |
| Components B + E | Polylactic Acid 3 | — | — | — | 100 |
| Pellets | $R_{195\ or\ higher}$ (%) | 0 | 84 | 97 | 96 |
| Foam Molded Article | $R_{195\ or\ higher}$ (%) | 0 | 83 | 97 | 98 |
| | Density (kg/m³) | 600 | 520 | 510 | 520 |
| | Condition of Bubbles | Small | Fine | Fine | Fine |
| | Hydrolysis Resistance (Molecular Weight Retention (%)) | 54 | 85 | 92 | 98 |

C. Ex.: Comparative Example,
Ex.: Example

As shown in Table 8, the foam molded articles of the present invention have excellent hydrolysis resistance. Further, the foam molded article has further improved hydrolysis resistance by containing the terminal blocking agent (component E).

Effect of the Invention

First Aspect

Since the present invention uses a polylactic acid obtained from biomass resources, it can provide a resin composition and a molded article that cause small burdens on the environment. The resin composition of the present invention that comprises the thermoplastic resin (component A) and the polylactic acid (component B) has a large $R_{195\ or\ higher}$ value, high crystallinity and a high melting point. The resin composition of the present invention has excellent heat resistance, hydrolysis resistance and chemical resistance. According to the method of the present invention for producing a resin composition, a resin composition having excellent properties as described above can be produced.

The molded articles of the present invention have excellent mechanical properties such as flexural strength and flexural modulus. They also have high deflection temperature under load and excellent heat resistance. They also have excellent hydrolysis resistance and chemical resistance. According to the method of the present invention for producing a molded article, a molded article having excellent properties as described above can be produced.

Second Aspect

Since the present invention uses a polylactic acid obtained from biomass resources, it can provide a resin composition and a molded article that cause small burdens on the environment. The resin composition of the present invention that comprises the polylactic acid (component B) has a large $R_{195\ or\ higher}$ value, high crystallinity and a high melting point. The resin composition of the present invention has excellent heat resistance, hydrolysis resistance and chemical resistance. According to the method of the present invention for producing a resin composition, a resin composition having excellent properties as described above can be produced.

The molded articles of the present invention have excellent mechanical properties such as flexural strength and flexural modulus. They also have high deflection temperature under load and excellent heat resistance. They also have excellent hydrolysis resistance and chemical resistance. According to the method of the present invention for producing a molded article, a molded article having excellent properties as described above can be produced.

INDUSTRIAL APPLICABILITY

Since the molded articles of the present invention have excellent heat resistance, mechanical properties, hydrolysis resistance and chemical resistance, they are useful for various applications such as various electronic/electric equipments, OA equipments, vehicle parts, machine parts, other agricultural materials, fishing materials, shipping containers, packaging containers, play equipments and miscellaneous goods.

What is claimed is:

1. A method for producing a resin composition which has a retention of viscosity average molecular weight of at least 60% comprising the steps of
    (I) preparing a polylactic acid (component B) produced by melt-kneading only a component B-2 and a component B-5 in a weight ratio (component B-2/component B-5) of 10/90 to 90/10 at a temperature of 270 to 300° C.,
        wherein the component B-2 is a polylactic acid comprising 90 to 99 mol % of the L-lactic acid unit and 1 to 10 mol % of the D-lactic acid unit and/or units other than lactic acid,
        wherein the component B-5 is a polylactic acid comprising 90 to 99 mol % of the D-lactic acid unit and 1 to 10 mol % of the L-lactic acid unit and/or units other than lactic acid,
        wherein the component B shows a proportion of melt peaks at 195° C. or higher to all melt peaks in a temperature rising process in measurement by a differential scanning calorimeter (DSC) of at least 80%, and
    (II) melt-kneading 100 parts by weight of thermoplastic resin (component A) and 10 to 190 parts by weight of the polylactic acid (component B).

2. The method of claim 1, wherein melt-kneading of the component A and the component B is carried out in the presence of 0.01 to 5 parts by weight of crystal nucleating agent (component C) based on 100 parts by weight of the component B.

3. The method of claim 2, wherein the component C is talc.

4. The method of claim 1, wherein melt-kneading of the component A and the component B is carried out in the presence of 0.3 to 200 parts by weight of inorganic filler (component D) based on 100 parts by weight of the component A.

5. The method of claim 1, wherein melt-kneading of the component A and the component B is carried out in the presence of 0.01 to 5 parts by weight of terminal blocking agent (component E) based on 100 parts by weight of the component B.

* * * * *